US012739840B2

(12) United States Patent
Jang et al.

(10) Patent No.: US 12,739,840 B2
(45) Date of Patent: Sep. 15, 2026

(54) METHOD AND APPARATUS FOR DATA TRANSMISSION AND RECEPTION IN NETWORK COOPERATIVE COMMUNICATION

(71) Applicant: Samsung Electronics Co., Ltd., Gyeonggi-do (KR)

(72) Inventors: Youngrok Jang, Gyeonggi-do (KR); Ameha Tsegaye Abebe, Gyeonggi-do (KR); Seongmok Lim, Gyeonggi-do (KR); Hyoungju Ji, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 670 days.

(21) Appl. No.: 17/837,348

(22) Filed: Jun. 10, 2022

(65) Prior Publication Data

US 2023/0016937 A1 Jan. 19, 2023

(30) Foreign Application Priority Data

Jun. 10, 2021 (KR) ........................ 10-2021-0075660

(51) Int. Cl.
*H04W 72/23* (2023.01)
*H04L 5/00* (2006.01)

(52) U.S. Cl.
CPC ........... *H04W 72/23* (2023.01); *H04L 5/0053* (2013.01)

(58) Field of Classification Search
CPC .... H04W 72/23; H04L 5/0053; H04B 7/0628; H04B 7/0695; H04B 7/088; H04B 7/024
See application file for complete search history.

(56) References Cited

U.S. PATENT DOCUMENTS

2018/0316409 A1 11/2018 Yoon et al.
2020/0052844 A1* 2/2020 Yu .......................... H04W 72/23
2020/0052950 A1* 2/2020 Manolakos ........... H04L 5/0048
2020/0092860 A1* 3/2020 Khoshnevisan ...... H04W 76/27
2020/0107341 A1* 4/2020 Zhang ................ H04B 7/06968
2020/0145982 A1* 5/2020 Cheng ................... H04L 5/0053
2020/0221428 A1* 7/2020 Moon ................ H04B 7/06968
2020/0229161 A1* 7/2020 Raghavan ............. H04L 5/0048
2020/0280940 A1* 9/2020 Kim ..................... H04J 11/0086
(Continued)

FOREIGN PATENT DOCUMENTS

KR 10-2021-0103319 8/2021

OTHER PUBLICATIONS

Vivo, "Maintenance on Multi TRP", R1-2102947, 3GPP TSG RAN WG1 #104b-e, e-Meeting, Apr. 12-20, 2021, 7 pages.
(Continued)

*Primary Examiner* — Abdullahi Ahmed
*Assistant Examiner* — Christopher A. Reyes
(74) *Attorney, Agent, or Firm* — The Farrell Law Firm, P.C.

(57) ABSTRACT

Disclosed is a coverage enhancement method for a physical downlink control channel (PDCCH) in a wireless communication system related to a communication technique for converging a 5G communication system for supporting a higher data rate after a 4G system with IoT technology. The disclosure can be applied to intelligent services (e.g., smart home, smart building, smart city, smart car or connected car, healthcare, digital education, retail business, security and safety related services, etc.) based on 5G communication technology and IoT-related technology.

4 Claims, 32 Drawing Sheets

(56) References Cited

U.S. PATENT DOCUMENTS

2020/0314761 A1* 10/2020 Hosseini ........... H04W 72/1273
2020/0314881 A1* 10/2020 Bagheri ................ H04W 72/23
2020/0350957 A1* 11/2020 Zhou .................... H04B 7/0408
2020/0367208 A1* 11/2020 Khoshnevisan ...... H04W 72/23
2020/0374079 A1 11/2020 Chervyakov et al.
2021/0067205 A1* 3/2021 Manolakos ........... H04L 5/0053
2021/0068021 A1* 3/2021 Awoniyi-Oteri .... H04W 36/185
2021/0105778 A1* 4/2021 Zhou ................... H04W 52/242
2021/0112561 A1* 4/2021 Zhou ...................... H04B 7/024
2021/0143889 A1* 5/2021 Akoum ................ H04B 7/0417
2021/0168779 A1* 6/2021 Mondal ................. H04L 5/0053
2021/0259001 A1* 8/2021 Park .................. H04W 72/0453
2022/0232628 A1* 7/2022 Lin ................... H04W 74/0808
2022/0312449 A1* 9/2022 Sun ....................... H04L 5/0094
2022/0408470 A1* 12/2022 Jung .................. H04B 7/06968
2023/0016937 A1* 1/2023 Jang ..................... H04B 7/0628
2023/0345477 A1* 10/2023 Zhang ................... H04L 5/0091

OTHER PUBLICATIONS

Extended European Search Report dated May 24, 2024 issued in counterpart application No. 22820598.5-1206, 9 pages.
CATT, "Discussion on HST-SFN Transmission Schemes", R1-2104487, 3GPP TSG RAN WG1 #105-e, May 19-27, 2021, 19 pages.
ZTE, "Maintenance of Multi-TRP Enhancements", R1-2104583, 3GPP TSG RAN WG1 Meeting #105-e, May 10-27, 2021, 2 pages.
Xiaomi, "Enhancements on HST-SFN Operation for Multi-TRP PDCCH", R1-2105543, 3GPP TSG RAN WG1 #105-e, May 10-27, 2021, 5 pages.
International Search Report dated Sep. 7, 2022 issued in counterpart application No. PCT/KR2022/008212, 7 pages.
EP Communication Report dated Mar. 23, 2026 issued in counterpart application No. 22820598.5-1206, 8 pages.

* cited by examiner

FIG. 11

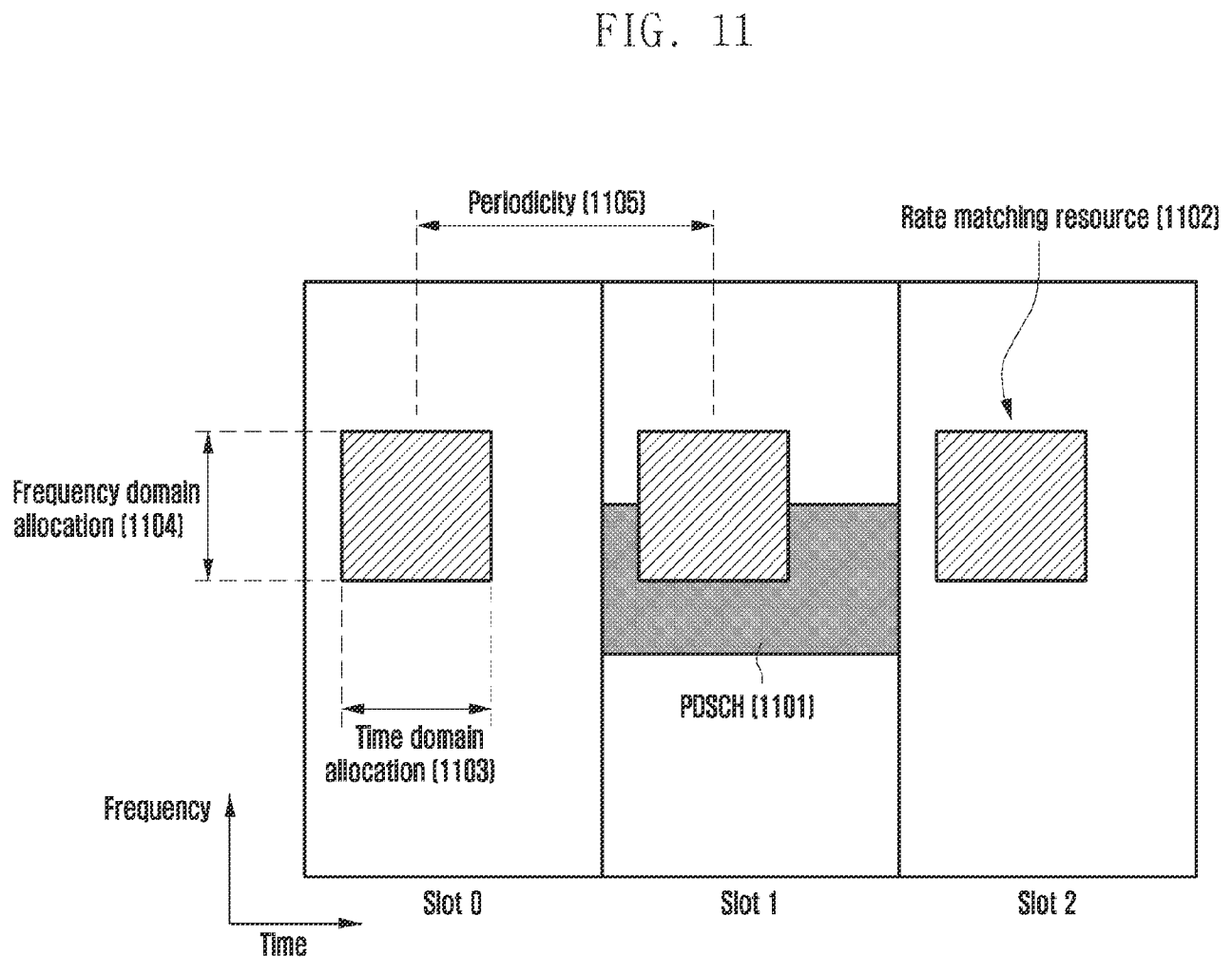

Rate matching resource (1102)

Periodicity (1105)

PDSCH (1101)

Time domain allocation (1103)

Frequency domain allocation (1104)

Slot 0

Slot 1

Slot 2

Frequency

Time

FIG. 19

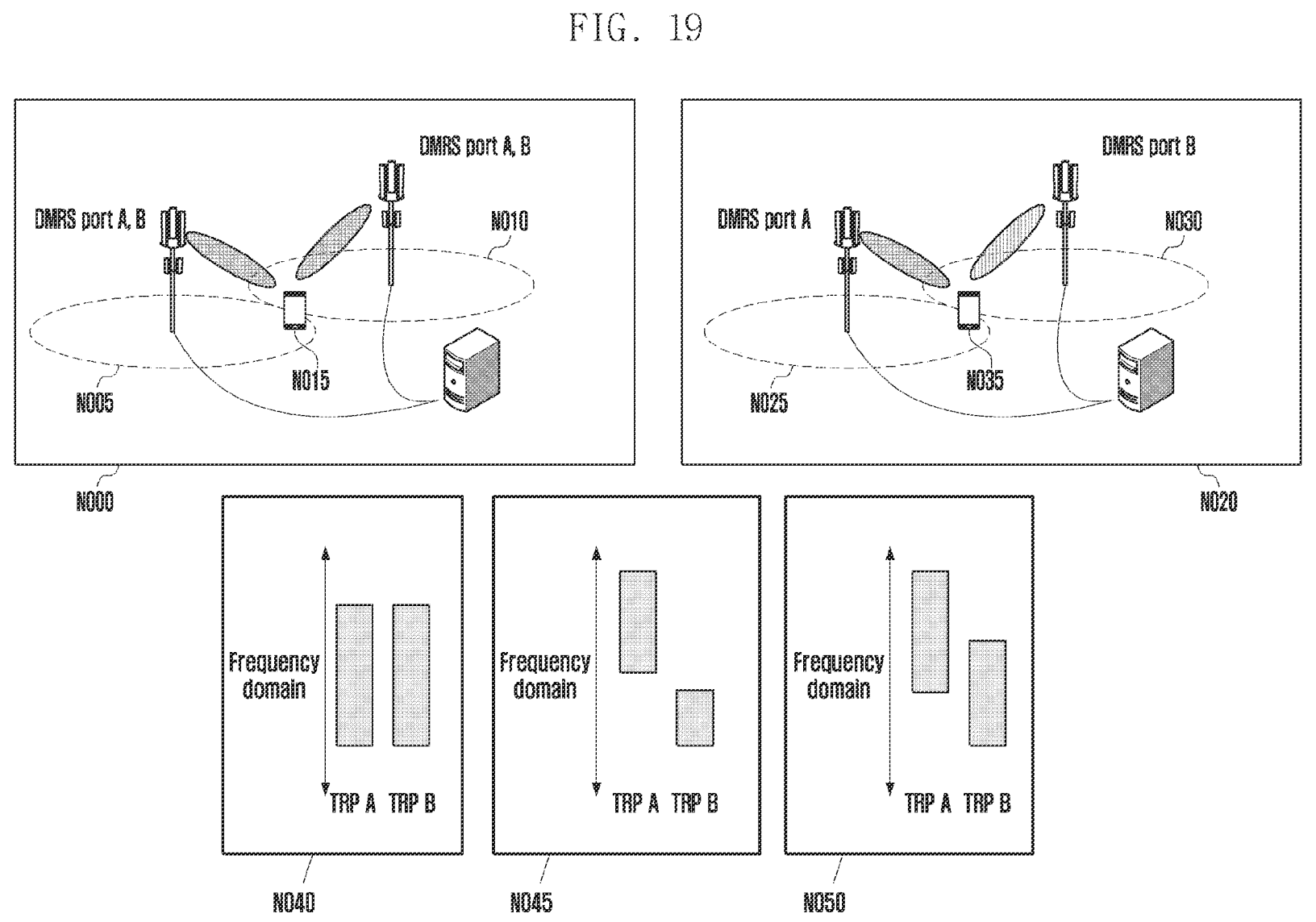

DMRS port A, B
DMRS port A, B
N000
N005
N010
N015

DMRS port A
DMRS port B
N020
N025
N030
N035

Frequency domain
TRP A TRP B
N040

Frequency domain
TRP A TRP B
N045

Frequency domain
TRP A TRP B
N050

METHOD AND APPARATUS FOR DATA TRANSMISSION AND RECEPTION IN NETWORK COOPERATIVE COMMUNICATION

CROSS-REFERENCE TO RELATED APPLICATION(S)

This application is based on and claims priority under 35 U.S.C. § 119 to Korean Patent Application No. 10-2021-0075660, filed in the Korean Intellectual Property Office on Jun. 10, 2021, the entire disclosure of which is incorporated herein by reference.

BACKGROUND

1. Field

The disclosure generally relates to operations of a terminal and a base station in a wireless communication system and, more specifically, to a method for transmitting and receiving downlink data in network cooperative communication and an apparatus capable of performing the same.

2. Description of Related Art

The demand for wireless data traffic has increased since deployment of 4th generation (4G) communication systems. To meet this demand, efforts have been made to develop an improved 5th generation (5G) or pre-5G communication system. Therefore, the 5G or pre-5G communication system is also called a beyond 4G network or a post long term evolution (LTE) system. The 5G communication system established by the 3rd generation partnership project (3GPP) is called a new radio (NR) system. The 5G communication system is considered to be implemented in extremely high frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques have been discussed and adopted in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been required for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply the 5G communication system to the IoT network. For example, technologies such as a sensor network, MTC, and M2M communication are being implemented on the basis of 5G communication technologies such as beamforming, MIMO, and an array antenna. The use of a cloud RAN for big data processing technology is one example of convergence between the 5G technology and the IoT technology.

As various services can be provided according to the development of the wireless communication system as described above, schemes for smoothly providing such services are required.

SUMMARY

The disclosure has been made to address at least the above-mentioned problems and/or disadvantages and to provide at least the advantages described below. The disclosed embodiments provide an apparatus and method for effectively providing a service in a mobile communication system.

In accordance with an aspect of the disclosure, a method performed by a terminal in a communication system is provided. The method includes receiving, from a base station, downlink control information (DCI) for scheduling a physical downlink shared channel (PDSCH), identifying that a scheduling offset for the PDSCH is smaller than a time duration for applying quasi co-location (QCL) information, identifying a control resource set (CORESET) overlapping in time with the PDSCH, wherein the CORESET corresponds to two transmission configuration indicator (TCI) states, and receiving, from the base station, the PDSCH based on at least one of the two TCI states corresponding to the CORESET.

In accordance with another aspect of the disclosure, a method performed by a base station in a communication system is provided. The method includes transmitting, to a terminal, DCI scheduling a PDSCH, identifying that a scheduling offset for the PDSCH is smaller than a time duration for applying QCL information, identifying a CORESET overlapping in time with the PDSCH, wherein the CORESET corresponds to two TCI states, and transmitting, to the terminal, the PDSCH based on at least one of the two TCI states corresponding to the CORESET.

In accordance with another aspect of the disclosure, a terminal in a communication system is provided. The terminal includes a transceiver, and a controller configured to receive, from a base station, DCI scheduling a PDSCH, identify that a scheduling offset for the PDSCH is smaller than time duration for applying QCL information, identify a CORESET overlapping in time with the PDSCH, wherein the CORESET corresponds to two TCI states, and receive, from the base station, the PDSCH based on at least one of the two TCI states corresponding to the CORESET.

In accordance with another aspect of the disclosure, a base station in a communication system is provided. The base station includes a transceiver, and a controller configured to transmit, to a terminal, DCI scheduling a PDSCH, identify that a scheduling offset for the PDSCH is smaller than time duration for applying QCL information, identify a CORESET overlapping in time with the PDSCH, wherein the CORESET corresponds to two TCI states, and transmit, to the terminal, the PDSCH based on at least one of the two TCI states corresponding to the CORESET.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 illustrates a method for a base station and a UE to transmit and receive data in consideration of a downlink data channel and a rate matching resource in a wireless communication system according to an embodiment;

FIG. 19 illustrates an antenna port configuration and resource allocation for cooperative communication in a wireless communication system according to an embodiment;

DETAILED DESCRIPTION

Figure 1:
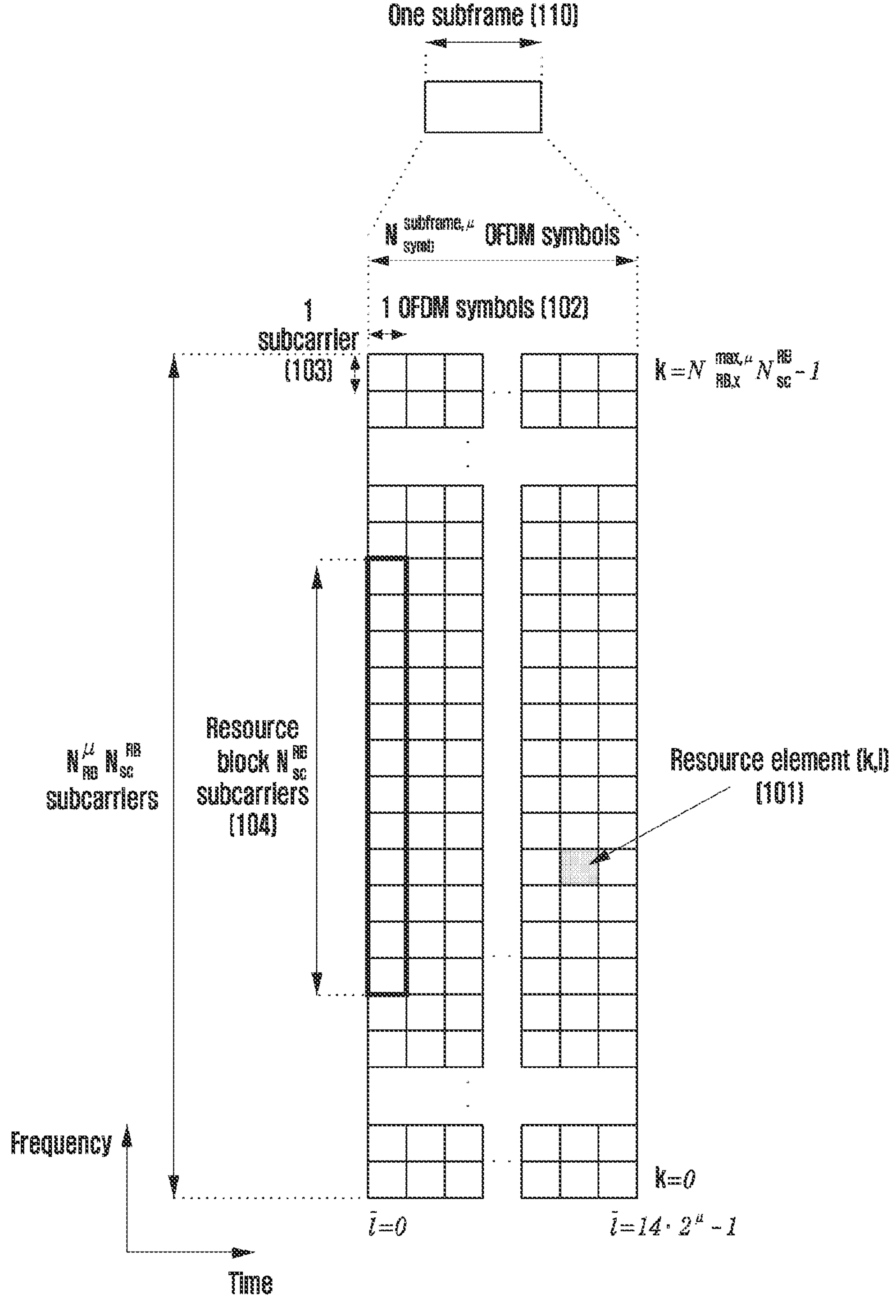
FIG. 1 illustrates a basic structure of a time-frequency domain in a wireless communication system according to an embodiment.

Hereinafter, embodiments of the disclosure will be described in detail with reference to the accompanying drawings. Descriptions of well-known functions and constructions are omitted for the sake of clarity and conciseness.

In describing embodiments, descriptions of technical contents that are well known in the technical field to which the disclosure pertains and are not directly related to the disclosure will be omitted. This is to more clearly convey the subject matter of the disclosure without obscuring it by omitting unnecessary description.

For the same reason, some elements may be exaggerated, omitted, or schematically illustrated in the accompanying drawings. In addition, the depicted size of each element does not fully reflect the actual size. In the drawings, the same or corresponding elements are assigned the same reference numerals.

The advantages and features of the disclosure and the manner of achieving them will become apparent through embodiments described below with reference to the accompanying drawings. The disclosure may be, however, embodied in many different forms and should not be construed as being limited to the embodiments set forth herein. Rather, these embodiments are provided so that the disclosure will be thorough and complete and will fully convey the scope of the disclosure to those skilled in the art. The disclosure is only defined by the scope of the appended claims. The same reference numerals refer to the same constitutional elements. In addition, if it is determined that a detailed description of a related function or configuration unnecessarily obscures the subject matter of the disclosure, the detailed description will be omitted. Further, the terms used herein are terms defined in consideration of functions in the disclosure, and may vary according to a user's or operator's intention or customs. Therefore, the definition should be made based on the content throughout the disclosure.

Hereinafter, embodiments of the disclosure will be described in detail with reference to the accompanying drawings. The disclosure is applicable to frequency division duplexing (FDD) and time division duplexing (TDD) systems. In the disclosure, higher signaling (or higher layer signaling) is a signal transmission method from a base station to a user equipment (UE) using a downlink data channel of a physical layer, or from a UE to a base station using an uplink (UL) data channel of a physical layer, and may be referred to as radio resource control (RRC) signaling, or packet data convergence protocol (PDCP) signaling, or a MAC control element (MAC CE).

Hereinafter, in the disclosure, when the UE determines whether cooperative communication is applied, the physical downlink control channel(s) (PDCCH(s)) for allocating the PDSCH to which the cooperative communication is applied may have a specific format, or the PDCCH(s) for allocating the PDSCH to which the cooperative communication is applied may have a specific indicator indicating whether the cooperative communication is applied, or the PDCCH(s) for allocating the PDSCH to which the cooperative communication is applied may be scrambled with a specific radio network temporary identifier (RNTI), or it may assume that the cooperative communication is applied in a specific interval indicated by a higher layer. Hereinafter, for convenience of description, a case in which the UE receives the PDSCH to which cooperative communication is applied, based on conditions similar to the above, will be referred to as an NC-JT case.

Hereinafter, in the disclosure, determining the priority between A and B refers to selecting one having a higher priority in accordance with a predetermined priority rule and then performing an operation corresponding thereto or omitting or dropping an operation of one having a lower priority.

Hereinafter, in the disclosure, the examples are described through a plurality of embodiments, but these are not independent, and one or more embodiments may be applied simultaneously or in combination.

Hereinafter, a base station refers to an entity that performs resource allocation for a terminal, and may be at least one of a gNode B (gNB), an eNode B (eNB), a Node B, a base station (BS), a radio access unit, a base station controller, or a node on a network. A terminal may include a UE, a mobile station (MS), a cellular phone, a smart phone, a computer, or a multimedia system capable of performing a communication function. In the disclosure, downlink (DL) is a wireless transmission path of a signal from a base station to a terminal, and UL is a wireless transmission path of a signal from a terminal to a base station. In addition, although the LTE or LTE-A system will be described below as an example, the embodiments of the disclosure may also be applied to other communication systems having a similar technical background or channel form. For example, the disclosure may be applied to the fifth generation mobile communication technology (5G, NR) developed after LTE-A, and the 5G technology mentioned below may be a concept including the existing LTE, LTE-A, and other similar services. In addition, the disclosure may be applied to other communication systems through some modifications within a range that does not significantly depart from the scope of the disclosure under the judgment of those skilled in the art.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s).

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term unit refers to a software element or a hardware element, such as a field programmable gate array (FPGA) or an application specific integrated circuit (ASIC), which performs a predetermined function. However, unit does not always have a meaning limited to software or hardware. The unit may be constructed either to be stored in an addressable storage medium or to execute one or more processors. Therefore, the unit includes, for example, software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of a smaller number of elements and units or separated into those of a larger number of elements and units. In addition, the elements and units may be implemented to operate one or more central processing units (CPUs) within a device or a secure multimedia card. Also, in embodiments, the unit may include one or more processors.

Outgrowing what provides an initial voice-oriented service, a wireless communication system is evolving to a broadband wireless communication system that provides a high-speed and high-quality packet data service, like communication standards such as, for example, 3GPP high speed packet access (HSPA), LTE (or evolved universal terrestrial radio access (E-UTRA)), LTE-advanced (LTE-A), high rate packet data (HRPD) of 3GPP2, ultra-mobile broadband (UMB), and 802.16e of IEEE.

In the LTE system, which is a representative example of the broadband wireless communication system, a downlink (DL) adopts an orthogonal frequency division multiplexing (OFDM) scheme, and a UL adopts a single carrier frequency division multiple access (SC-FDMA) scheme. The UL refers to a radio link in which a terminal (UE or MS) transmits data or control signals to a base station (eNode B or BS), and the DL refers to a radio link in which a base station transmits data or control signals to a terminal. The multiple access scheme as mentioned above generally allocates and operates time-frequency resources, through which data or control information is to be transmitted, for each user so that they do not overlap each other, that is, orthogonality is established, and thereby the data or control information of each user is distinguished.

The 5G communication system, which is the communication system implemented after LTE, should be able to freely reflect various requirements of users and service providers, and should also support services that simultaneously satisfy various requirements. As services considered for the 5G communication system, there are enhanced mobile broadband (eMBB), massive MTC (mMTC), ultra-reliability low-latency communication (URLLC), and the like.

The eMBB aims to provide a more improved data transfer rate than the data transfer rate supported by the existing LTE, LTE-A, or LTE-Pro system. For example, in the 5G communication system, the eMBB should be able to provide a peak data rate of 20 Gbps in the DL and a peak data rate of 10 Gbps in the UL from the viewpoint of one base station. Also, the 5G communication system is required to not only provide the peak data rate, but also provide an increased user-perceived data rate. In order to satisfy such requirements, it is required to improve various transmission/reception technologies including a more advanced MIMO transmission technology. In addition, the LTE system transmits a signal using a transmission bandwidth of up to 20 MHz in the 2 GHz band, whereas the 5G communication system uses a frequency bandwidth wider than 20 MHz in the frequency band of 3 to 6 GHz or 6 GHz or more, thereby satisfying the required data rate.

At the same time, the mMTC is being considered to support application services such as the IoT in the 5G communication system. In order to efficiently provide the IoT, the mMTC requires massive UE access support within a cell, improved UE coverage, improved battery life, reduced UE cost, and the like. Because the IoT is attached to a variety of sensors and devices to provide communication functions, a large number of UEs (e.g., 1,000,000 UEs/km$^2$) should be supported within a cell. In addition, because a UE that supports the mMTC is highly likely to be located in a shaded area that a cell cannot cover, such as the basement of a building, due to the characteristics of the service, the mMTC may require wider coverage compared to other services provided by the 5G communication system. A UE that supports the mMTC should be implemented with low cost and may require a very long battery life time such as 10 to 15 years because it is difficult to frequently exchange the battery of the UE.

Finally, the URLLC is a cellular-based wireless communication service used for a specific purpose (mission-critical). For example, services used for remote control for a robot or machinery, industrial automation, unmanned aerial vehicle, remote health care, emergency alert, etc. may be considered. Thus, the communication provided by the URLLC should provide very low latency and very high reliability. For example, a service that supports the URLLC should satisfy an air interface latency of less than 0.5 milliseconds and also has a requirement of a packet error rate of $10^{-5}$ or less. Therefore, for a service that supports the URLLC, the 5G system should provide a smaller transmit time interval (TTI) than other services and may also require a design having to allocate a wide resource in a frequency band to ensure the reliability of a communication link.

The three services of the 5G system, that is, eMBB, URLLC, and mMTC, may be multiplexed and transmitted in one system. In this case, such services may use different transmission/reception techniques and parameters so as to satisfy different requirements of the respective services. Of course, the 5G system is not limited to the above-described three services.

NR Time-Frequency Resources

Hereinafter, a frame structure of the 5G system will be described in detail with reference to the drawings, with FIG. 1 illustrates a basic structure of a time-frequency domain in a wireless communication system according to an embodiment.

FIG. 1 illustrates a basic structure of a time-frequency domain, which is a radio resource domain in which data or a control channel is transmitted, in a 5G system.

In FIG. 1, a horizontal axis represents a time domain with one subframe 110, and a vertical axis represents a frequency domain. A basic unit of resources in the time-frequency domain is a resource element (RE) 101, which may be defined as one OFDM symbol 102 on the time axis and one subcarrier 103 on the frequency axis. In the frequency domain, $$N_{sc}^{RB}$$

(e.g., twelve) consecutive REs may constitute one resource block (RB) 104.

Figure 2:
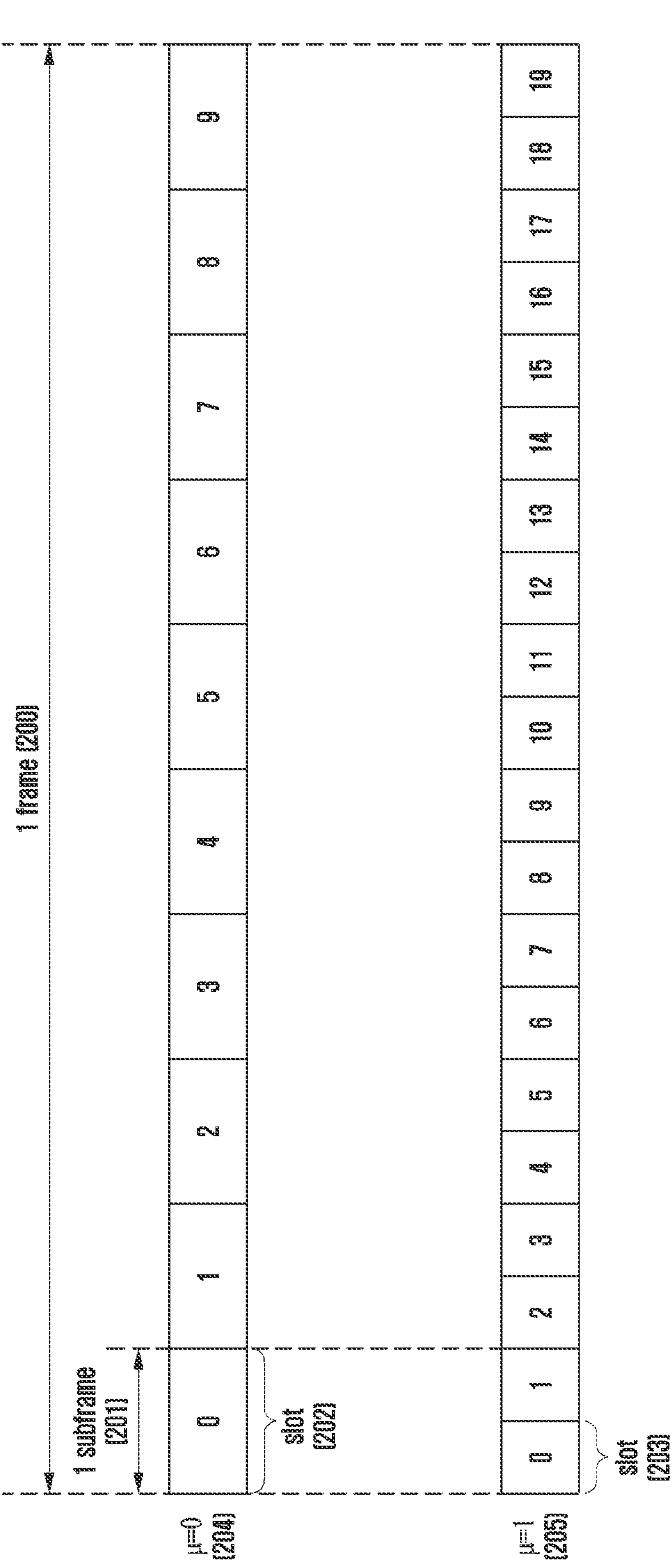
FIG. 2 illustrates a frame, subframe, and slot structure in a wireless communication system according to an embodiment.

FIG. 2 illustrates a frame, subframe, and slot structure in a wireless communication system according to an embodiment.

In FIG. 2, an example of the structure of a frame 200, a subframe 201, and a slot 202 is shown. One frame 200 may be defined as 10 ms. One subframe 201 may be defined as 1 ms, and thus one frame 200 may be composed of a total of 10 subframes 201. One slot 202 or 203 may be defined as 14 OFDM symbols (i.e., the number of symbols per slot $$(N_{symb}^{slot})$$

is 14). One subframe 201 may consist of one or a plurality of slots 202 or 203, and the number of slots 202 or 203 per one subframe 201 may vary depending on a configuration value μ 204 or 205 for a subcarrier spacing. In the example provided in FIG. 2, a case 204 of μ==0 and a case 205 of μ=1 are illustrated as subcarrier spacing configuration values. In the case 204 of μ=0, one subframe 201 may consist of one slot 202, and in the case 205 of μ=1, one subframe 201 may consist of two slots 203. That is, the number of slots per subframe $$\left(N_{slot}^{subframe,\mu}\right)$$

may vary depending on the configuration value μ for the subcarrier spacing, and thus the number of slots per frame $$\left(N_{slot}^{frame,\mu}\right)$$

may vary. Here, $$N_{slot}^{subfame,\mu} \text{ and } N_{slot}^{frame,\mu}$$

according to each subcarrier spacing configuration μ may be defined as Table 1 below.

TABLE 1

| μ | $N_{symb}^{slot}$ | $N_{slot}^{fame,\ u}$ | $N_{slot}^{subfame,\ u}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Bandwidth Part

Next, a bandwidth part (BWP) configuration in the 5G communication system will be described in detail with reference to the drawings.

Figure 3:
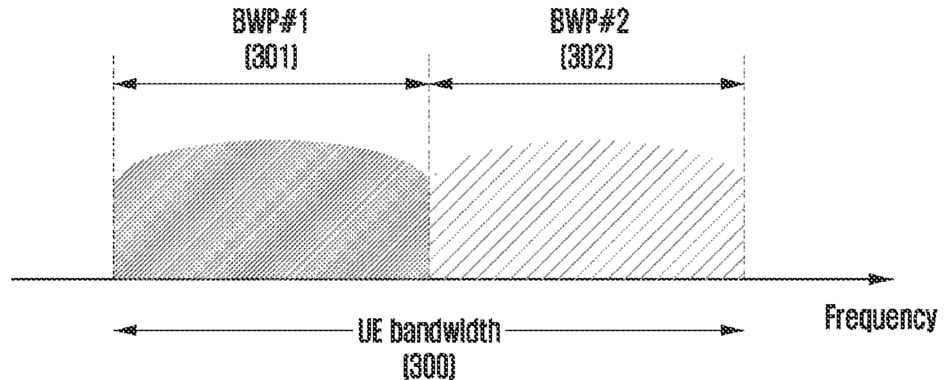
FIG. 3 illustrates a bandwidth part configuration in a wireless communication system according to an embodiment.

FIG. 3 illustrates a bandwidth part configuration in a wireless communication system according to an embodiment.

Shown in FIG. 3 is an example that a UE bandwidth 300 is configured as two BWPs, that is, a first BWP #1 (BWP #1) 301 and a second BWP #2 (BWP #2) 302. A base station may configure one or a plurality of BWPs to a UE and configure the following information for each BWP.

TABLE 2

```
BWP ::=                      SEQUENCE {
   bwp-Id                       BWP-Id,
     (bandwidth part identity)
   locationAndBandwidth         INTEGER (1..65536),
   (bandwidth part location)
   subcarrierSpacing            ENUMERATED {n0, n1, n2, n3, n4,
       n5},
   (subcarrier spacing)
   cyclicPrefix                 ENUMERATED { extended }
   (cyclic prefix)
}
```

Of course, the above example is not considered to be a limitation, and in addition to the above configuration information, various parameters related to the BWP may be configured in the UE. The above information may be delivered by the base station to the UE through higher layer signaling, for example, RRC signaling. The configured one BWP or at least one BWP among the plurality of configured BWPs may be activated. Whether to activate the configured BWP may be semi-statically delivered from the base station to the UE through RRC signaling or dynamically delivered through DCI.

Before RRC connection the UE may receive configuration of an initial BWP for initial access from the base station through a master information block (MIB). Specifically, through the MIB in an initial access stage, the UE may receive configuration information about a search space and a CORESET through which a PDCCH for receiving system information (which may correspond to remaining system information (RMSI) or system information block 1 (SIB1)) required for initial access can be transmitted. Each of the control resource set and the search space configured by the MIB may be regarded as identity (ID) 0. The base station may notify, to the UE through the MIB, configuration information such as frequency allocation information, time allocation information, and numerology for the control resource set #0. In addition, the base station may notify, to the UE through the MIB, configuration information about a monitoring period and occasion for the control resource set #0, that is, configuration information about the search space #0. The UE may regard, as an initial BWP for initial access, a frequency range configured with the control resource set #0 acquired from the MIB. In this case, the identity (ID) of the initial BWP may be regarded as 0.

The configuration of the BWP supported by the 5G system may be used for various purposes.

When a bandwidth supported by the UE is smaller than the system bandwidth, this may be supported through the BWP configuration. For example, the base station may configure a frequency location (configuration information 2) of the BWP to the UE, so that the UE can transmit and receive data at a specific frequency location within the system bandwidth.

In addition, the base station may configure a plurality of BWPs to the UE for the purpose of supporting different numerologies. For example, in order to support both data transmission and reception using a subcarrier spacing of 15 kHz and a subcarrier spacing of 30 kHz to a certain UE, two BWPs may be configured with a subcarrier spacing of 15 kHz and a subcarrier spacing of 30 kHz, respectively. Different BWPs may be subjected to frequency division multiplexing (FDMA), and in order to transmit/receive data at a specific subcarrier spacing, a BWP configured with the corresponding subcarrier spacing may be activated.

Also, for the purpose of reducing power consumption of the UE, the base station may configure BWPs having bandwidths of different sizes to the UE. For example, if the UE supports a very large bandwidth, e.g., a bandwidth of 100 MHz, and always transmits and receives data using that bandwidth, very large power consumption may occur. In particular, monitoring an unnecessary DL control channel with a large bandwidth of 100 MHz in a situation that there is no traffic may be very inefficient in terms of power consumption. For the purpose of reducing the power consumption of the UE, the base station may configure a BWP of a relatively small bandwidth, for example, a BWP of 20 MHz, to the UE. In the absence of traffic, the UE may perform a monitoring operation in the 20 MHz BWP, and when data occurs, the UE may transmit/receive data in the 100 MHz BWP under the instruction of the base station.

In a method of configuring the BWP, the UEs before RRC-connected may receive configuration information on the initial BWP through the MIB in the initial access stage. Specifically, from the MIB of a physical broadcast channel (PBCH), the UE may receive configuration of a CORESET for a DL control channel through which DCI for scheduling a system information block (SIB) can be transmitted. The bandwidth of the control resource set configured via the MIB may be regarded as the initial BWP, and the UE may receive a PDSCH for transmission of the SIB through the configured initial BWP. In addition to the purpose of receiving the SIB, the initial BWP may be utilized for other system information (OSI), paging, and random access.

Bandwidth Part Switch

When one or more BWPs are configured for the UE, the base station may instruct the UE to switch the BWP by using a BWP indicator field in the DCI. For example, in FIG. 3, if the currently activated BWP of the UE is the BWP #1 301, the base station may indicate to the UE the BWP #2 302 with a BWP indicator in the DCI, and the UE may perform a BWP switch to the BWP #2 302 indicated by the BWP indicator in the DCI.

As described above, the DCI-based BWP switch may be indicated by the DCI for scheduling the PDSCH or the PUSCH. Thus, upon receiving a BWP switch request, the UE should be able to transmit or receive the PDSCH or the PUSCH scheduled by the DCI in the switched BWP without difficulty. To this end, the standard stipulates a requirement for a delay time ($T_{BWP}$) required in a BWP switch, and it may be defined, for example, as shown in Table 3 below.

TABLE 3

| | | BWP switch delay $T_{BWP}$ (slots) | |
|---|---|---|---|
| μ | NR Slot length (ms) | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

Note 1:
Depends on UE capability.
Note 2:
If the BWP switch involves changing of SCS, the BWP switch delay is determined by the larger one between the SCS before BWP switch and the SCS after BWP switch.

The requirement for the BWP switch delay supports type 1 or type 2 depending on the capability of the UE. The UE may report a supportable BWP delay type to the base station.

In accordance with the requirement for the BWP switch delay described above, upon receiving the DCI including a BWP switch indicator in a slot n, the UE may complete a switch to a new BWP indicated by the BWP switch indicator at a time point not later than a slot n+$T_{BWP}$, and perform transmission/reception for a data channel scheduled by the DCI in the new BWP. When the base station intends to schedule the data channel using the new BWP, it may determine the time domain resource allocation (TDRA) for the data channel in consideration of the BWP switch delay ($T_{BWP}$) of the UE. That is, in a method of determining the TDRA for the data channel when scheduling the data channel with the new BWP, the base station may schedule the data channel after the BWP switch delay. Accordingly, the UE may not expect that the DCI indicating the BWP switch indicates the value of a slot offset (K0 or K2) smaller than the BWP switch delay ($T_{BWP}$).

If the UE receives DCI (e.g., DCI format 1_1 or 0_1) indicating a BWP switch, the UE may not perform any transmission or reception during a time interval from the third symbol of a slot receiving the PDCCH including the DCI to a start point of a slot indicated by a slot offset (K0 or K2) value indicated by the TDRA indicator field in the DCI. For example, if the UE receives the DCI indicating a BWP switch in a slot n, and a slot offset value indicated by the DCI is K, the UE may not perform any transmission or reception from the third symbol of the slot n to the symbol before the slot n+K (that is, the last symbol of the slot n+K−1).

SS/PBCH Block

Next, a synchronization signal (SS)/PBCH block in the 5G system will be described.

The SS/PBCH block (SSB) may refer to a physical layer channel block composed of a primary SS (PSS), a secondary SS (SSS), and a PBCH. Specifically, it is as follows:

- PSS is a signal serving as a reference for DL time/frequency synchronization and provides some information on cell ID.
- SSS serves as a reference for DL time/frequency synchronization and provides remaining cell ID information not provided by the PSS. Additionally, SSS may serve as a reference signal (RS) for demodulation of the PBCH.
- PBCH provides essential system information necessary for the UE to transmit and receive a data channel and a control channel. The essential system information may include search space related control information indicating radio resource mapping information of a control channel, scheduling control information on a separate data channel for transmitting system information, and the like.
- SS/PBCH block is formed of a combination of the PSS, the SSS, and the PBCH. One or a plurality of SS/PBCH blocks may be transmitted within 5 ms, and the respective transmitted SS/PBCH blocks may be distinguished by an index.

The UE may detect the PSS and the SSS in the initial access stage and decode the PBCH. The UE may acquire the MIB from the PBCH, and a control resource set #0 (which may correspond to a control resource set having a control resource set index of 0) may be configured therefrom. The UE may perform monitoring on the control resource set #0, assuming that a selected SS/PBCH block and a demodulation reference signal (DMRS) transmitted in the control resource set #0 are in QCL. The UE may receive system information via DL control information transmitted in the control resource set #0. From the received system information, the UE may acquire configuration information related to a random access channel (RACH) required for the initial access. The UE may transmit a physical RACH (PRACH) to the base station in consideration of the selected SS/PBCH index, and the base station that receives the PRACH may acquire information on the SS/PBCH block index selected by the UE. The base station can know that the UE has selected a certain block from among the SS/PBCH blocks and is monitoring the control resource set #0 related thereto.

PDCCH: Related to DCI

Next, DCI in the 5G system will be described in detail.

In the 5G system, scheduling information for UL data (or ULPUSCH) or DL data (or PDSCH) is delivered from the base station to the UE through the DCI. The UE may monitor a DCI format for fallback and a DCI format for non-fallback with respect to the PUSCH or the PDSCH. The DCI format for fallback may be composed of a fixed field predefined between the base station and the UE, and the DCI format for non-fallback may include a configurable field.

The DCI may be transmitted through a PDCCH after passing through a channel coding and modulation process. A cyclic redundancy check (CRC) is attached to a DCI message payload, and the CRC may be scrambled with a RNTI corresponding to the identity of the UE. Depending on the purpose of the DCI message, for example, UE-specific data transmission, a power control command, a random access response, etc., different RNTIs may be used. That is, the RNTI is not explicitly transmitted, but transmitted by being included in a CRC calculation process. Upon receiving the DCI message transmitted on the PDCCH, the UE checks the CRC by using the allocated RNTI, and if the CRC check result is correct, the UE can know that the message has been transmitted to the UE.

For example, the DCI for scheduling the PDSCH for system information (SI) may be scrambled with an SI-RNTI. The DCI for scheduling the PDSCH for a random access response (RAR) message may be scrambled with an RA-RNTI. The DCI for scheduling the PDSCH for a paging message may be scrambled with a P-RNTI. The DCI for notifying a slot format indicator (SFI) may be scrambled with an SFI-RNTI. The DCI for notifying transmit power control (TPC) may be scrambled with a TPC-RNTI. The DCI for scheduling the UE-specific PDSCH or PUSCH may be scrambled with a cell RNTI (C-RNTI).

A DCI format 0_0 may be used as a fallback DCI for scheduling the PUSCH, and in this case the CRC may be scrambled with the C-RNTI. The DCI format 0_0 in which the CRC is scrambled with the C-RNTI may include, for example, the following information:

TABLE 4

- Identifier for DCI formats - [1] bit
- Frequency domain resource assignment - [$\lceil \log_2(N^{UL,BWP}_{RB}(N^{UL,BWP}_{RB}+1)/2) \rceil$ ] bits
- Time domain resource assignment - X bits
- Frequency hopping flag - 1 bit
- Modulation and coding scheme - 5 bits
- New data indicator - 1 bit
- Redundancy version - 2 bits
- HARQ process number - 4 bits
- TPC (transmit power control) command for scheduled PUSCH - [2] bits
- UL/SUL (supplementary UL) indicator - 0 or 1 bit A DCI format 0_1 may be used as a non-fallback DCI for scheduling the PUSCH, and in this case the CRC may be scrambled with the C-RNTI. The DCI format 0_1 in which the CRC is scrambled with the C-RNTI may include, for example, the following information:

TABLE 5

- Carrier indicator – 0 or 3 bits
- UL/SUL indicator – 0 or 1 bit
- Identifier for DCI formats – [1] bits
- Bandwidth part indicator – 0, 1 or 2 bits
- Frequency domain resource assignment
  - For resource allocation type 0, $\lceil N_{RB}^{UL,BWP} / P \rceil$ bits
  - For resource allocation type 1, $\lceil \log_2(N_{RB}^{UL,BWP}(N_{RB}^{UL,BWP} + 1)/2 \rceil$ bits
- Time domain resource assignment – 1, 2, 3, or 4 bits
- VRB (virtual resource block)-to-PRB (physical resource block) mapping – 0 or 1 bit, only for resource allocation type 1.
  - 0 bit if only resource allocation type 0 is configured;
  - 1 bit otherwise.
- Frequency hopping flag – 0 or 1 bit, only for resource allocation type 1.
  - 0 bit if only resource allocation type 0 is configured;
  - 1 bit otherwise.
- Modulation and coding scheme – 5 bits
- New data indicator – 1 bit
- Redundancy version – 2 bits
- HARQ process number – 4 bits
- 1st DL assignment index – 1 or 2 bits
  - 1 bit for semi-static HARQ-ACK codebook;
  - 2 bits for dynamic HARQ-ACK codebook with single HARQ-ACK codebook.
- 2nd DL assignment index – 0 or 2 bits
  - 2 bits for dynamic HARQ-ACK codebook with two HARQ-ACK sub-codebooks;
  - 0 bit otherwise.

TABLE 5-continued

- TPC command for scheduled PUSCH – 2 bits
- *SRS* resource indicator – $\left\lceil \log_2\left(\sum_{k=1}^{L_{max}} \binom{N_{SRS}}{k}\right) \right\rceil$ or $\lceil \log_2(N_{SRS}) \rceil$ bits
  - $\left\lceil \log_2\left(\sum_{k=1}^{L_{max}} \binom{N_{SRS}}{k}\right) \right\rceil$ bits for non-codebook based *PUSCH* transmission
  - $\lceil \log_2(N_{SRS}) \rceil$ bits for codebook based PUSCH transmission
- Precoding information for a number of layers – up to 6 bits
- Antenna ports – up to 5 bits
- SRS request – 2 bits
- CSI request – 0, 1, 2, 3, 4, 5, or 6 bits
- CBG (code block group) transmission information – 0, 2, 4, 6, or 8 bits
- PTRS-DMRS association – 0 or 2 bits
- beta_offset indicator – 0 or 2 bits
- DMRS sequence initialization – 0 or 1 bit A DCI format 1_0 may be used as a fallback DCI for scheduling the PDSCH, and in this case the CRC may be scrambled with the C-RNTI. The DCI format 1_0 in which the CRC is scrambled with the C-RNTI may include, for example, information in Table 6 below.

TABLE 6

- Identifier for DCI formats - [1] bit
- Frequency domain resource assignment - [$\lceil \log_2(N^{DL,BWP}_{RB}(N^{DL,BWP}_{RB}+1)/2) \rceil$ ] bits
- Time domain resource assignment - X bits
- VRB-to-PRB mapping - 1 bit
- Modulation and coding scheme - 5 bits
- New data indicator - 1 bit
- Redundancy version - 2 bits
- HARQ process number - 4 bits
- DL assignment index - 2 bits
- TPC command for scheduled PUCCH - [2] bits
- PUCCH (physical uplink control channel) resource indicator - 3 bits
- PDSCH-to-HARQ feedback timing indicator - [3] bits A DCI format 1_1 may be used as a non-fallback DCI for scheduling the PDSCH, and in this case the CRC may be scrambled with the C-RNTI. The DCI format 1_1 in which the CRC is scrambled with the C-RNTI may include, for example, information in Table 7 below.

TABLE 7

- Carrier indicator—0 or 3 bits
- Identifier for DCI formats—[1] bits
- Bandwidth part indicator—0, 1 or 2 bits
- Frequency domain resource assignment
  - For resource allocation type 0, $\lceil N_{RB}^{DL,BWP}/P \rceil$ bits
  - For resource allocation type 1, $\lceil \log_2 (N_{RB}^{DL,BWP}(N_{RB}^{DL,BWP} + 1)/2) \rceil$ bits
- Time domain resource assignment—1, 2, 3, or 4 bits
- VRB-to-PRB mapping—0 or 1 bit, only for resource allocation type 1.
  - bit if only resource allocation type 0 is configured;
  - 1 bit otherwise.
- PRB bundling size indicator—0 or 1 bit
- Rate matching indicator—0, 1, Or 2 bits
- ZP SCI-RS trigger—0, 1, or 2 bits For transport block 1:
- Modulation and coding scheme—5 bits
- New data indicator—1 bit
- Redundancy version—2 bits For transport block 2:
- Modulation and coding scheme—5 bits
- New data indicator—1 bit
- Redundancy version—2 bits TABLE 7-continued

| |
|---|
| - HARQ process number—4 bits |
| - DL assignment index—0 or 2 or 4 bits |
| - TPC command for scheduled PUCCH—2 bits |
| - PUCCH resource indicator—3 bits |

TABLE 7-continued

| |
|---|
| - PDSCH-to-HARQ feedback timing indicator—3 bits |
| - Antenna ports—4, 5 or 6 bits |
| - Transmission configuration indication—0 or 3 bits |
| - SRS request—2 bits |
| - CBG transmission information—0, 2, 4, 6, or 8 bits |
| - CBG flushing out information—0 or 1 bit |
| - DMRS sequence initialization—1 bit |

PDCCH: CORESET, REG, CCE, Search Space

Hereinafter, a DL control channel in the 5G communication system will be described in detail with reference to the drawings.

Figure 4:
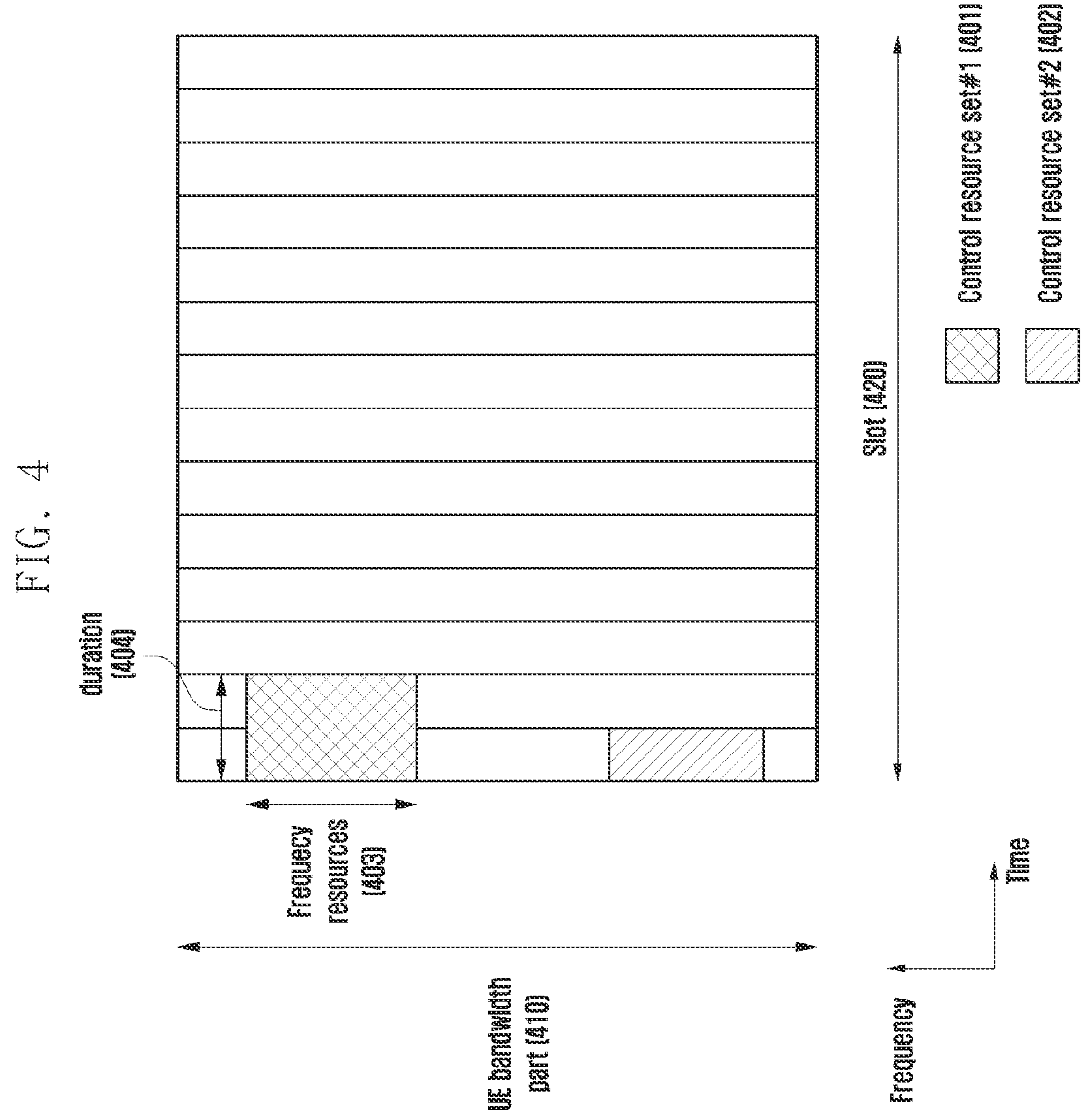
FIG. 4 illustrates a configuration of a control resource set of a downlink control channel in a wireless communication system according to an embodiment.

FIG. 4 illustrates a configuration of a control resource set of a DL control channel in a wireless communication system according to an embodiment. Specifically, FIG. 4 illustrates a CORESET in which a DL control channel is transmitted in a 5G communication system. Shown in FIG. 4 is an example that a UE BWP 410 is configured on the frequency axis and two control resource sets (a control resource set #1 401 and a control resource set #2 402) are configured in one slot 420 on the time axis. The control resource sets 401 and 402 may be configured in a specific frequency resource 403 within the entire UE BWP 410 on the frequency axis. On the time axis, one or a plurality of OFDM symbols may be configured, and this may be defined as a control resource set duration 404. Referring to the example shown in FIG. 4, the control resource set #1 401 is configured with a control resource set duration of 2 symbols, and the control resource set #2 402 is configured with a control resource set duration of 1 symbol.

The above-described control resource set in the 5G system may be configured by the base station to the UE through higher layer signaling (e.g., system information, MIB, RRC signaling). Configuring the control resource set to the UE refers to providing information such as a control resource set identity, a frequency position of a control resource set, and a symbol duration of a control resource set. For example, the following information may be included:

TABLE 8

```
ControlResourceSet ::=                    SEQUENCE {
   --Corresponds to L1 parameter 'CORESET-ID'
   controlResourceSetId                   ControlResourceSetId,
    (control resource set identity))
   frequencyDomainResources                BIT STRING (SIZE (45)),
    (frequency domain resource allocation information)
   duration                               INTEGER (1..maxCoReSetDuration),
    (time domain resource allocation information)
   cce-REG-MappingType                             CHOICE {
    (CCE-to-REG mapping type)
    interleaved                            SEQUENCE {
      reg-BundleSize                       ENUMERATED {n2, n3, n6},
        (REG bundle size)
      precoderGranularity                     ENUMERATED {sameAsREG-
bundle, allContiguousRBs},
      interleaverSize                   ENUMERATED {n2, n3, n6}
      (interleaver size)
      shiftindex
      INTEGER(0..maxNrofPhysicalResourceBlocks-1)
      (interleaver shift)
      },
      nonInterleaved                       NULL
   },
   tci-StatesPDCCH                         SEQUENCE(SIZE (1..maxNrofTCI-
    StatesPDCCH)) OF TCI-StateId               OPTIONAL,
   (QCL configuration information)
  tci-PresentInDCI                        ENUMERATED {enabled}
}
```

In Table 8, tci-StatesPDCCH (simply referred to as a TCI state) configuration information may include information about one or a plurality of SS/PBCH block indexes or channel state information reference signal (CSI-RS) indexes being in a QCL relationship with DMRS transmitted in the corresponding control resource set.

Figure 5A:
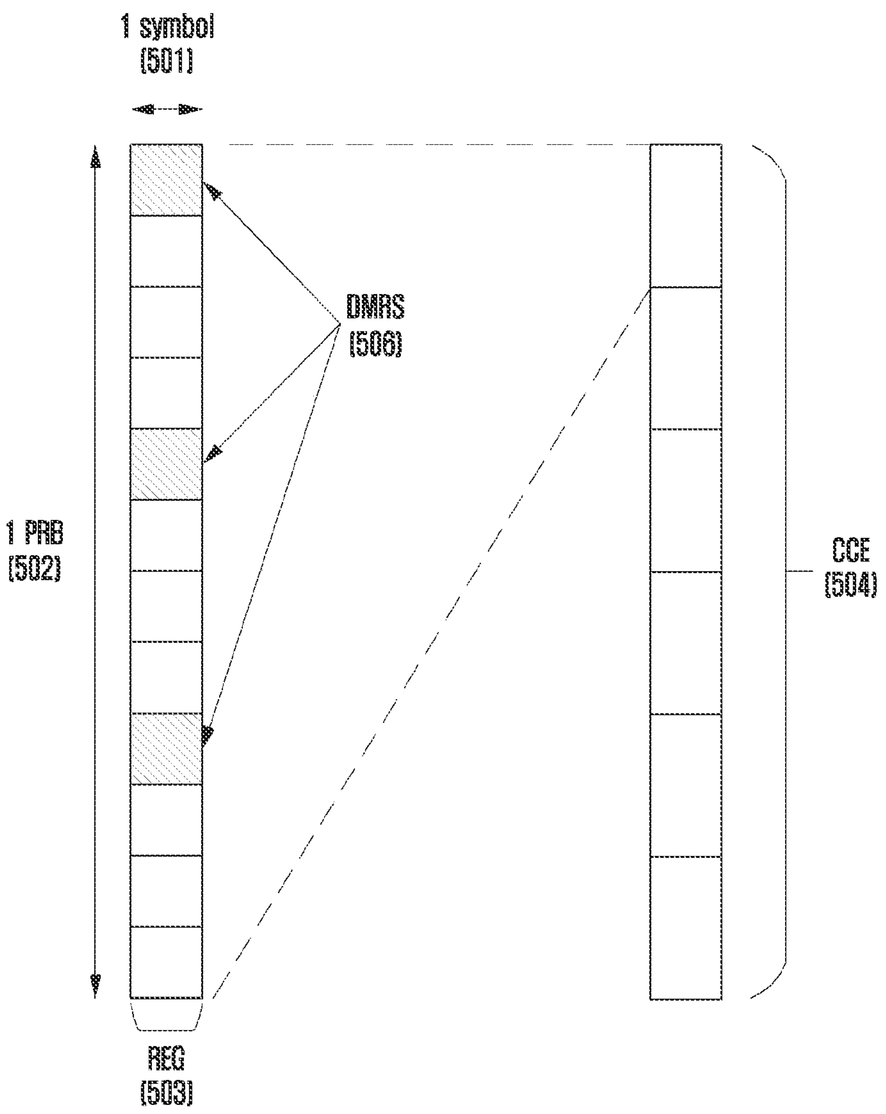
FIG. 5A illustrates a structure of a downlink control channel in a wireless communication system according to an embodiment.

FIG. 5A is a diagram illustrating an example of a basic unit of time and frequency resources constituting a DL control channel that can be used in a 5G system. According to FIG. 5A, the basic unit of time and frequency resources constituting the control channel may be referred to as a resource element group (REG) 503, and the REG 503 may be defined as one OFDM symbol 501 on the time axis and one physical resource block (PRB) 502, that is, twelve subcarriers, on the frequency axis. The base station may compose a DL control channel allocation unit by concatenating the REGs 503.

As shown in FIG. 5A, when a basic unit for DL control channel allocation in the 5G system is referred to as a control channel element (CCE) 504, one CCE 504 may be composed of a plurality of REGs 503. In this example, the REG 503 may be composed of twelve REs, and if one CCE 504 is composed of six REGs 503, one CCE 504 may be composed of seventy-two REs. When a DL control resource set is configured, it may be composed of a plurality of CCEs 504, and a specific DL control channel may be transmitted through mapping with one or a plurality of CCEs 504 depending on an aggregation level (AL) in the control resource set. The CCEs 504 in the control resource set are distinguished by means of numbers, and the numbers of the CCEs 504 may be assigned according to a logical mapping scheme.

The basic unit of the DL control channel shown in FIG. 5A, that is, the REG 503, may include both REs to which DCI is mapped and a region to which a DMRS 505, which is a reference signal for decoding them, is mapped. As in FIG. 6A, three DMRSs 505 may be transmitted within one REG 503. The number of CCEs required to transmit the PDCCH may be 1, 2, 4, 8, or 16 depending on the aggregation level (AL), and different CCE numbers may be used to implement link adaptation of the DL control channel. For example, in case of AL=L, one DL control channel may be transmitted through L CCEs. The UE needs to detect a signal without knowing information about the DL control channel. For blind decoding, a search space indicating a set of CCEs is defined. The search space is a set of DL control channel candidates consisting of CCEs that the UE should attempt to decode on a given aggregation level. Because there are various aggregation levels that make one bundle with 1, 2, 4, 8, or 16 CCEs, the UE may have a plurality of search spaces. A search space set may be defined as a set of search spaces in all the configured aggregation levels.

The search spaces may be classified into a common search space and a UE-specific search space. A certain group of UEs or all UEs may search the common search space of the PDCCH to receive cell-common control information such as dynamic scheduling for system information or a paging message. For example, PDSCH scheduling assignment information for SIB transmission including cell operator information may be received by searching the common search space of the PDCCH. Because a certain group of UEs or all UEs should receive the PDCCH, the common search space may be defined as a set of promised CCEs. The scheduling assignment information for the UE-specific PDSCH or PUSCH may be received by the UE searching the UE-specific search space of the PDCCH. The UE-specific search space may be defined UE-specifically as a function of the UE identity and various system parameters.

In the 5G system, parameters for the search space for the PDCCH may be configured from the base station to the UE through higher layer signaling (e.g., SIB, MIB, RRC signaling). For example, the base station may configured, to the UE, with the number of PDCCH candidates in each aggregation level L, a monitoring period for the search space, a monitoring occasion in units of symbols in a slot for the search space, a search space type (the common search space or the UE-specific search space), a combination of a DCI format to be monitored in the corresponding search space and an RNTI, a control resource set index to be monitored in the search space, and the like. For example, the following information may be contained:

TABLE 9

```
SearchSpace :=                          SEQUENCE {
  --Identity of the search space. SearchSpaceId = 0 identifies the SearchSpace
    configured via PBCH (MIB) or ServingCellConfigCommon.
  searchSpaceId                          SearchSpaceId,
   (search space identity)
  controlResourceSetId                   ControlResourceSetId,
   (control resource set identity)
  monitoringSlotPeriodicityAndOffset        CHOICE {
   (monitoring slot level period)
    sl1                                     NULL,
    sl2                                     INTEGER (0..1),
    sl4                                     INTEGER (0..3),
    sl5                                  INTEGER (0..4),
    sl8                                     INTEGER (0..7),
    sl10                                 INTEGER (0..9),
    sl16                                 INTEGER (0..15),
    sl20                                 INTEGER (0..19)
  }
   duration (monitoring length)                 INTEGER (2..2559)
  monitoringSymbolsWithinSlot                 BIT STRING (SIZE (14))
   (monitoring symbol in slot)
  nrofCandidates                         SEQUENCE {
   (number of PDCCH candidates per aggregation level)
    aggregationLevel1                       ENUMERATED {n0, n1, n2, n3, n4, n5,
    n6, n8},
    aggregationLevel2                       ENUMERATED {n0, n1, n2, n3, n4, n5,
    n6, n8},
    aggregationLevel4                       ENUMERATED {n0, n1, n2, n3, n4, n5,
    n6, n8},
    aggregationLevel8                       ENUMERATED {n0, n1, n2, n3, n4, n5,
    n6, n8},
    aggregationLevel16                      ENUMERATED {n0, n1, n2, n3, n4, n5,
    n6, n8}
},
searchSpaceType                         CHOICE {
(search space type)
 -- Configures this search space as common search space (CSS) and DCI formats to
  monitor.
  common                                SEQUENCE {
(common search space)
      }
  ue-Specific                           SEQUENCE {
(UE-specific search space)
      -- Indicates whether the UE monitors in this USS for DCI formats 0-0 and 1-0 or
   for formats 0-1 and 1-1.
    formats                             ENUMERATED {formats0-0-And-1-0,
   formats0-1-And-1-1},
   ...
       }
```

The base station may configure one or a plurality of search space sets to the UE depending on configuration information. The base station may configure a search space set 1 and a search space set 2 to the UE, configure a DCI format A scrambled with X-RNTI in the search space set 1 to be monitored in the common search space, and configured a DCI format B scrambled with Y-RNTI in the search space set 2 to be monitored in the UE-specific search space.

According to the configuration information, one or a plurality of search space sets may exist in the common search space or the UE-specific search space. For example, a search space set #1 and a search space set #2 may be configured as the common search space, and a search space set #3 and a search space set #4 may be configured as the UE-specific search space.

In the common search space, the following combination of a DCI format and an RNTI may be monitored. Of course, the following examples are not considered to be a limitation:

- DCI format 0_0/1_0 with CRC scrambled by C-RNTI, CS-RNTI, SP-CSI-RNTI, RA-RNTI, TC-RNTI, P-RNTI, SI-RNTI
- DCI format 2_0 with CRC scrambled by SFI-RNTI
- DCI format 2_1 with CRC scrambled by INT-RNTI
- DCI format 2_2 with CRC scrambled by TPC-PUSCH-RNTI, TPC-PUCCH-RNTI
- DCI format 2_3 with CRC scrambled by TPC-SRS-RNTI In the UE-specific search space, the following combination of a DCI format and an RNTI may be monitored. Of course, the following examples are not considered to be a limitation:

- DCI format 0_0/1_0 with CRC scrambled by C-RNTI, CS-RNTI, TC-RNTI
- DCI format 1_0/1_1 with CRC scrambled by C-RNTI, CS-RNTI, TC-RNTI The specified RNTIs may follow the following definitions and purposes:

- C-RNTI (cell RNTI): The purpose of UE-specific PDSCH scheduling
- TC-RNTI (temporary cell RNTI): The purpose of UE-specific PDSCH scheduling
- CS-RNTI (configured scheduling RNTI): The purpose of semi-statically configured UE-specific PDSCH scheduling
- RA-RNTI (random access RNTI): The purpose of PDSCH scheduling in the random access step
- P-RNTI (paging RNTI): The purpose of PDSCH scheduling in which paging is transmitted
- SI-RNTI (system information RNTI): The purpose of PDSCH scheduling in which system information is transmitted
- INT-RNTI (interruption RNTI): The purpose of informing whether puncturing for PDSCH
- TPC-PUSCH-RNTI (transmit power control for PUSCH RNTI): The purpose of indicating power control command for PUSCH
- TPC-PUCCH-RNTI (transmit power control for PUCCH RNTI): The purpose of indicating power control command for PUCCH
- TPC-SRS-RNTI (transmit power control for SRS RNTI): The purpose of indicating power control command for SRS The aforementioned specified DCI formats may follow the definition below:

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G system, the search space of the aggregation level L in the control resource set p and the search space set s can be expressed as Equation (1), below:

$$L\cdot\left\{\left(Y_{p,n^{\mu}_{s,f}}+\left\lfloor\frac{m_{s,n_{CI}}\cdot N_{CCE,p}}{L\cdot M^{(L)}_{s,max}}\right\rfloor+n_{CI}\right)\bmod\left\lfloor\frac{N_{CCE,p}}{L}\right\rfloor\right\}+i \qquad (1)$$

Equation (1) includes the following variables:—

L: Aggregation level $n_{CI}$: Carrier index $N_{CCE,p}$: The total number of CCEs existing in the control resource set p $$n^{\mu}_{s,f}$$

Slot index $$M^{(L)}_{s,max}$$

The number of PDCCH candidates of the aggregation level L $$m_{s,n_{CI}}=0,\ \ldots\ ,M^{(L)}_{s,max}-1$$

PDCCH candidate index of aggregation level L i=0, . . . , L−1

$$Y_{p,n^{\mu}_{s,f}}=\left(A_p\cdot Y_{p,n^{\mu}_{s,f}-1}\right)\bmod D,$$

$Y_{p-1}=n_{RNTI}\neq0$, $A_p=39827$ for pmod3=0, $A_p=39829$ for pmod3=1, $A_p=39839$ for pmod3=2, D=65537

$n_{RNTI}$: UE identity

The value of $$Y_{p,n^{\mu}_{s,f}}$$

may correspond to 0 in case of the common search space.

The value of $$Y_{p,n^{\mu}_{s,f}}$$

may correspond to a value that varies depending on a UE's identity (C-RNTI or ID configured for the UE by the base station) and a time index in the UE-specific search space.

In the 5G system, a plurality of search space sets may be configured with different parameters (e.g., parameters in Table 9), so the set of search space monitored by the UE at every time point may vary. For example, if a search space set #1 is configured with a X-slot period, a search space set #2 is configured with a Y-slot period, and X and Y are different, the UE may monitor both the search space set #1 and the search space set #2 in a specific slot, and monitor one of the search space set #1 and the search space set #2 in a specific slot.

PDCCH: Span

The UE may perform UE capability reporting for each subcarrier spacing in case of having a plurality of PDCCH monitoring positions within the slot, and in this case, the concept of span may be used. The span refers to consecutive symbols for the UE to monitor the PDCCH in the slot, and each PDCCH monitoring position is within one span. The span can be expressed as (X, Y), where x denotes the minimum number of symbols that must be spaced apart between the first symbols of two consecutive spans, and Y denotes the number of consecutive symbols allowing the PDCCH to be monitored within one span. In this case, the UE may monitor the PDCCH from an interval up to Y symbols from the first symbol of the span within the span.

Figure 5B:
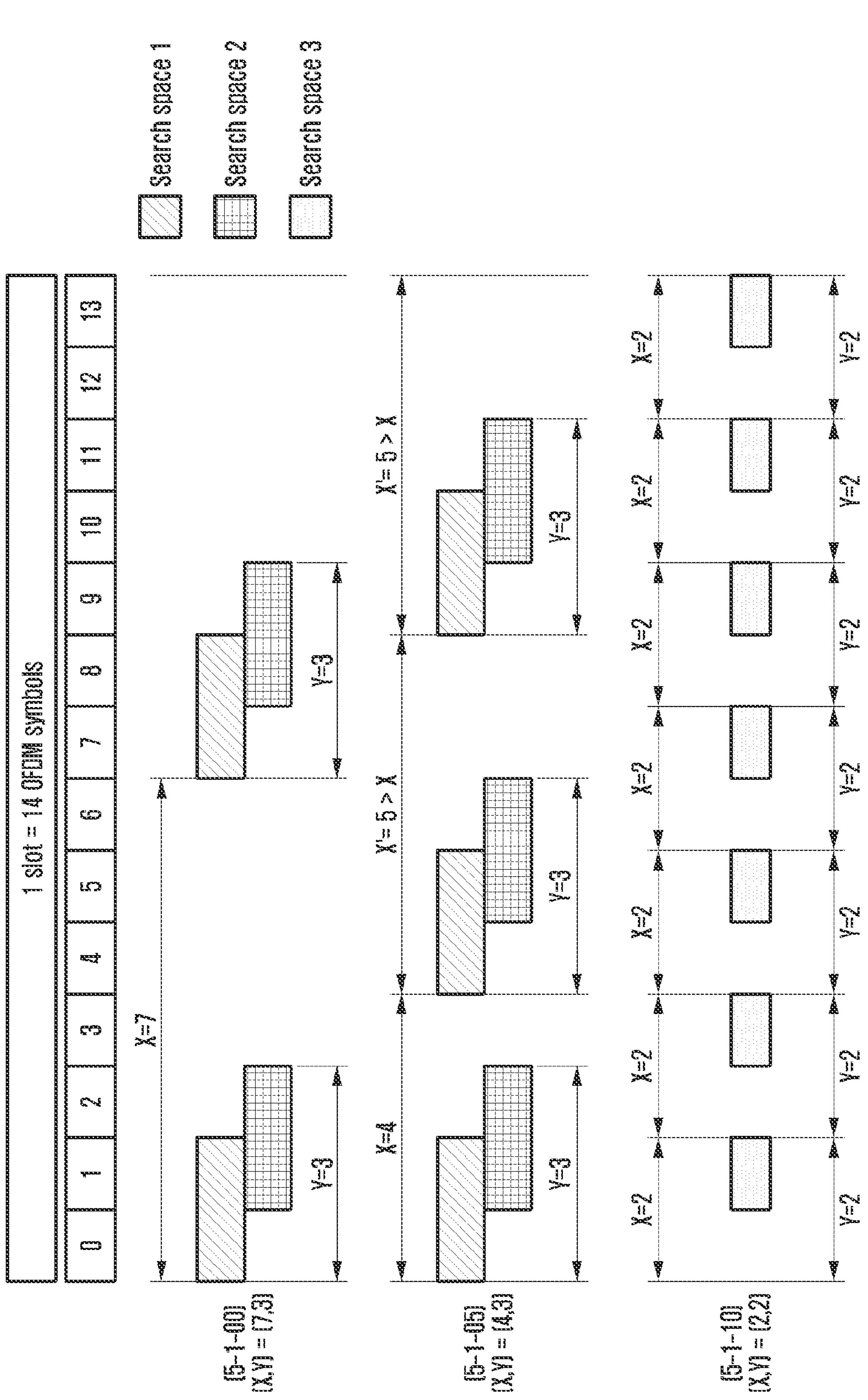
FIG. 5B illustrates, through a span, a case in which a UE is capable of having a plurality of PDCCH monitoring positions within a slot in a wireless communication system according to an embodiment.

FIG. 5B illustrates, through a span, a case in which a UE is capable of having a plurality of PDCCH monitoring positions within a slot in a wireless communication system. The span (X, Y) may be (7, 3), (4, 3), and (2, 2), which are indicated by (5-1-00), (5-1-05), and (5-1-10), respectively, in FIG. 5B. For example, (5-1-00) indicates a case in which two spans each expressed as (7, 3) exist in the slot. This shows that the interval between the first symbols of two spans is expressed as X=7, the PDCCH monitoring positions may exist within a total of Y=3 symbols from the first symbol of each span, and search spaces 1 and 2 exist within Y=3 symbols.

In another example, (5-1-05) indicates a case in which three spans each expressed as (4, 3) exist in the slot, and the second and third spans are spaced apart by X'=5 which is greater than X=4.

PDCCH: UE Capability Report

The slot positions at which the above-described common search space and UE-specific search space are located are indicated by the monitoringSymbolsWithinSlot parameter of Table 11-1, and the symbol position within the slot is indicated by a bitmap through the monitoringSymbolsWithinSlot parameter of Table 9. On the other hand, the symbol position within the slot that allows the UE to monitor the search space may be reported to the base station through the following UE capabilities:

- UE capability 1 (hereinafter referred to as FG 3-1). As shown in Table 11-1 below, this UE capability means that in case where one monitoring occasion (MO) for type 1 and type 3 common search space or UE-specific search space exists in a slot, it is possible to monitor the MO when the MO is within the first 3 symbols. This UE capability is a mandatory capability that all NR-supporting UEs should support, and whether this capability is supported is not explicitly reported to the base station.

TABLE 11-1

| Index | Feature group | Components | Field name in TS 38.331 [2] |
|---|---|---|---|
| 3-1 | Basic DL control channel | 1) One configured CORESET per BWP per cell in addition to CORESET0<br>CORESET resource allocation of 6RB bit-map and duration of 1-3 OFDM symbols for FR1<br>For type 1 CSS without dedicated RRC configuration and for type 0, 0A, and 2 CSSs, CORESET resource allocation of 6RB bit-map and duration 1-3 OFDM symbols for FR2<br>For type 1 CSS with dedicated RRC configuration and for type 3 CSS, UE specific SS, CORESET resource allocation of 6RB bit-map and duration 1-2 OFDM symbols for FR2<br>REG-bundle sizes of 2/3 RBs or 6 RBs<br>Interleaved and non-interleaved CCE-to-REG mapping<br>Precoder-granularity of REG-bundle size<br>PDCCH DMRS scrambling determination<br>TCI state(s) for a CORESET configuration<br>2) CSS and UE-SS configurations for unicast PDCCH transmission per BWP per cell<br>PDCCH aggregation levels 1, 2, 4, 8, 16<br>UP to 3 search space sets in a slot for a scheduled SCell per BWP<br>This search space limit is before applying all dropping rules.<br>For type 1 CSS with dedicated RRC configuration, type 3 CSS, and UE-SS, the monitoring occasion is within the first 3 OFDM symbols of a slot<br>For type 1 CSS without dedicated RRC configuration and for type 0, 0A, and 2 CSS, the monitoring occasion can be any OFDM symbol(s) of a slot, with the monitoring occasions for any of Type 1 - CSS without dedicated RRC configuration, or Types 0, 0A, or 2 CSS | n/a |

TABLE 11-1-continued

| Index | Feature group | Components | Field name in TS 38.331 [2] |
|---|---|---|---|
| | | configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | |

UE capability 2 (hereinafter referred to as FG 3-2). As shown in Table 11-2 below, this UE capability means that in case where one MO for a common search space or UE-specific search space exists in a slot, it is possible to monitor the MO regardless of the start symbol position of the MO. This UE capability can be optionally supported by the UE, and whether this capability is supported is explicitly reported to the base station.

TABLE 11-2

| Index | Feature group | Components | Field name in TS 38.331 [2] |
|---|---|---|---|
| 3-2 | PDCCH monitoring on any span of up to 3 consecutive OFDM symbols of a slot | For a given UE, all search space configurations are within the same span of 3 consecutive OFDM symbols in the slot | pdcchMonitoringSingleOccasion |

UE capability 3 (hereinafter referred to as FG 3-5, 3-5a, 3-5b). As shown in Table 11-3 below, this UE capability indicates a pattern of MO allowing the UE to monitor in case where a plurality of MOs for a common search space or UE-specific search space exist in a slot. The above-mentioned pattern composed of an interval X between start symbols of different MOs, and a maximum symbol length Y for one MO. A combination of (X, Y) supported by the UE may be one or more of {(2, 2), (4, 3), (7, 3)}. This UE capability is optionally supported by the UE, and whether this capability is supported and the above-mentioned (X, Y) combination are explicitly reported to the base station.

TABLE 11-3

| Index | Feature group | Components | Field name in TS 38.331 [2] |
|---|---|---|---|
| 3-5 | For type 1 CSS with dedicated RRC configuration, type 3 CSS, and UE-SS, monitoring occasion can be any | For type 1 CSS with dedicated RRC configuration, type 3 CSS, and UE-SS, monitoring occasion can be any OFDM symbol(s) of a slot for Case 2 | pdcch-MonitoringAnyOccasions {3-5. withoutDCI-Gap 3-5a. withDCI-Gap} |

TABLE 11-3-continued

| Index | Feature group | Components | Field name in TS 38.331 [2] |
| --- | --- | --- | --- |
| | OFDM symbol(s) of a slot for Case 2 | | |
| 3-5a | For type 1 CSS with dedicated RRC configuration, type 3 CSS, and UE-SS, monitoring occasion can be any OFDM symbol(s) of a slot for Case 2 with a DCI gap | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as<br>2OFDM symbols for 15 kHz<br>4OFDM symbols for 30 kHz<br>7OFDM symbols for 60 kHz with NCP<br>11OFDM symbols for 120 kHz<br>Up to one unicast DL DCI and up to one unicast UL DCI in a monitoring occasion except for the monitoring occasions of FG3-1.<br>In addition for TDD the minimum separation between the first two UL unicast DCIs within the first 3 OFDM symbols of a slot can be zero OFDM symbols. | |
| 3-5b | All PDCCH monitoring occasion can be any OFDM symbol(s) of a slot for Case 2 with a span gap | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(1), 0 <= 1 <= 13 is generated, where b(1) = 1 if symbol 1 of any slot is part of a monitoring occasion, b(1) = 0 otherwise. The first span in the span pattern begins at the smallest 1 for which b(1) = 1. The next span in the span pattern begins at the smallest 1 not included in the previous span(s) for which b(1) = 1. The span duration is max {maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary.<br>For the set of monitoring occasions which are within the same span: | |

TABLE 11-3-continued

| Index | Feature group | Components | Field name in TS 38.331 [2] |
|---|---|---|---|
| | | •Processing one unicast DCI scheduling DL and one unicast DCI scheduling UL per scheduled CC across this set of monitoring occasions for FDD<br>•Processing one unicast DCI scheduling DL and two unicast DCI scheduling UL per scheduled CC across this set of monitoring occasions for TDD<br>•Processing two unicast DCI scheduling DL and one unicast DCI scheduling UL per scheduled CC across this set of monitoring occasions for TDD<br>The number of different start symbol indices of spans for all PDCCH monitoring occasions per slot, including PDCCH monitoring occasions of FG-3-1, is no more than floor(14/X) (X is minimum among values reported by UE).<br>The number of different start symbol indices of PDCCH monitoring occasions per slot including PDCCH monitoring occasions of FG-3-1, is no more than 7.<br>The number of different start symbol indices of PDCCH monitoring occasions per half-slot including PDCCH monitoring occasions of FG-3-1 is no more than 4 in SCell. | |

The UE may report whether the UE capability 2 and/or the UE capability 3 are/is supported and related parameters to the base station. The base station may perform TDRA for the common search space and the UE-specific search space, based on the reported UE capability. Upon allocating the resources, the base station may prevent the MO from being located at a position where the UE cannot monitor.

PDCCH: BD/CCE Limit

In case that a plurality of search space sets are configured for the UE, the following conditions may be considered in a method for determining a search space set to be monitored by the UE.

If the value of monitoringCapabilityConfig-r16, which is higher layer signaling, is configured as r15monitoringcapability for the UE, the UE defines, for each slot, the maximum number of PDCCH candidates that can be monitored and the maximum number of CCEs constituting the entire search space (here, the entire search space refers to the entire CCE set corresponding to the union area of a plurality of search space sets). If the value of monitoringCapabilityConfig-r16, which is higher layer signaling, is configured as r16monitoringcapability for the UE, the UE defines, for each span, the maximum number of PDCCH candidates that can be monitored and the maximum number of CCEs constituting the entire search space (here, the entire search space refers to the entire CCE set corresponding to the union area of a plurality of search space sets).

Condition 1: Limitation of the Maximum Number of PDCCH Candidates

As described above, depending on the configuration value of higher layer signaling, $M^{\mu}$, the maximum number of PDCCH candidates that the UE can monitor, may follow Table 12-1 below when defined based on a slot in a cell configured with a subcarrier spacing of $15 \cdot 2^{\mu}$ kHz, and may follow Table 12-2 below when defined based on a span.

TABLE 12-1

| $\mu$ | Maximum number of PDCCH candidates per slot and per serving cell ($M^{\mu}$) |
|---|---|
| 0 | 44 |
| 1 | 36 |
| 2 | 22 |
| 3 | 20 |

TABLE 12-2

| | Maximum number $M^{\mu}$ of monitored PDCCH candidates per span for combination (X, Y) and per serving cell | | |
|---|---|---|---|
| $\mu$ | (2, 2) | (4, 3) | (7, 3) |
| 0 | 14 | 28 | 44 |
| 1 | 12 | 24 | 36 |

Condition 2: Limitation of the Maximum Number of CCEs

As described above, depending on the configuration value of higher layer signaling, $C^{\mu}$, the maximum number of CCEs constituting the entire search space (here, the entire search space refers to the entire CCE set corresponding to the union area of a plurality of search space sets), may follow Table 12-3 below when defined based on a slot in a cell configured with a subcarrier spacing of $15 \cdot 2^{\mu}$ kHz, and may follow Table 12-4 below when defined based on a span.

TABLE 12-3

| $\mu$ | Maximum number of non-overlapped CCEs per slot and per serving cell ($C^{\mu}$) |
|---|---|
| 0 | 56 |
| 1 | 56 |
| 2 | 48 |

TABLE 12-3-continued

| μ | Maximum number of non-overlapped CCEs per slot and per serving cell ($C^{\mu}$) |
|---|---|
| 3 | 32 |

TABLE 12-4

| μ | Maximum number $C^{\mu}$ of non-overlapped CCEs per span for combination (X, Y) and per serving cell | | |
|---|---|---|---|
| | (2, 2) | (4, 3) | (7, 3) |
| 0 | 18 | 36 | 56 |
| 1 | 18 | 36 | 56 |

For convenience of explanation, a situation in which both the Conditions 1 and 2 are satisfied at a specific time point is defined as "Condition A". Accordingly, not satisfying Condition A may mean not satisfying at least one of the above Conditions 1 and 2.

PDCCH: Overbooking

Depending on the configuration of the search space sets by the base station, there may be a case in which Condition A is not satisfied at a specific time point. If Condition A is not satisfied at a specific time point, the UE may select and monitor only some of the search space sets configured to satisfy Condition A at that time point, and the base station may transmit the PDCCH in the selected search space set.

A method of selecting some search spaces from among all the configured search space set may be as follows:

If Condition A for the PDCCH is not satisfied at a specific time point (slot), the UE (or the base station) may preferentially select, from among search space sets existing at that time point, a search space set having a search space type configured as the common search space over a search space set configured as the UE-specific search space.

In case that all search space sets configured as the common search space are selected (that is, when Condition A is satisfied even after all search spaces configured as the common search space are selected), the UE (or the base station) may select search space sets configured as the UE-specific search space. In this case, if there are a plurality of search space sets configured as the UE-specific search space, a search space set having a low search space set index may have a higher priority. In consideration of such a priority, the UE-specific search space sets may be selected within a range of satisfying Condition A.

DRX

Figure 6:
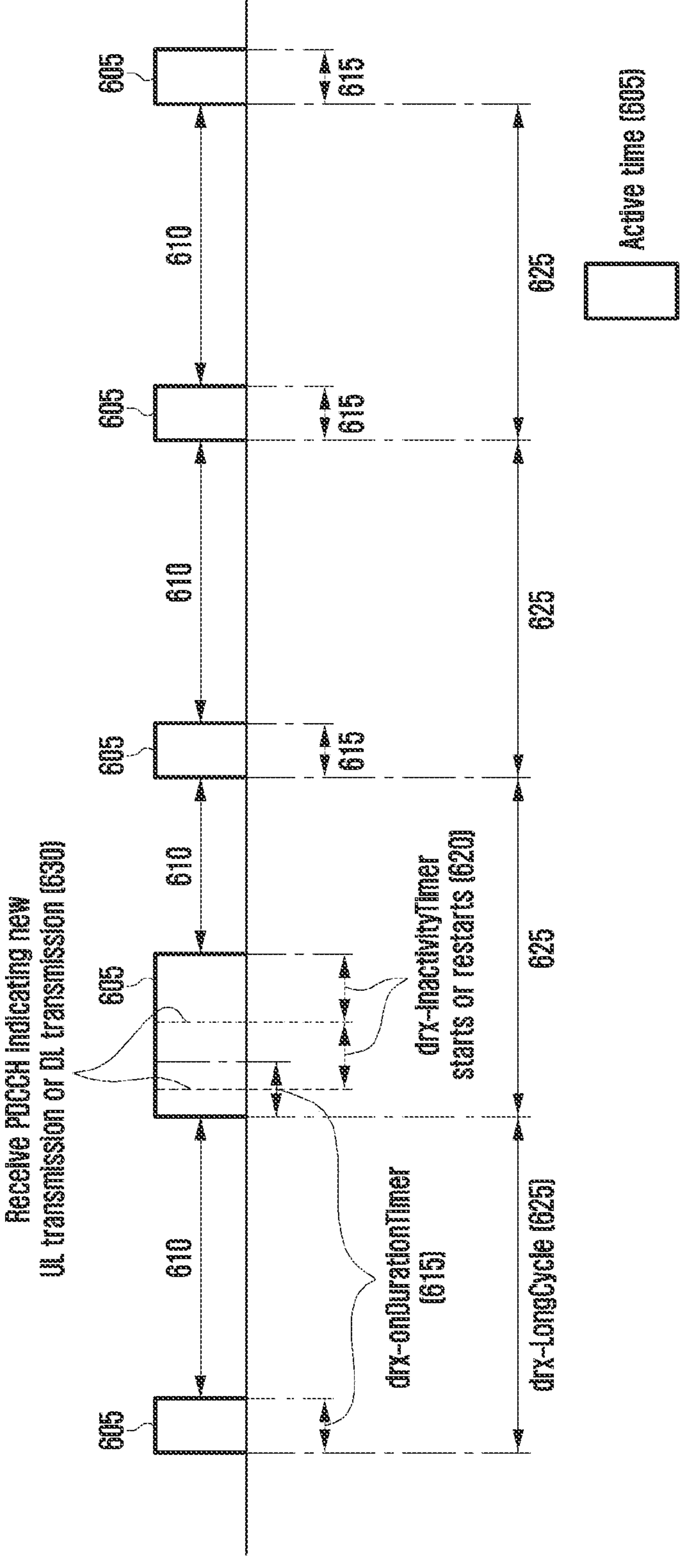
FIG. 6 illustrates a DRX operation in a wireless communication system according to an embodiment.

FIG. 6 is a diagram illustrating a discontinuous reception (DRX).

The DRX is an operation that the UE using a service discontinuously receives data in an RRC connected state in which a radio link is established between the base station and the UE. When the DRX is applied, the UE may turn on a receiver at a specific time point to monitor a control channel and, if there is no data received for a certain period of time, turn off the receiver to reduce power consumption thereof. The DRX operation may be controlled by a MAC layer device, based on various parameters and timers.

Referring to FIG. 6, an active time 605 is a time during which the UE wakes up every DRX cycle and monitors the PDCCH.

The active time 605 may be defined as:

drx-onDurationTimer or drx-InactivityTimer or drx-RetransmissionTimerDL or drx-RetransmissionTimerUL or ra-ContentionResolutionTimer is running; or A Scheduling Request is sent on PUCCH and is pending; or A PDCCH indicating a new transmission addressed to the C-RNTI of the MAC entity has not been received after successful reception of a Random Access Response for the Random Access Preamble not selected by the MAC entity among the contention-based Random Access Preamble The drx-onDurationTimer, the drx-InactivityTimer, the drx-RetransmissionTimerDL, the drx-RetransmissionTimerUL, the ra-ContentionResolutionTimer, etc. are timers whose values are configured by the base station, and have a function of configuring the UE to monitor the PDCCH in a situation where a predetermined condition is satisfied.

The drx-onDurationTimer 615 is a parameter for setting the minimum time during which the UE is awake in the DRX cycle. The drx-InactivityTimer 620 is a parameter for setting an additional awake time of the UE when a PDCCH 630 indicating new UL transmission or DL transmission is received. The drx-RetransmissionTimerDL is a parameter for setting the maximum time during which the UE is awake in order to receive DL retransmission in the DL hybrid automatic repeat request (HARQ) procedure. The drx-RetransmissionTimerUL is a parameter for setting the maximum time during which the UE is awake in order to receive an UL retransmission grant in the UL HARQ procedure. The drx-onDurationTimer, the drx-InactivityTimer, the drx-RetransmissionTimerDL, and the drx-RetransmissionTimerUL may be configured with, for example, a time, the number of subframes, the number of slots, and the like. The ra-ContentionResolutionTimer is a parameter for monitoring the PDCCH in the random access procedure.

An inactive time 610 is a time configured not to monitor the PDCCH or a time configured not to receive the PDCCH during the DRX operation. The remaining time excluding the active time 605 from the entire time for performing the DRX operation may be the inactive time 610. If the UE does not monitor the PDCCH during the active time 405, it may enter a sleep or inactive state and thereby reduce power consumption.

The DRX cycle refers to a cycle in which the UE wakes up and monitors the PDCCH. That is, it refers to a time interval from UE's monitoring a PDCCH to monitoring the next PDCCH or an on-duration generation period. There are two types of DRX cycle, i.e., a short DRX cycle and a long DRX cycle. The short DRX cycle may be optionally applied. The long DRX cycle 625 is the longer cycle of two DRX cycles configured in the UE. While operating in the long DRX cycle, the UE starts again the drx-onDurationTimer 615 when the long DRX cycle 625 has elapsed from a starting point (e.g., start symbol) of the drx-onDurationTimer 615. In case of operating in the long DRX cycle 425, the UE may start the drx-onDurationTimer 615 in a slot after drx-SlotOffset in a subframe satisfying Equation (2), below. Here, drx-SlotOffset refer to a delay before the drx-onDurationTimer 615 starts. For example, drx-SlotOffset may be configured with a time, the number of slots, and the like.

$$[(\mathrm{SFN}\times 10)+\text{subframe number}] \text{ modulo } (\text{drx-LongCycle})=\text{drx-StartOffset} \quad (2)$$

In this case, drx-LongCycleStartOffset and drx-StartOffset may be used to define a subframe in which the long DRX cycle 625 will start. For example, drx-LongCycleStartOffset may be configured with a time, the number of subframes, the number of slots, and the like.

QCL, TCI State

In a wireless communication system, one or more different antenna ports (or one or more channels, signals, and combinations thereof may be replaced, but in the following description of the disclosure, they will be referred to as different antenna ports for convenience) may be associated with each other by QCL configuration as shown in Table 13 below. The TCI state is for announcing the QCL relationship between the PDCCH (or PDCCH DMRS) and other RS or channel, and saying that a certain reference antenna port A (reference RS #A) and another target antenna port B (target RS #B) are QCLed to each other means that the UE is allowed to apply some or all of large-scale channel parameters estimated at the antenna port A to channel measurement from the antenna port B. In the QCL relationship, it may be necessary to associate different parameters depending on situations, such as 1) time tracking affected by average delay and delay spread, 2) frequency tracking affected by Doppler shift and Doppler spread, 3) radio resource management (RRM) affected by average gain, and 4) beam management (BM) affected by spatial parameter. Accordingly, the NR supports four types of QCL relationships as shown in Table 13 below.

TABLE 13

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may collectively refer to some or all of various parameters such as angle of arrival (AoA), power angular spectrum (PAS) of AoA, angle of departure (AoD), PAS of AoD, transmit/receive channel correlation, transmit/receive beamforming, and spatial channel correlation.

The QCL relationship can be configured to the UE through RRC parameter TCI-State and QCL-Info as shown in Table 14 below. With reference to Table 14, below, the base station may configure one or more TCI states to the UE and inform the RS referring to the ID of the TCI state, that is, up to two QCL relationships (qcl-Type1, qcl-Type2) for the target RS. In this case, each QCL information (QCL-Info) included in each TCI state includes a serving cell index and BWP index of a reference RS indicated by that QCL information, the type and ID of the reference RS, and the QCL type as shown in Table 13, above.

TABLE 14

```
TCI-State :=                SEQUENCE {
    tci-StateId                 TCI-StateId,
    (ID of TCI state)
    qcl-Type1                   QCL-Info,
    (QCL information of 1st reference RS of RS (target RS) referring to TCI state ID)
    qcl-Type2                   QCL-Info                    OPTIONAL,   -- Need
R
    (QCL information of 2nd reference RS of RS (target RS) referring to TCI state ID)
    ...
}
QCL-Info ::=                SEQUENCE {
    cell                    ServCellIndex                   OPTIONAL,   -- Need R
    (serving cell index of reference RS indicated by QCL information)
    bwp-Id                          BWP-Id                      OPTIONAL, -- Cond
CSI-RS-Indicated
    (BWP index of reference RS indicated by QCL information)
    referenceSignal                 CHOICE {
        csi-rs                          NZP-CSI-RS-ResourceId,
        ssb                             SSB-Index
        (one of CSI-RS ID or SSB ID indicated by QCL information)
    },
    qcl-Type                        ENUMERATED {typeA, typeB, typeC, typeD},
    ...
}
```

Figure 7:
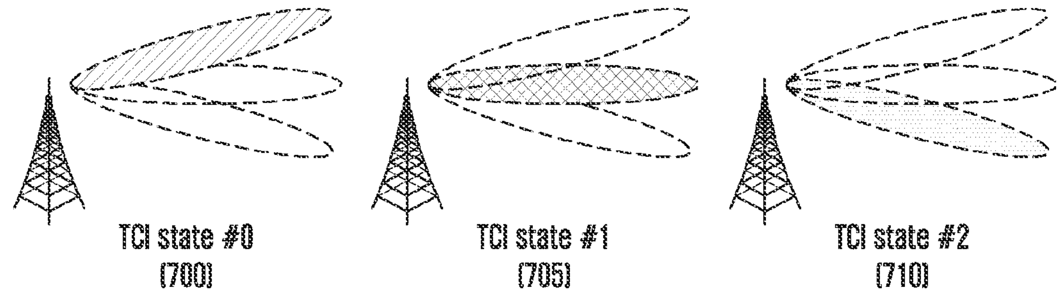
FIG. 7 illustrates base station beam allocation depending on TCI state configuration in a wireless communication system according to an embodiment.

FIG. 7 illustrates base station beam allocation depending on TCI state configuration. With reference to FIG. 7, the base station may transmit information on N different beams to the UE through N different TCI states. For example, in case of N=3 as shown in FIG. 7, the base station may enable qcl-Type2 parameters included in three TCI states 700, 705, and 710 to be associated with respective CSI-RSs or SSBs corresponding to different beams, and to be configured as QCL type D, thereby announcing that antenna ports referring to the different TCI states 700, 705, and 710 are associated with different spatial Rx parameters, that is, different beams.

Tables 15-1 to 15-5 below show valid TCI state configurations depending on target antenna port types.

Table 15-1 shows the valid TCI state configuration in case that the target antenna port is CSI-RS for tracking (TRS). The TRS refers to, among CSI-RSs, a non-zero power (NZP) CSI-RS in which a repetition parameter is not configured and trs-Info is configured to true. In case of configuration 3 in Table 15-1, it can be used for aperiodic TRS.

TABLE 15-1

Valid TCI state configuration in case that the target antenna port is CSI-RS for tracking (TRS)

| Valid TCI state Configuration | DLRS 1 | qcl-Type 1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS | QCL-TypeA | TRS (same as | QCL-TypeD |

TABLE 15-1-continued

| Valid TCI state configuration in case that the target antenna port is CSI-RS for tracking (TRS) | | | | |
|---|---|---|---|---|
| Valid TCI state Configuration | DLRS 1 | qcl-Type 1 | DL RS 2 (if configured) | qcl-Type2 (if configured) |
| | (periodic) | | DLRS 1) | |

Table 15-2 shows the valid TCI state configuration in case that the target antenna port is CSI-RS for CSI. The CSI-RS for CSI refers to, among CSI-RSs, an NZP CSI-RS in which a repetition parameter is not configured and trs-Info is also not configured to true.

TABLE 15-2

| Valid TCI state configuration in case that the target antenna port is CSI-RS for CSI | | | | |
|---|---|---|---|---|
| Valid TCI state Configuration | DLRS 1 | qcl-Type 1 | DL RS 2 (if configured) | qcl-Type2 (if configured) |
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DLRS 1) | QCL-TypeD |
| 4 | TRS | QCL-TypeB | | |

Table 15-3 shows the valid TCI state configuration in case that the target antenna port is CSI-RS for beam management (BM, having the same meaning as CSI-RS for L1 RSRP reporting). The CSI-RS for BM refers to, among CSI-RSs, an NZP CSI-RS in which a repetition parameter is configured and has a value of On or Off and trs-Info is not configured to true.

TABLE 15-3

| Valid TCI state configuration in case that the target antenna port is CSI-RS for BM (for L1 RSRP reporting) | | | | |
|---|---|---|---|---|
| Valid TCI state Configuration | DL RS 1 | qcl-Type 1 | DL RS 2 (if configured) | qcl-Type2 (if configured) |
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH block | QCL-TypeC | SS/PBCH block | QCL-TypeD |

Table 15-4 shows the valid TCI state configuration in case that the target antenna port is PDCCH DMRS.

TABLE 15-4

| Valid TCI state configuration in case that the target antenna port is PDCCH DMRS | | | | |
|---|---|---|---|---|
| Valid TCI state Configuration | DL RS 1 | qcl-Type 1 | DL RS 2 (if configured) | qcl-Type2 (if configured) |
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 15-5 shows the valid TCI state configuration in case that the target antenna port is PDSCH DMRS.

TABLE 15-5

| Valid TCI state configuration in case that the target antenna port is PDSCH DMRS | | | | |
|---|---|---|---|---|
| Valid TCI state Configuration | DL RS 1 | qcl-Type 1 | DL RS 2 (if configured) | qcl-Type2 (if configured) |
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

A representative QCL configuration method according to Tables 15-1 to 15-5 is to set and operate the target antenna port and the reference antenna port for each step to "SSB"→"TRS"→"CSI-RS for CSI, or CSI-RS for BM, or PDCCH DMRS, or PDSCH DMRS". Through this, it is possible to assist the reception operation of the UE by associating the statistical characteristics that can be measured from the SSB and the TRS even with each antenna port.

PDCCH: Related to TCI State

Specifically, TCI state combinations applicable to the PDCCH DMRS antenna port are shown in Table 16 below. The fourth row in Table 16 is a combination assumed by the UE before RRC configuration, and configuration after RRC is not possible.

TABLE 16

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
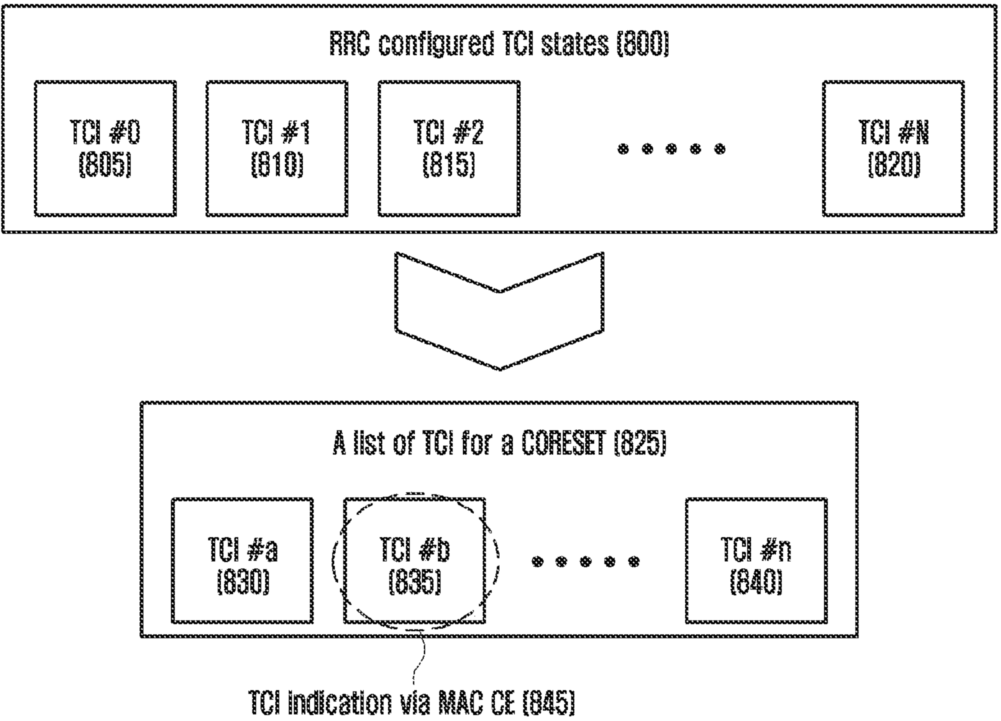
FIG. 8 illustrates a TCI state allocation method for a PDCCH in a wireless communication system according to an embodiment.

In the NR system, a hierarchical signaling method as shown in FIG. 8 is supported for dynamic allocation of a PDCCH beam.

FIG. 8 illustrates a TCI state allocation method for a PDCCH in a wireless communication system according to an embodiment. With reference to FIG. 8, the base station may configure N TCI states 805, 810, . . . , 820 to the UE through RRC signaling 800, and configure some of them as TCI states for CORESET 825. Thereafter, the base station may indicate one of TCI states 830, 835, and 840 for CORESET to the UE through MAC CE signaling 845. Thereafter, the UE receives the PDCCH based on beam information contained in the TCI state indicated by the MAC CE signaling.

Figure 9:
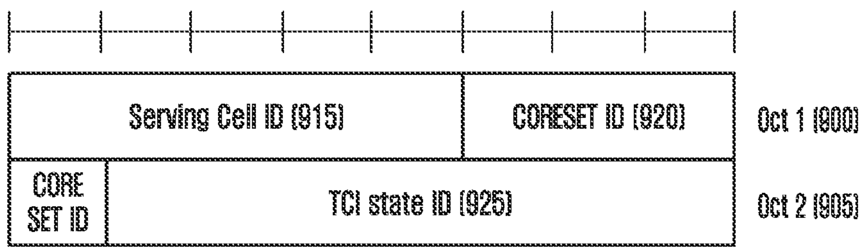
FIG. 9 illustrates a TCI indication MAC CE signaling structure for PDCCH DMRS in a wireless communication system according to an embodiment.

FIG. 9 illustrates a TCI indication MAC CE signaling structure for the PDCCH DMRS. With reference to FIG. 9, the TCI indication MAC CE signaling for the PDCCH DMRS consists of 2 bytes (16 bits), and contains a 5-bit serving cell ID 915, a 4-bit CORESET ID 920, and a 7-bit TCI state ID 925.

Figure 10:
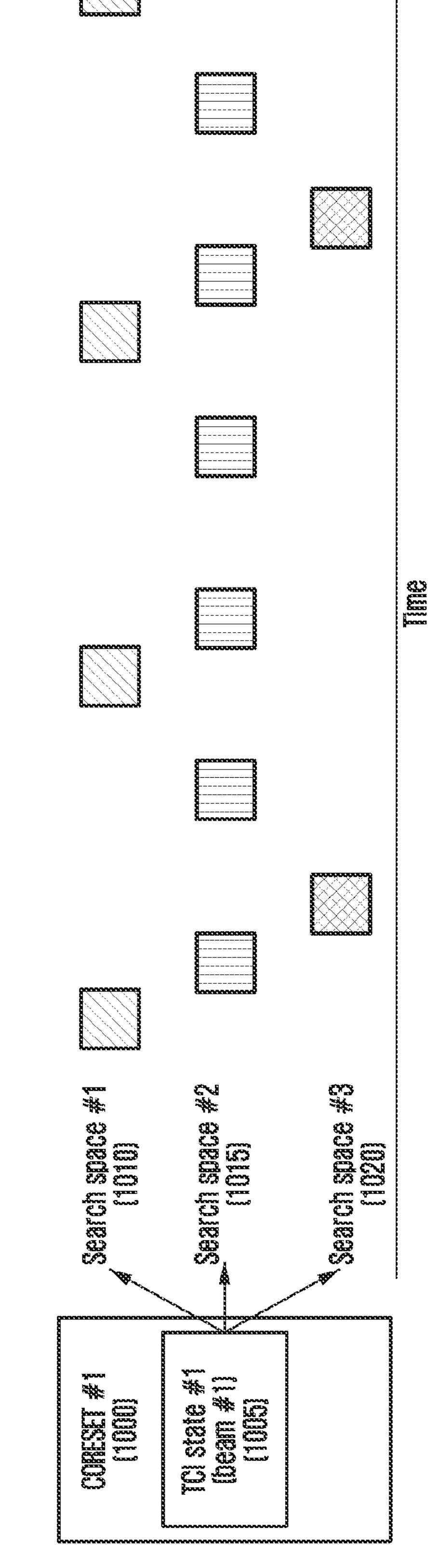
FIG. 10 illustrates a CORESET and a beam configuration of a search space in a wireless communication system according to an embodiment.

FIG. 10 illustrates a CORESET and a beam configuration of a search space according to the above description. With reference to FIG. 10, the base station may indicate one 1005 of TCI state lists contained in CORESET configuration 1000 through MAC CE signaling. After that, until another TCI state is indicated to the corresponding CORESET through another MAC CE signaling, the UE considers that the same QCL information (beam #1) 1005 is applied to one or more search spaces 1010, 1015, and 1020 connected to the CORESET. The above-described PDCCH beam allocation method has a disadvantage in that it is difficult to indicate a beam change faster than the MAC CE signaling delay, and the same beam is collectively applied to all CORESETs regardless of search space characteristics, thereby causing the flexible operation of PDCCH beam to be difficult. Hereinafter, embodiments provide a more flexible PDCCH beam configuration and operation method. In the following embodiments, several distinguished examples are provided for convenience of description, but these are not mutually exclusive and may be applied by appropriately combining with each other according to circumstances.

The base station may configure one or a plurality of TCI states for a specific control resource set to the UE, and may activate one of the configured TCI states through a MAC CE activation command. For example, {TCI state #0, TCI state #1, TCI state #2} is configured as the TCI state in the control resource set #1, and the base station may transmit, to the UE through the MAC CE, a command for activating to assume the TCI state #0 as the TCI state for the control resource set #1. Based on the activation command for the TCI state received via the MAC CE, the UE may correctly receive the DMRS of the corresponding control resource set based on QCL information in the activated TCI state.

With respect to the control resource set #0 in which the index is configured to 0, if the UE does not receive the MAC CE activation command for the TCI state of the control resource set #0, the UE may assume that the DMRS transmitted in the control resource set #0 is QCLed with the SS/PBCH block identified in the initial access procedure or in the non-contention-based random access procedure that is not triggered by the PDCCH command.

With respect to the control resource set #X in which the index is configured to a value other than 0, if the UE is not configured with the TCI state for the control resource set #X, or if the UE is configured with one or more TCI states, but the UE does not receive the MAC CE activation command for activating one of them, the UE may assume that the DMRS transmitted in the control resource set #X is QCLed with the SS/PBCH block identified in the initial access procedure.

Rate Matching/Puncturing Related

Hereinafter, a rate matching operation and a puncturing operation will be described in detail.

In case that a time and frequency resource A to transmit a certain symbol sequence A overlaps with another time and frequency resource B, the rate matching or puncturing operation may be considered for the transmission/reception operation of a channel A considering an overlap resource C between the resources A and B. The specific operation may be as follows:

Rate Matching Operation

The base station may map the channel A only for the remaining resource region except for the resource C overlapping with the resource B in the entire resource A for transmitting the symbol sequence A to the UE. For example, in case that the symbol sequence A is composed of {symbol #1, symbol #2, symbol #3, symbol 4}, the resource A is {resource #1, resource #2, resource #3, resource #4}, and the resource B is {resource #3, resource #5}, the base station may sequentially map the symbol sequence A to {resource #1, resource #2, resource #4}, which is the remaining resources except for {resource #3} corresponding to the resource C in the resource A. As a result, the base station may map the symbol sequence {symbol #1, symbol #2, symbol #3} to {resource #1, resource #2, resource #4} and transmit it.

The UE may determine the resource A and the resource B from scheduling information for the symbol sequence A from the base station, and thus determine the resource C, which is an overlap region between the resources A and B. The UE may receive the symbol sequence A, assuming that the symbol sequence A is mapped and transmitted in the remaining region except for the resource C in the entire resource A. For example, in case that the symbol sequence A is composed of {symbol #1, symbol #2, symbol #3, symbol 4}, the resource A is {resource #1, resource #2, resource #3, resource #4}, and the resource B is {resource #3, resource #5}, the UE may receive the symbol sequence A on the assumption that it is mapped to {resource #1, resource #2, resource #4}, which are the remaining resources except for {resource #3} corresponding to resource C in the resource A. As a result, the UE may perform the subsequent reception operation on the assumption that the symbol sequence {symbol #1, symbol #2, symbol #3} is mapped to {resource #1, resource #2, resource #4} and transmitted.

Puncturing Operation

In case that there is the resource C corresponding to a region overlapping with the resource B in the entire resource A for transmitting the symbol sequence A to the UE, the symbol sequence A is mapped to the entire resource A, but the transmission may be performed only in the remaining resource region except for the resource C in the resource A. For example, in case that the symbol sequence A is composed of {symbol #1, symbol #2, symbol #3, symbol 4}, the resource A is {resource #1, resource #2, resource #3, resource #4}, and the resource B is {resource #3, resource #5}, the base station may map the symbol sequence A {symbol #1, symbol #2, symbol #3, symbol #4} to the resource A {resource #1, resource #2, resource #3, resource #4}, transmit only a symbol sequence {symbol #1, symbol #2, symbol #4} corresponding the remaining resources {resource #1, resource #2, resource #4} except for the resource C {resource #3} in the resource A, and not transmit {symbol #3} mapped to {resource #3} corresponding to the resource C. As a result, the base station may map the symbol sequence {symbol #1, symbol #2, symbol #4} to {resource #1, resource #2, resource #4} and transmit it.

The UE may determine the resource A and the resource B from scheduling information for the symbol sequence A from the base station, and thus determine the resource C, which is an overlap region between the resources A and B. The UE may receive the symbol sequence A, assuming that the symbol sequence A is mapped to the entire resource A, but transmitted only in the remaining region except for the resource C in the entire resource A. For example, in case that the symbol sequence A is composed of {symbol #1, symbol

#2, symbol #3, symbol 4}, the resource A is {resource #1, resource #2, resource #3, resource #4}, and the resource B is {resource #3, resource #5}, the UE may receive the symbol sequence A on the assumption that the symbol sequence A {symbol #1, symbol #2, symbol #3, symbol 4} is mapped to the resource A {resource #1, resource #2, resource #4}, but {symbol #3} mapped to {resource #3} corresponding to the resource C is not transmitted, and the symbol sequence {symbol #1, symbol #2, symbol #4} mapped to the remaining resources {resource #1, resource #2, resource #4} except for {symbol #3} corresponding to the resource C in the resource A is transmitted. As a result, the UE may perform the subsequent reception operation on the assumption that the symbol sequence {symbol #1, symbol #2, symbol #4} is mapped to {resource #1, resource #2, resource #4} and transmitted.

Hereinafter, a method of configuring a rate matching resource for the purpose of rate matching in a 5G communication system will be described. The rate matching refers to adjusting the size of a signal in consideration of the amount of resources capable of transmitting the signal. For example, the rate matching of a data channel may refer to not performing mapping and transmission of a data channel for a specific time and frequency resource region and thereby adjusting a data size.

FIG. 11 is a diagram illustrating a method for a base station and a UE to transmit and receive data in consideration of a DL data channel and a rate matching resource.

FIG. 11 shows a PDSCH 1101 and a rate matching resource 1102. The base station may configure one or more rate matching resources 1102 to the UE through higher layer signaling (e.g., RRC signaling). Configuration information of the rate matching resource 1102 may contain TDRA information 1103, frequency-domain resource allocation (FDRA) information 1104, and period information 1105. Hereinafter, a bitmap corresponding to the FDRA information 1104 will be referred to as a first bitmap, a bitmap corresponding to the TDRA information 1103 will be referred to as a second bitmap, and a bitmap corresponding to the period information 1105 will be referred to as a third bitmap. When all or part of the time and frequency resources of the scheduled data channel 1101 overlap with the configured rate matching resource 1102, the base station may rate-match the data channel 1101 in the rate matching resource 1102 and transmits it, and the UE may perform reception and decoding on the assumption that the data channel 1101 is rate-matched in the rate matching resource 1102.

Through additional configuration, the base station may dynamically notify the UE through DCI whether to rate-match the data channel in the configured rate matching resource (this corresponds to the rate matching indicator in the DCI format described above). Specifically, the base station may select some of the configured rate matching resources and group them into a rate matching resource group, and it may indicate to the UE, using a bitmap method with DCI, whether rate matching of the data channel for each rate matching resource group is performed. For example, in case that four rate matching resources, RMR #1, RMR #2, RMR #3, and RMR #4, are configured, the base station may configure, as rate matching groups, RMG #1={RMR #1, RMR #2}, RMG #2={RMR #3, RMR #4}, and indicate to the UE whether to perform rate matching in each of RMG #1 and RMG #2 with a bitmap by using 2 bits in the DCI field. For example, a case of having to perform rate matching may be indicated with "1", and a case of having to perform no rate matching may be indicated with "0".

In the 5G system, granularity of RB symbol level and RE level is supported as a method of configuring the above-described rate matching resource in the UE. Specifically, the configuration method is as follows:

RB Symbol Level

The UE may receive configuration of up to four RateMatchPatterns per BWP via higher layer signaling, and one RateMatchPattern may include the following contents:

- As a reserved resource in the BWP, a resource in which a time and frequency resource region of the reserved resource is configured with a combination of an RB-level bitmap and a symbol-level bitmap on the frequency axis may be included. The reserved resource may span one or two slots. Additionally, a time domain pattern (periodicityAndPattern) in which the time and frequency domain composed of each RB-level and symbol-level bitmap pair is repeated may be configured.
- A time and frequency domain resource region configured as a control resource set in the BWP and a resource region corresponding to a time domain pattern configured as a search space in which the corresponding resource region is repeated may be included.

RE Level

The UE may receive configuration of the following contents through higher layer signaling:

- As configuration information (lte-CRS-ToMatchAround) for RE corresponding to the LTE CRS (Cell-specific Reference Signal or Common Reference Signal) pattern, the number of ports (nrofCRS-Ports) and LTE-CRS-vshift(s) value (v-shift) of LTE CRS, the center subcarrier location information (carrierFreqDL) of the LTE carrier from the reference frequency point (e.g. reference point A), the bandwidth size information (carrierBandwidthDL) of the LTE carrier, the subframe configuration information (mbsfn-SubframConfigList) corresponding to MBSFN (Multicast-broadcast single-frequency network), and the like may be included. The UE may determine the location of the CRS in the NR slot corresponding to the LTE subframe, based on the above-described information.
- Configuration information for a resource set corresponding to one or more ZP (Zero Power) CSI-RSs in the BWP may be included.

PDCCH: Related to QCL Prioritization Rule

Hereinafter, the QCL prioritization operation for the PDCCH will be described in detail.

In case that the UE operates using carrier aggregation in a single cell or band, and a plurality of control resource sets existing within an activated BWP of a single or multiple cells have the same or different QCL-TypeD characteristics in a specific PDCCH monitoring occasion and overlap with each other in time, the UE may select a specific control resource set according to the QCL prioritization operation and monitor control resource sets having the same QCL-TypeD characteristics as the corresponding control resource set. That is, when a plurality of control resource sets overlap in time, only one QCL-TypeD characteristic can be received. In this case, rules for determining the QCL priority may be:

- Rule 1. In a cell corresponding to the lowest index among cells including a common search space, a control resource set connected to the common search space of the lowest index Rule 2. In a cell corresponding to the lowest index among cells including a UE-specific search space, a control resource set connected to the UE-specific search space of the lowest index If any one of the above rules is not met, the next rule is applied. For example, in case that control resource sets overlap in time in a specific PDCCH monitoring occasion, if all control resource sets are not connected to the common search space but to the UE-specific search space, that is, if Rule 1 is not met, the UE can omit applying Rule 1 and apply Rule 2.

In case of selecting the control resource set according to the above-mentioned rules, the UE may additionally consider the following two items for QCL information configured in the control resource set. First, if control resource set #1 has CSI-RS #1 as a reference signal having a QCL-TypeD relationship, if a reference signal in which the CSI-RS #1 has a QCL-TypeD relationship is SSB #1, and if a reference signal in which control resource set #2 has a QCL-TypeD relationship is SSB #1, the UE may consider that the two control resource sets #1 and #2 have different QCL-TypeD characteristics. Second, if the control resource set #1 has CSI-RS #1 configured in the cell #1 as a reference signal having a QCL-TypeD relationship, if a reference signal in which the CSI-RS #1 has a QCL-TypeD relationship is SSB #1, if the control resource set #2 has CSI-RS #2 configured in the cell #2 as a reference signal having a QCL-TypeD relationship, and if a reference signal in which the CSI-RS #2 has a QCL-TypeD relationship is the same SSB #1, the UE may consider that the two control resource sets have the same QCL-TypeD characteristic.

Figure 12A:
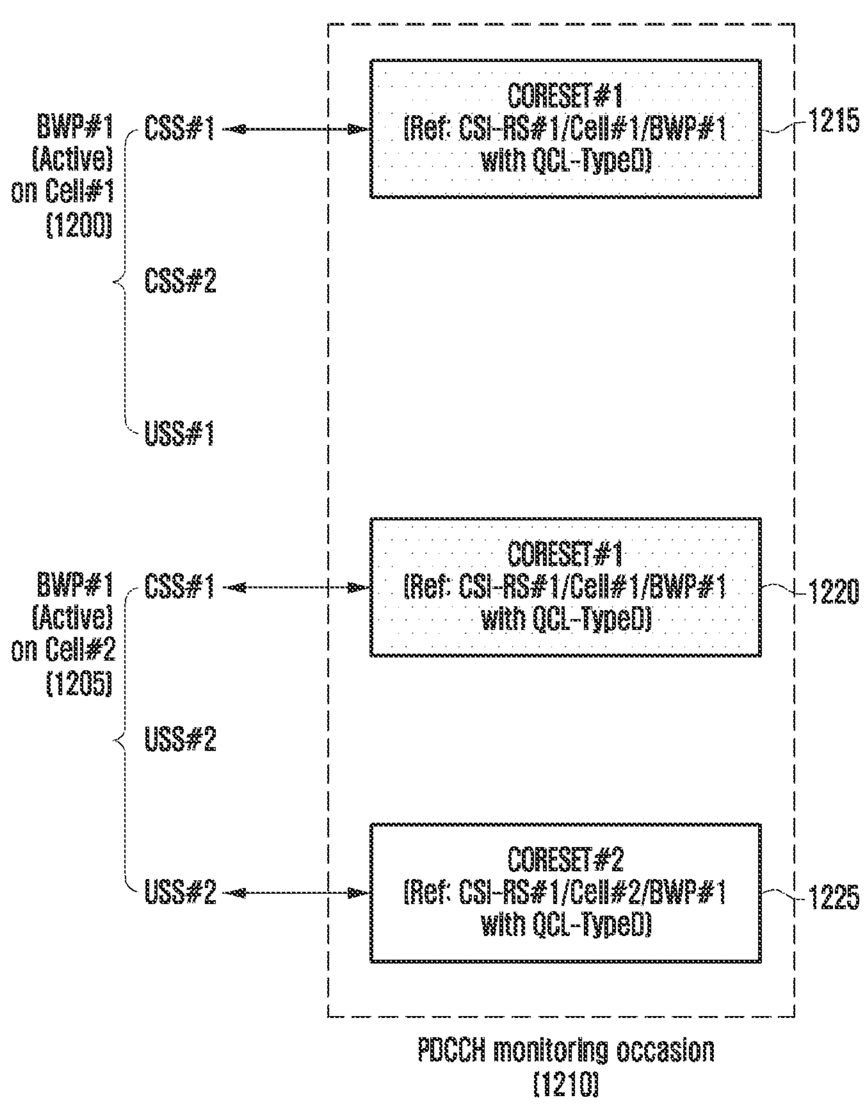
FIGS. 12A and 12B illustrate a method for a UE to select a receivable control resource set in consideration of priority upon receiving a downlink control channel in a wireless communication system according to an embodiment.
Figure 12B:
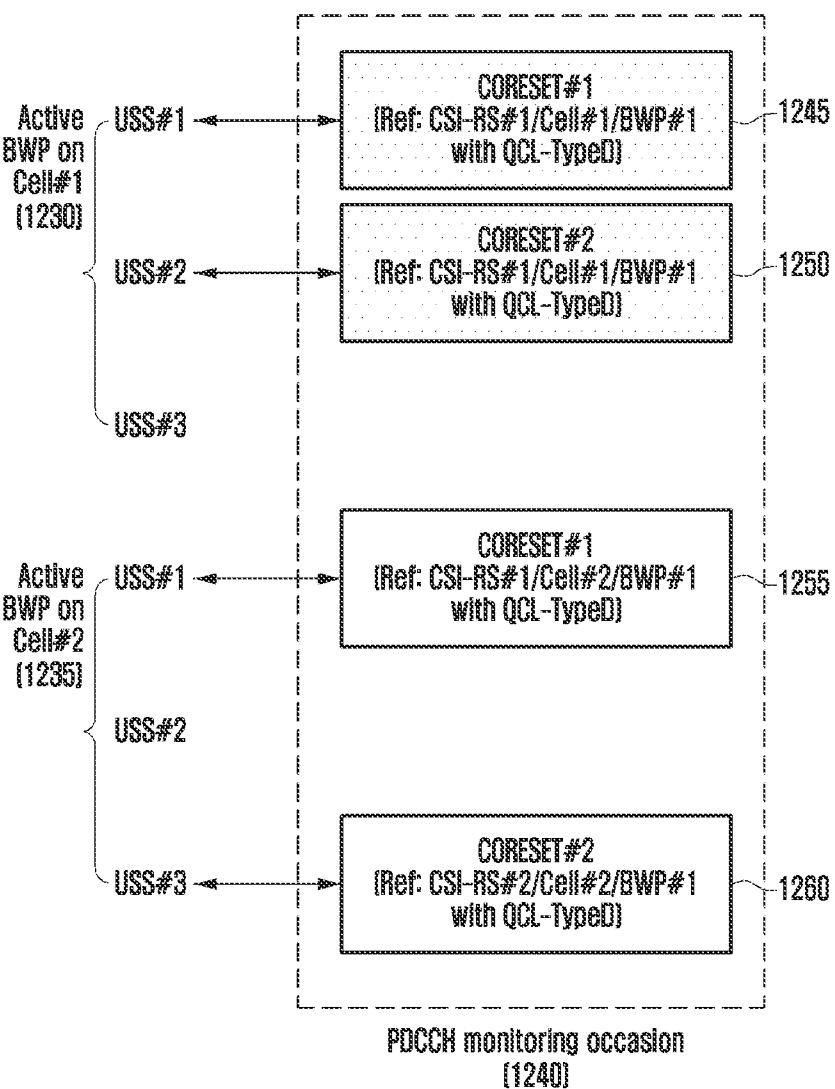

FIGS. 12A and 12B illustrate a method for a UE to select a receivable control resource set in consideration of priority upon receiving a DL control channel in a wireless communication system according to an embodiment. For example, the UE may be configured to receive a plurality of control resource sets overlapping in time within a specific PDCCH monitoring occasion 1210 (FIG. 12A), and the plurality of control resource sets may be linked to a common search space or a UE-specific search space for a plurality of cells. Within that PDCCH monitoring occasion, a first control resource set 1215 linked to a first common search space may exist in a first BWP 1200 of a first cell, and both a first control resource set 1220 linked to a first common search space and a second control resource set 1225 linked to a second UE-specific search space may exist a first BWP 1205 of a second cell. The control resource sets 1215 and 1220 may have a QCL-TypeD relationship with a first CSI-RS resource configured in the first BWP of the first cell, and the control resource set 1225 may have a QCL-TypeD relationship with a first CSI-RS resource configured in the first BWP of the second cell. Therefore, if Rule 1 is applied to the corresponding PDCCH monitoring occasion 1210, all other control resource sets having the same QCL-TypeD reference signal as the first control resource set 1215 can be received. Accordingly, the UE may receive the control resource sets 1215 and 1220 in the corresponding PDCCH monitoring occasion 1210. In another example, the UE may be configured to receive a plurality of control resource sets overlapping in time within a specific PDCCH monitoring occasion 1240 (FIG. 12B), and these plurality of control resource sets may be linked to a common search space or a UE-specific search space for a plurality of cells. Within that PDCCH monitoring occasion, a first control resource set 1245 linked to a first UE-specific search space and a second control resource set 1250 linked to a second UE-specific search space may exist in a first BWP 1230 of a first cell, and a first control resource set 1255 linked to a first UE-specific search space and a second control resource set 1260 linked to a third UE-specific search space may exist in a first BWP 1235 of a second cell. The control resource sets 1245 and 1250 may have a QCL-TypeD relationship with a first CSI-RS resource configured in the first BWP of the first cell, the control resource set 1255 may have a QCL-TypeD relationship with a first CSI-RS resource configured in the first BWP of the second cell, and the control resource set 1260 may have a QCL-TypeD relationship with a second CSI-RS resource configured in the first BWP of the second cell. By the way, if the Rule 1 is applied to the corresponding PDCCH monitoring occasion 1240, there is no common search space and thus the next rule, i.e., Rule 2, may be applied. If Rule 2 is applied to the corresponding PDCCH monitoring occasion 1240, all other control resource sets having the same QCL-TypeD reference signal as the control resource set 1245 can be received. Accordingly, the UE may receive the control resource sets 1245 and 1250 in the corresponding PDCCH monitoring occasion 1240.

LTE CRS Rate Match Related

Next, the rate match process for the above-described LTE CRS will be described in detail. For the coexistence of LTE and NR radio access technology (RAT) (LTE-NR Coexistence), the NR provides a function of configuring a cell specific reference signal (CRS) pattern of LTE to the NR UE. Specifically, the CRS pattern may be provided via RRC signaling including at least one parameter in ServingCellConfig information element (IE) or ServingCellConfigCommon IE. Examples of the above parameter may include lte-CRS-ToMatchAround, lte-CRS-PatternList1-r16, lte-CRS-PatternList2-r16, crs-RateMatch-PerCORESETPoolIndex-r16, and the like.

In Rel-15 NR, a function of configuring one CRS pattern per serving cell through the lte-CRS-ToMatchAround parameter is provided. In Rel-16 NR, the above function is extended to enable a plurality of CRS patterns to be configured per serving cell. Specifically, one CRS pattern per one LTE carrier may be configured in a single-TRP (transmission and reception point) configured UE, and two CRS patterns per one LTE carrier may be configured in a multi-TRP configured UE. For example, in the single-TRP configured UE, up to three CRS patterns per serving cell may be configured through the lte-CRS-PatternList1-r16 parameter. In another example, the CRS may be configured for each TRP in the multi-TRP configured UE. That is, the CRS pattern for TRP1 may be configured through the lte-CRS-PatternList1-r16 parameter, and the CRS pattern for TRP2 may be configured through the lte-CRS-PatternList2-r16 parameter. On the other hand, in case that two TRPs are configured as described above, whether to apply both the CRS patterns of TRP1 and TRP2 to a specific PDSCH (physical downlink shared channel) or whether to apply only the CRS pattern for one TRP is determined through the crs-RateMatch-PerCORESETPoolIndex-r16 parameter. If the crs-RateMatch-PerCORESETPoolIndex-r16 parameter is configured to enabled, only one TRP CRS pattern is applied, and in other cases, both TRP CRS patterns are applied.

Table 17 shows the ServingCellConfig IE including the CRS pattern, and Table 18 shows the RateMatchPatternLTE-CRS IE including at least one parameter for the CRS pattern.

TABLE 17

```
ServingCellConfig ::=                    SEQUENCE {
    tdd-UL-DL-ConfigurationDedicated         TDD-UL-DL-ConfigDedicated
OPTIONAL,    -- Cond TDD
    initialDownlinkBWP                       BWP-DownlinkDedicated
OPTIONAL,   -- Need M
    downlinkBWP-ToReleaseList                SEQUENCE (SIZE (1..maxNrofBWPs))
OF BWP-Id                                    OPTIONAL,    -- Need N
    downlinkBWP-ToAddModList                 SEQUENCE (SIZE
(1..maxNrofBWPs)) OF BWP-Downlink                          OPTIONAL,    --
Need N
    firstActiveDownlinkBWP-Id                BWP-Id
OPTIONAL,    -- Cond SyncAndCellAdd
    bwp-InactivityTimer                      ENUMERATED {ms2, ms3, ms4, ms5,
ms6, ms8, ms10, ms20, ms30,
                                                 ms40,ms50, ms60,
ms80,ms100, ms200,ms300, ms500,
                                                 ms750, ms1280, ms1920,
ms2560, spare10, spare9, spare8,
                                                 spare7, spare6, spare5,
spare4, spare3, spare2, spare1 }    OPTIONAL,    -- Need R
    defaultDownlinkBWP-Id                    BWP-Id
OPTIONAL,    -- Need S
    uplinkConfig                             UplinkConfig
OPTIONAL,    -- Need M
    supplementaryUplink                          UplinkConfig
OPTIONAL,    -- Need M
    pdcch-ServingCellConfig                  SetupRelease { PDCCH-
ServingCellConfig }                                OPTIONAL,    -- Need M
    pdsch-ServingCellConfig                  SetupRelease { PDSCH-
ServingCellConfig }                                OPTIONAL,    -- Need M
    csi-MeasConfig                           SetupRelease { CSI-MeasConfig }
OPTIONAL,    -- Need M
    sCellDeactivationTimer                   ENUMERATED {ms20, ms40, ms80,
ms160, ms200, ms240,
                                                 ms320, ms400, ms480,
ms520, ms640, ms720,
                                                 ms840, ms1280,
spare2,spare1}         OPTIONAL,    -- Cond ServingCellWithoutPUCCH
    crossCarrierSchedulingConfig             CrossCarrierSchedulingConfig
OPTIONAL,    -- Need M
    tag-Id                                   TAG-Id,
    dummy                                    ENUMERATED {enabled}
OPTIONAL,    -- Need R
    pathlossReferenceLinking                 ENUMERATED {spCell, sCell}
OPTIONAL,    -- Cond SCellOnly
    servingCellMO                            MeasObjectId
OPTIONAL,    -- Cond MeasObject
•     ...,
    [[
    lte-CRS-ToMatchAround                    SetupRelease { RateMatchPatternLTE-
CRS }                                        OPTIONAL,    -- Need M
    rateMatchPatternToAddModList             SEQUENCE (SIZE
(1..maxNrofRateMatchPatterns)) OF RateMatchPattern         OPTIONAL,    -- Need N
    rateMatchPatternToReleaseList            SEQUENCE (SIZE
(1..maxNrofRateMatchPatterns)) OF RateMatchPatternId       OPTIONAL,    -- Need N
    downlinkChannelBW-PerSCS-List            SEQUENCE (SIZE (1..maxSCSs)) OF
SCS-SpecificCarrier                          OPTIONAL        -- Need S
    ]],
    [[
    supplementaryUplinkRelease               ENUMERATED {true}
OPTIONAL,    -- Need N
    tdd-UL-DL-ConfigurationDedicated-IAB-MT-r16        TDD-UL-DL-
ConfigDedicated-IAB-MT-r16                         OPTIONAL,    -- Cond
TDD IAB
    dormantBWP-Config-r16                    SetupRelease { DormantBWP-Config-
r16 }                                        OPTIONAL,    -- Need M
    ca-SlotOffset-r16                        CHOICE {
        refSCS15kHz                              INTEGER (-2..2),
        refSCS30KHz                              INTEGER (-5..5),
        refSCS60KHz                              INTEGER (-10..10),
        refSCS120KHz                             INTEGER (-20..20)
    }
OPTIONAL,    -- Cond AsyncCA
    channelAccessConfig-r16                  SetupRelease { ChannelAccessConfig-r16 }
OPTIONAL,    -- Need M
    intraCellGuardBandsDL-List-r16           SEQUENCE (SIZE (1..maxSCSs)) OF
IntraCellGuardBandsPerSCS-r16                OPTIONAL,    -- Need S
    intraCellGuardBandsUL-List-r16           SEQUENCE (SIZE (1..maxSCSs)) OF
IntraCellGuardBandsPerSCS-r16                OPTIONAL,    -- Need S
    csi-RS-ValidationWith-DCI-r16            ENUMERATED {enabled}
```

TABLE 17-continued

```
OPTIONAL,    -- Need R
      lte-CRS-PatternList1-r16              SetupRelease { LTE-CRS-PatternList-r16 }
OPTIONAL,    -- Need M
      lte-CRS-PatternList2-r16              SetupRelease { LTE-CRS-PatternList-r16 }
OPTIONAL,    -- Need M
      crs-RateMatch-PerCORESETPoolIndex-r16    ENUMERATED {enabled}
OPTIONAL,    -- Need R
      enableTwoDefaultTCI-States-r16       ENUMERATED {enabled}
OPTIONAL,    -- Need R
      enableDefaultTCI-StatePerCoresetPoolIndex-r16 ENUMERATED {enabled}
OPTIONAL,    -- Need R
      enableBeamSwitchTiming-r16            ENUMERATED {true}
OPTIONAL,    -- Need R
      cbg-TxDiffTBsProcessingType1-r16    ENUMERATED {enabled}
OPTIONAL,    -- Need R
      cbg-TxDiffTBsProcessingType2-r16    ENUMERATED {enabled}
OPTIONAL     -- Need R
      ]]
}
```

TABLE 18

```
         -    RateMatchPatternLTE-CRS
The IE RateMatchPatternLTE-CRS is used to configure a pattern to rate match around LTE
CRS. See TS 38.214 [19], clause 5.1.4.2.
                         RateMatchPatternLTE-CRS information element
-- ASNISTART
-- TAG-RATEMATCHPATTERNLTE-CRS-START
RateMatchPatternLTE-CRS ::=            SEQUENCE {
      carrierFreqDL                           INTEGER (0..16383),
      carrierBandwidthDL                      ENUMERATED {n6, n15, n25, n50, n75,
n100, spare2, spare1},
      mbsfn-SubframeConfigList               EUTRA-MBSFN-SubframeConfigList
OPTIONAL,    -- Need M
      nrofCRS-Ports                           ENUMERATED {n1, n2, n4},
      v-Shift                                 ENUMERATED {n0, n1, n2, n3, n4, n5}
}
LTE-CRS-PatternList-r16 ::=            SEQUENCE (SIZE (1..maxLTE-CRS-Patterns-
r16)) OF RateMatchPatternLTE-CRS
-- TAG-RATEMATCHPATTERNLTE-CRS-STOP
-- ASNISTOP
                    RateMatchPatternLTE-CRS field descriptions
carrierBandwidthDL
BW of the LTE carrier in number of PRBs (see TS 38.214 [19], clause 5.1.4.2).
carrierFreqDL
Center of the LTE carrier (see TS 38.214 [19], clause 5.1.4.2).
mbsfn-SubframeConfigList
LTE MBSFN subframe configuration (see TS 38.214 [19], clause 5.1.4.2).
nrofCRS-Ports
Number of LTE CRS antenna port to rate-match around (see TS 38.214 [19], clause
5.1.4.2).
v-Shift
Shifting value v-shift in LTE to rate match around LTE CRS (see TS 38.214 [19], clause
5.1.4.2).
```

PDSCH: Related to Frequency Resource Allocation

Figure 13:
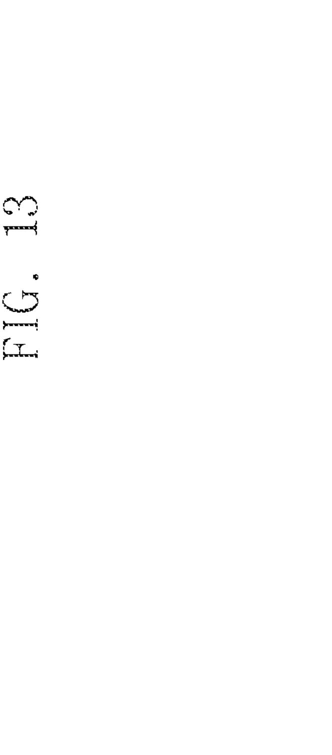
FIG. 13 illustrates frequency domain resource allocation of a PDSCH in a wireless communication system according to an embodiment.
Figure 13:
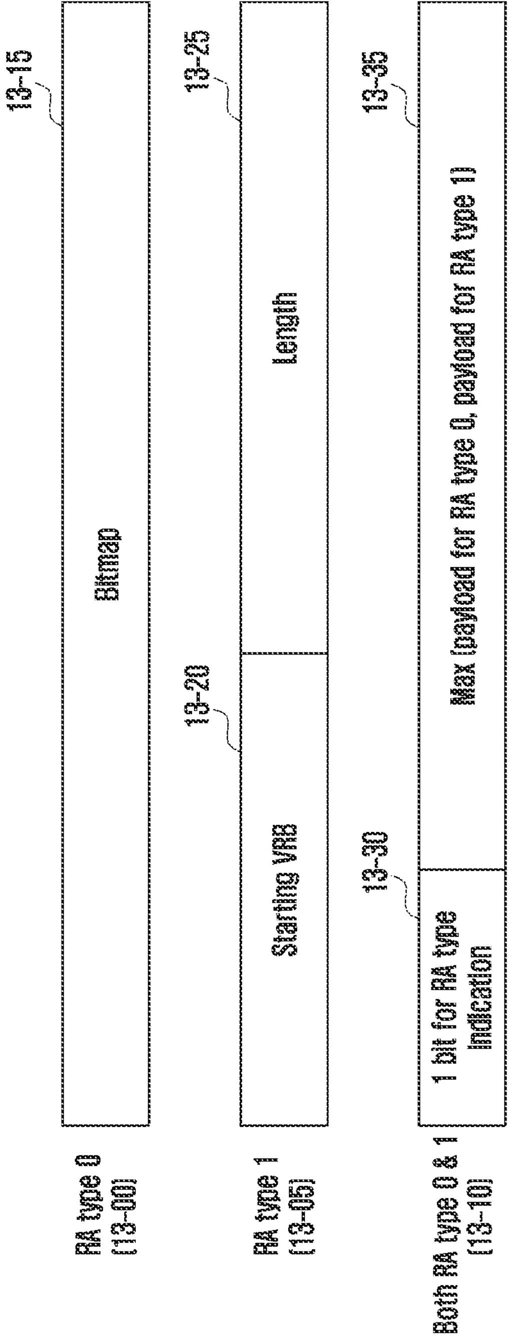

FIG. 13 illustrates FDRA of a PDSCH in a wireless communication system according to an embodiment.

FIG. 13 shows three FDRA methods, i.e., type 0 13-00, type 1 13-05, and dynamic switch 13-10, configurable through higher layer signaling in the NR wireless communication system.

With reference to FIG. 13, in case 13-00 that the UE is configured to use only resource type 0 through higher layer signaling, some DCI for allocating the PDSCH to the UE includes a bitmap composed of non-deterministic random bit generator (NRBG) bits. A related condition will be described again later. In this case, NRBG refers to the number of resource block groups (RBGs) determined as shown in Table 19, below, according to the BWP size allocated by the BWP indicator and the higher layer parameter rbg-Size, and data is transmitted to the RBG indicated as 1 by the bitmap.

TABLE 19

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

In case 13-05 that the UE is configured to use only resource type 1 through higher layer signaling, some DCI for allocating the PDSCH to the UE includes FDRA information composed of $$\lceil \log_2(N_{RB}^{DL,BWP}(N_{RB}^{DL,BWP}+1)/2) \rceil$$

bits. A related condition will be described again later. Through this, the base station can configure a starting VRB 13-20 and a length 13-25 of the frequency domain resource continuously allocated therefrom.

In case 13-10 that the UE is configured to use both resource type 0 and resource type 1 through higher layer signaling, some DCI for allocating the PDSCH to the UE includes FDRA information composed of bits of a larger value 13-35 between payload 13-15 for configuring resource type 0 and payload 13-20, 13-25 for configuring resource type 1. A related condition will be described again later. In this case, one bit 13-30 may be added to the first part (MSB) of the FDRA information in the DCI. In case that this bit is a value of '0', it is indicated that resource type 0 is used, and in case of a value of '1', it is indicated that resource type 1 is used.

PDSCH/PUSCH: Related to Time Resource Allocation

Hereinafter, a method of allocating time domain resources for a data channel in a next-generation mobile communication system (5G or NR system) will be described.

The base station may configure a table of TDRA information for a DL data channel (PDSCH) and an UL data channel (PUSCH) to the UE through higher layer signaling (e.g., RRC signaling). For the PDSCH, a table composed of maxNrofDL-Allocations=16 entries may be configured, and for the PUSCH, a table composed of maxNrofUL-Allocations=16 entries may be configured. In an embodiment, the TDRA information may include PDCCH-to-PDSCH slot timing (corresponding to a time interval in slot units between the time when the PDCCH is received and the time when the PDSCH scheduled by the received PDCCH is transmitted, denoted by K0), PDCCH-to-PUSCH slot timing (corresponding to a time interval in slot units between the time when the PDCCH is received and the time when the PUSCH scheduled by the received PDCCH is transmitted, denoted by K2), information on the position and length of the start symbol where the PDSCH or PUSCH is scheduled within a slot, a mapping type of the PDSCH or PUSCH, and the like. For example, information such as Table 20 or Table 21 below may be transmitted from the base station to the UE.

TABLE 20

| PDSCH-TimeDomainResourceAllocationList information element |
|---|
| PDSCH-TimeDomainResourceAllocationList ::= SEQUENCE (SIZE(1..maxNrofDL-Allocations)) OF PDSCH-TimeDomainResourceAllocation<br>PDSCH-TimeDomainResourceAllocation ::= SEQUENCE {<br>K0 INTEGER (0..32) OPTIONAL, -- Need S<br>(PDCCH-to-PDSCH timing, units of slot)<br>mappingType ENUMERATED {typeA, typeB},<br>(PDSCH mapping type)<br>startSymbolAndLength INTEGER (0..127)<br>(PDSCH start symbol and length)<br>} |

TABLE 21

| PUSCH-TimeDomainResourceAllocationList information element |
|---|
| PUSCH-TimeDomainResourceAllocationList ::= SEQUENCE (SIZE(1..maxNrofUL-Allocations)) OF PUSCH-TimeDomainResourceAllocation<br>PUSCH-TimeDomainResourceAllocation ::= SEQUENCE {<br>K2 INTEGER (0..32) OPTIONAL, -- Need S<br>(PDCCH-to-PUSCH timing, units of slot)<br>mappingType ENUMERATED {typeA, typeB},<br>(PUSCH mapping type)<br>startSymbolAndLength INTEGER (0..127)<br>(PUSCH start symbol and length)<br>} |

The base station may notify one of the entries in the table of the above-described TDRA information to the UE through L1 signaling (e.g., indicated by the 'time domain resource allocation' field in the DCI). The UE may acquire the TDRA information of the PDSCH or PUSCH, based on the DCI received from the base station.

Figure 14:
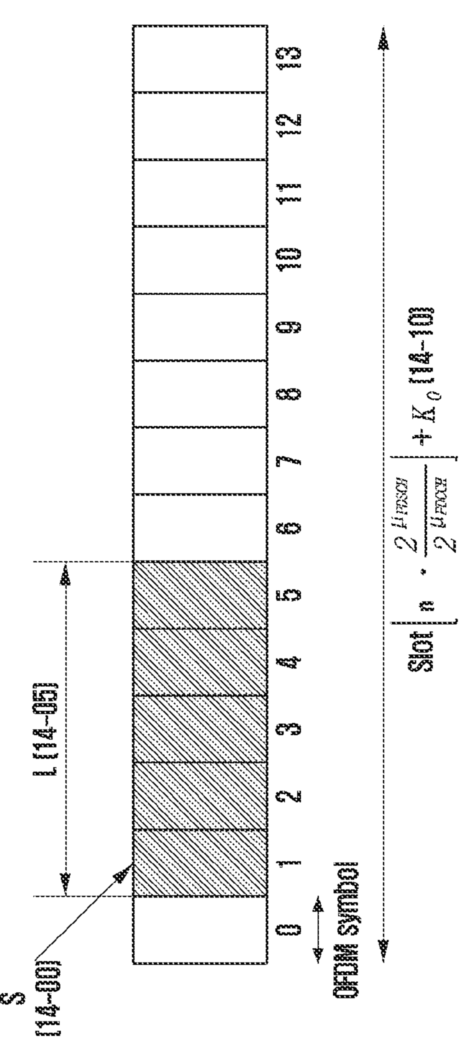
FIG. 14 illustrates time domain resource allocation of a PDSCH in a wireless communication system according to an embodiment.

FIG. 14 illustrates TDRA of a PDSCH in a wireless communication system according to an embodiment.

With reference to FIG. 14, the base station may indicate the time domain position of the PDSCH resource according to the subcarrier spacing (SCS) ($\mu_{PDSCH}$, $\mu_{PDCCH}$) of a data channel and a control channel configured using a higher layer, the scheduling offset (K0) value, and the OFDM symbol start position 14-00 and length 14-05 within one slot dynamically indicated through the DCI.

Figure 15:
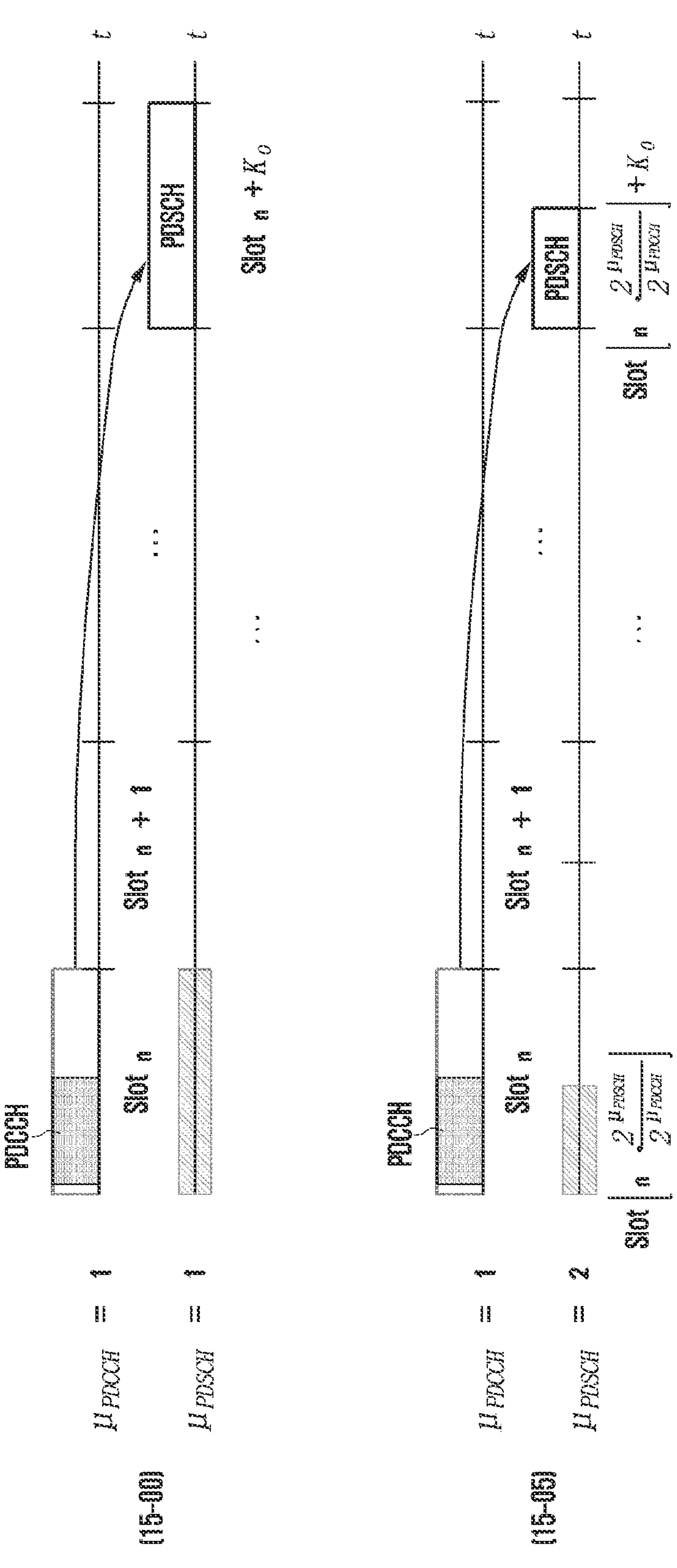
FIG. 15 illustrates time domain resource allocation depending on subcarrier spacing of a data channel and a control channel in a wireless communication system according to an embodiment.

FIG. 15 illustrates TDRA depending on subcarrier spacing of a data channel and a control channel in a wireless communication system according to an embodiment.

With reference to FIG. 15, in case 15-00 that the data channel and the control channel have the same subcarrier spacing ($\mu_{PDSCH}=\mu_{PDSSCH}$), the slot numbers for data and control are equal to each other, so the base station and the UE may generate the scheduling offset in accordance with a predetermined slot offset K0. On the other hand, in case 15-05 that the data channel and the control channel have different subcarrier spacings ($\mu_{PDSCH}\neq\mu_{PDCCH}$), the slot numbers for data and control are different from each other, so the base station and the UE may generate the scheduling offset in accordance with a predetermined slot offset K0, based on the subcarrier spacing of the PDCCH.

PDSCH: Processing Time

Next, the PDSCH processing procedure time will be described. In case that the base station schedules the UE to transmit the PDSCH by using DCI format 1_0, 1_1, or 1_2, the UE may need the PDSCH processing time for receiving the PDSCH by applying a transmission method (modulation and demodulation and coding indication index (MCS), demodulation reference signal related information, time and FDRA information, etc.) indicated through the DCI. In the NR, the PDSCH processing time is defined in consideration of this. The PDSCH processing time of the UE may follow Equation (3), below.

$$T_{proc,1}=(N_1+d_{1,1}+d_2)(2048+144)\kappa 2^{-\mu}T_c+T_{ext} \quad (3)$$

Respective variables of $T_{proc,1}$ in Equation (3) may have the following meaning:

$N_1$: The number of symbols determined according to the UE processing capability 1 or 2 and the numerology μ depending on the capability of the UE. In case that UE processing capability 1 is reported according to the capability report of the UE, it has the value in Table 22, below. In case that UE processing capability 2 is reported and it is configured through higher layer signaling that UE processing capability 2 can be used, it may have the value in Table 23, below. Numerology μ may correspond to the minimum value among $\mu_{PDCCH}$, $\mu_{PDSCH}$, and $\mu_{UL}$ so as to maximize Tproc,1, where $\mu_{PDCCH}$, $\mu_{PDSCH}$, and $\mu_{UL}$ may respectively refer to the numerology of PDCCH scheduling PDSCH, the numerology of scheduled PDSCH, and the numerology of an UL channel through which HARQ-ACK is to be transmitted.

TABLE 22

| PDSCH processing time in case of PDSCH processing capability 1 | | |
|---|---|---|
| | PDSCH decoding time $N_1$ [symbols] | |
| μ | In case that both PDSCH mapping type A and B are dmrs-AdditionalPosition = pos0 in DMRS-DownlinkConfig which is higher layer signaling | In case that both PDSCH mapping type A and B are not dmrs-AdditionalPosition = pos0 in DMRS-DownlinkConfig which is higher layer signaling, or in case that higher layer parameter is not configured |
| 0 | 8 | $N_{1,0}$ |
| 1 | 10 | 13 |
| 2 | 17 | 20 |
| 3 | 20 | 24 |

TABLE 23

| PDSCH processing time in case of PDSCH processing capability 2 | |
|---|---|
| μ | PDSCH decoding time $N_1$ [symbols] In case that both PDSCH mapping type A and B are dmrs-AdditionalPosition = pos0 in DMRS-DownlinkConfig which is higher layer signaling |
| 0 | 3 |
| 1 | 4.5 |
| 2 | 9 for frequency range 1 |

κ: 64

$T_{ext}$: In case that the UE uses a shared spectrum channel access scheme, the UE may calculate $T_{ext}$ and apply it to the PDSCH processing time. Otherwise, $T_{ext}$ is assumed to be 0.

If $l_1$ indicating a PDSCH DMRS position value is 12, N1,0 of Table 22 has a value of 14, otherwise it has a value of 13.

For PDSCH mapping type A, the last symbol of PDSCH is the i-th symbol in a slot where the PDSCH is transmitted, and if i<7, $d_{1,1}$ is 7-i, otherwise $d_{1,1}$ is 0.

$d_2$: In case that PUCCH having a high priority index and PUCCH or PUSCH having a low priority index overlap in time, $d_2$ of the PUCCH having a high priority index may be configured to a value reported by the UE. Otherwise, $d_2$ is 0.

In case that PDSCH mapping type B is used for UE processing capability 1, the value of $d_{1,1}$ may be determined according to the number, L, of symbols of scheduled PDSCH, and the number, d, of overlapping symbols between PDCCH scheduling PDSCH and scheduled PDSCH, as follows:

If L≥7, then $d_{1,1}$=0.

If L≥4 and L≤6, then $d_{1,1}$=7−L.

If L=3, then $d_{1,1}$=min (d, 1).

If L=2, then $d_{1,1}$=3+d.

In case that PDSCH mapping type B is used for UE processing capability 2, the value of $d_{1,1}$ may be determined according to the number, L, of symbols of scheduled PDSCH, and the number, d, of overlapping symbols between PDCCH scheduling PDSCH and scheduled PDSCH, as follows:

If L≥7, then $d_{1,1}$=0.

If L≥4 and L≤6, then $d_{1,1}$=7−L.

If L=2,

If scheduled PDCCH exists in a CORESET consisting of three symbols, and if the CORESET and scheduled PDSCH have the same start symbol, $d_{1,1}$=3.

Otherwise, $d_{1,1}$=d.

In case of the UE supporting capability 2 in a given serving cell, the PDSCH processing time according to UE processing capability 2 may be applied when processingType2Enabled, which is higher layer signaling, is configured to enable for the cell.

If the position (this position may consider $K_i$ defined as the transmission time of HARQ-ACK, a PUCCH resource used for HARQ-ACK transmission, and a timing advance effect) of the first UL transmission symbol of PUCCH including HARQ-ACK information does not start earlier than the first UL transmission symbol that appears after a time of $T_{proc,1}$ from the last symbol of PDSCH, the UE should transmit a valid HARQ-ACK message. That is, the UE should transmit the PUCCH including HARQ-ACK only when the PDSCH processing time is sufficient.

Otherwise, the UE cannot provide the base station with valid HARQ-ACK information corresponding to the scheduled PDSCH. The $T_{proc,1}$ may be used for both normal or extended CP. If the PDSCH has two PDSCH transmission positions in one slot, $d_{1,1}$ is calculated based on the first PDSCH transmission position in the corresponding slot.

PDSCH: Reception Preparation Time Upon Cross-Carrier Scheduling

In case of cross-carrier scheduling in which $\mu_{PDCCH}$, which is a numerology for transmission of a scheduling PDCCH, and $\mu_{PDSCH}$, which is a numerology for transmission of a PDSCH scheduled through the PDCCH, are different from each other, a UE's PDSCH reception preparation time, $N_{pdsch}$, defined for a time interval between the PDCCH and the PDSCH will be described.

If $\mu_{PDCCH}<\mu_{PDSCH}$, the scheduled PDSCH cannot be transmitted earlier than the first symbol of a slot appearing after $N_{pasch}$ symbols from the last symbol of the PDCCH scheduling the PDSCH. A transmission symbol of the PDSCH may include a DM-RS.

If $\mu_{PDCCH}>\mu_{PDSCH}$, the scheduled PDSCH can be transmitted after $N_{pdsch}$ symbols from the last symbol of the PDCCH scheduling the PDSCH. A transmission symbol of the PDSCH may include a DM-RS.

TABLE 24

| $N_{pdsch}$ according to scheduled PDCCH subcarrier spacing | |
|---|---|
| $\mu_{PDCCH}$ | $N_{pdsch}$ [symbols] |
| 0 | 4 |
| 1 | 5 |
| 2 | 10 |
| 3 | 14 |

PDSCH: TCI State Activation MAC-CE

Next, a beam configuration method for PDSCH will be described.

Figure 16A:
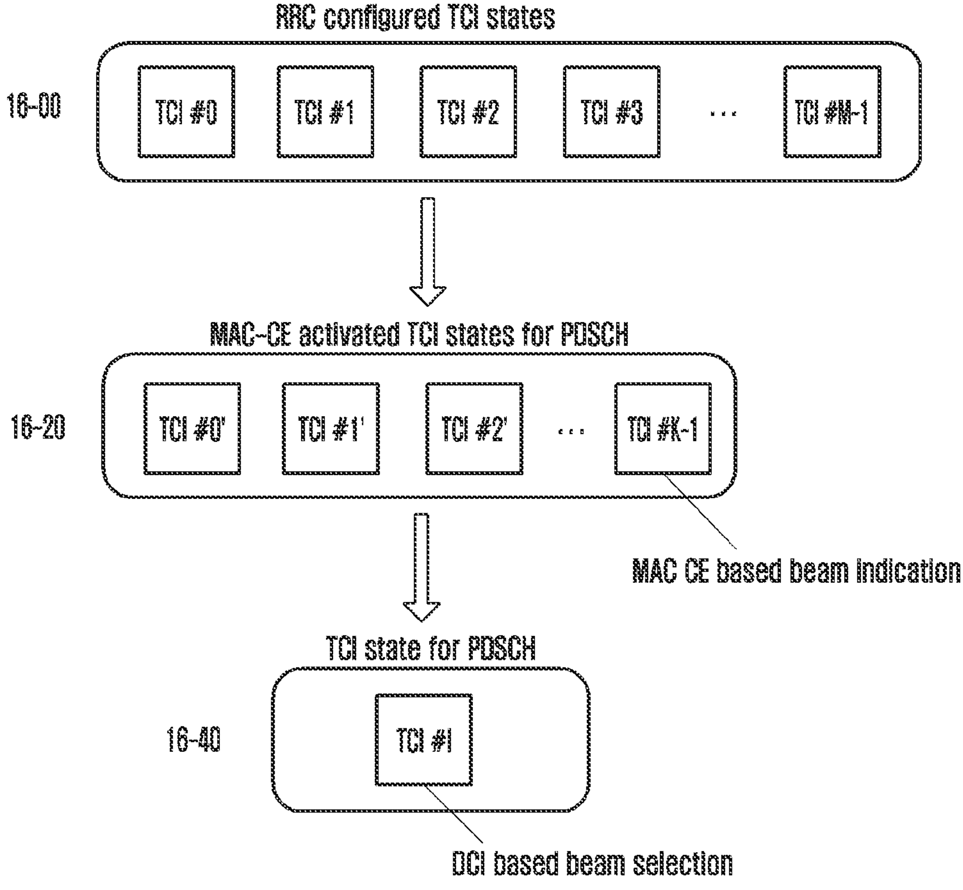
FIGS. 16A and 16B illustrate a process for beam configuration and activation of a PDSCH.
Figure 16B:
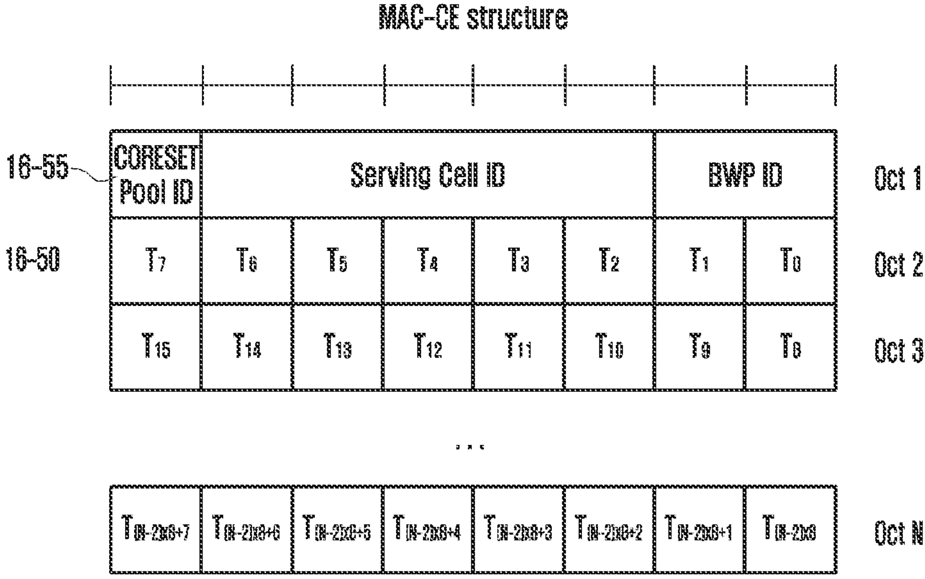

FIGS. 16A and 16B illustrate a process for beam configuration and activation of a PDSCH. A list of TCI states for PDSCH may be indicated through a higher layer list such as RRC (16-00, FIG. 16A). The list of TCI states may be indicated via, for example, tci-StatesToAddModList and/or tci-StatesToReleaseList in PDSCH-Config IE for each BWP. Next, a part of the list of TCI states may be activated through MAC-CE (16-20). The maximum number of activated TCI states may be determined depending on the capability reported by the UE. 16-50 (FIG. 16B) shows an example of a MAC-CE structure for PDSCH TCI state activation/deactivation.

The meaning of each field in the MAC CE and the values configurable for each field are as follows:

- Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;
- BWP ID: This field indicates a DL BWP for which the MAC CE applies as the codepoint of the DCI BWP indicator field as specified in TS 38.212 [9]. The length of the BWP ID field is 2 bits. This field is ignored if this MAC CE applies to a set of Serving Cells;
- $T_i$ (TCI state identity): If there is a TCI state with TCI-StateId i as specified in TS 38.331 [5], this field indicates the activation/deactivation status of the TCI state with TCI-StateId i, otherwise MAC entity shall ignore the Ti field. The Ti field is configured to 1 to indicate that the TCI state with TCI-StateId i shall be activated and mapped to the codepoint of the DCI Transmission Configuration Indication field, as specified in TS 38.214 [7]. The Ti field is configured to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with Ti field set to 1, i.e. the first TCI State with $T_i$ field set to 1 shall be mapped to the codepoint value 0, second TCI State with Ti field set to 1 shall be mapped to the codepoint value 1 and so on. The maximum number of activated TCI states is 8;
- CORESET Pool ID: This field indicates that mapping between the activated TCI states and the codepoint of the DCI Transmission Configuration Indication set by field Ti is specific to the ControlResourceSetId configured with CORESET Pool ID as specified in TS 38.331 [5]. This field set to 1 indicates that this MAC CE shall be applied for the DL transmission scheduled by CORESET with the CORESET pool ID equal to 1, otherwise, this MAC CE shall be applied for the DL transmission scheduled by CORESET pool ID equal to 0. If the coresetPoolIndex is not configured for any CORESET, MAC entity shall ignore the CORESET Pool ID field in this MAC CE when receiving the -continued MAC CE. If the Serving Cell in the MAC CE is configured in a cell list that contains more than one Serving Cell, the CORESET Pool ID field shall be ignored when receiving the MAC CE.

SRS Related

Next, a UE's UL channel estimation method using a sounding reference signal (SRS) transmission will be described. The base station may configure at least one SRS configuration for each UL BWP in order to deliver configuration information for SRS transmission to the UE, and may also configure at least one SRS resource set for each SRS configuration. For example, the base station and the UE may exchange the following higher signaling information to deliver information about the SRS resource set:

- srs-ResourceSetId: SRS resource set index
- srs-ResourceIdList: A set of SRS resource indexes referenced in the SRS resource set
- resourceType: This is the time axis transmission configuration of the SRS resource referenced in the SRS resource set, and may be configured to one of 'periodic', 'semi-persistent', and 'aperiodic'. If it is configured to 'periodic' or 'semi-persistent', associated CSI-RS information may be provided according to the usage of the SRS resource set. If it is configured to 'aperiodic', an aperiodic SRS resource trigger list and slot offset information may be provided, and associated CSI-RS information may be provided according to the usage of the SRS resource set.
- usage: This is configuration for the usage of the SRS resource referenced in the SRS resource set, and may be configured to one of 'beamManagement', 'codebook', 'nonCodebook', and 'antennaSwitching'.
- alpha, p0, pathlossReferenceRS, srs-PowerControlAdjustmentStates: This provides parameter configuration for adjusting the transmit power of the SRS resource referenced in the SRS resource set.

The UE may understand that the SRS resource included in the set of SRS resource indexes referenced in the SRS resource set follows information configured in the SRS resource set.

In addition, the base station and the UE may transmit and receive higher layer signaling information to deliver individual configuration information for the SRS resource. For example, the individual configuration information for the SRS resource may include time-frequency domain mapping information within a slot of the SRS resource, which may include information about frequency hopping within a slot or between slots of the SRS resource. Also, the individual configuration information for the SRS resource may include the time domain transmission configuration of the SRS resource, and may be configured to one of 'periodic', 'semi-persistent', and 'aperiodic'. This may be limited to have the same time domain transmission configuration as the SRS resource set including the SRS resource. If the time domain transmission configuration of the SRS resource is configured to 'periodic' or 'semi-persistent', the SRS resource transmission period and slot offset (e.g., periodicityAndOffset) may be additionally included in the time domain transmission configuration.

The base station may activate, deactivate, or trigger the SRS transmission to the UE through higher layer signaling including RRC signaling or MAC CE signaling, or L1 signaling (e.g., DCI). For example, the base station may activate or deactivate the periodic SRS transmission through higher layer signaling to the UE. The base station may instruct, through higher layer signaling, to activate the SRS resource set in which the resourceType is configured to periodic, and the UE may transmit the SRS resource referenced in the activated SRS resource set. The time-frequency domain resource mapping of the SRS resource transmitted in the slot follows the resource mapping information configured in the SRS resource, and the slot mapping including the transmission period and the slot offset follows the periodicityAndOffset configured in the SRS resource. In addition, the spatial domain transmission filter applied to the SRS resource transmitted may refer to the spatial relation info configured in the SRS resource, or may refer to the associated CSI-RS information configured in the SRS resource set including the SRS resource. The UE may transmit the SRS resource in the UL BWP activated for the periodic SRS resource activated through higher layer signaling.

For example, the base station may activate or deactivate the semi-persistent SRS transmission through higher layer signaling to the UE. The base station may instruct to activate the SRS resource set through MAC CE signaling, and the UE may transmit the SRS resource referenced in the activated SRS resource set. The SRS resource set activated through MAC CE signaling may be limited to the SRS resource set in which the resourceType is configured to semi-persistent. The time-frequency domain resource mapping of the SRS resource transmitted in the slot follows the resource mapping information configured in the SRS resource, and the slot mapping including the transmission period and the slot offset follows the periodicityAndOffset configured in the SRS resource. In addition, the spatial domain transmission filter applied to the SRS resource transmitted may refer to the spatial relation info configured in the SRS resource, or may refer to the associated CSI-RS information configured in the SRS resource set including the SRS resource. If the spatial relation info is configured in the SRS resource, this may not be followed, and the spatial domain transmission filter may be determined by referring to the configuration information for the spatial relation info delivered through MAC CE signaling that activates the semi-persistent SRS transmission. The UE may transmit the SRS resource within the UL BWP activated for the semi-persistent SRS resource activated through higher layer signaling.

For example, the base station may trigger the aperiodic SRS transmission to the UE through the DCI. The base station may indicate one of aperiodic SRS resource triggers (aperiodicSRS-ResourceTrigger) through the SRS request field of the DCI. The UE may understand, in the configuration information of the SRS resource set, that the SRS resource set including the aperiodic SRS resource trigger indicated through the DCI in the aperiodic SRS resource trigger list is triggered. The UE may transmit the SRS resource referenced in the triggered SRS resource set. The time-frequency domain resource mapping of the SRS resource transmitted in the slot follows the resource mapping information configured in the SRS resource. In addition, the slot mapping of the SRS resource transmitted may be determined through the slot offset between the PDCCH including DCI and the SRS resource, which may refer to the value(s) contained in the slot offset set configured in the SRS resource set. Specifically, the slot offset between the PDCCH including DCI and the SRS resource may apply a value indicated in the time domain resource assignment field of the DCI among the offset value(s) contained in the slot offset set configured in the SRS resource set. In addition, the spatial domain transmission filter applied to the SRS resource transmitted may refer to the spatial relation info configured in the SRS resource, or may refer to the associated CSI-RS information configured in the SRS resource set including the SRS resource. The UE may transmit the SRS resource within the UL BWP activated for the aperiodic SRS resource triggered through the DCI.

In case that the base station triggers the aperiodic SRS transmission to the UE through the DCI, in order for the UE to transmit the SRS by applying the configuration information for the SRS resource, a minimum time interval may be required between the PDCCH including the DCI triggering the aperiodic SRS transmission and the transmitted SRS. The time interval for the SRS transmission of the UE may be defined as the number of symbols between the last symbol of the PDCCH including the DCI triggering the aperiodic SRS transmission and the first symbol to which the SRS resource transmitted first among the transmitted SRS resource(s) is mapped. The minimum time interval may be determined with reference to the PUSCH preparation procedure time required for the UE to prepare PUSCH transmission. In addition, the minimum time interval may have a different value depending on the usage of the SRS resource set including the transmitted SRS resource. For example, the minimum time interval may be determined as N2 symbols defined in consideration of the UE processing capability according to the capability of the UE with reference to the PUSCH preparation procedure time of the UE. In addition, in consideration of the usage of the SRS resource set including the transmitted SRS resource, if the usage of the SRS resource set is configured to 'codebook' or 'antennaSwitching', the minimum time interval may be determined as N2 symbols, and if the usage of the SRS resource set is configured to 'nonCodebook' or 'beamManagement', the minimum time interval may be determined as N2+14 symbols. The UE may transmit the aperiodic SRS when the time interval for aperiodic SRS transmission is greater than or equal to the minimum time interval, and may ignore the DCI triggering the aperiodic SRS when the time interval for aperiodic SRS transmission is less than the minimum time interval.

TABLE 25

```
SRS-Resource ::=                    SEQUENCE {
    srs-ResourceId                      SRS-ResourceId,
    nrofSRS-Ports                       ENUMERATED (port1, ports2,
ports4},
    ptrs-PortIndex                      ENUMERATED {n0, n1 }
OPTIONAL,    -- Need R
    transmissionComb                    CHOICE {
        n2                                  SEQUENCE {
            combOffset-n2                       INTEGER (0..1),
            cyclicShift-n2                      INTEGER (0..7)
        },
        n4                                  SEQUENCE {
            combOffset-n4                       INTEGER (0..3),
```

TABLE 25-continued

```
            cyclicShift-n4                      INTEGER (0..11)
        }
    },
    resourceMapping                         SEQUENCE {
        startPosition                         INTEGER (0..5),
        nrofSymbols                              ENUMERATED {n1, n2,
n4},
        repetitionFactor                      ENUMERATED {n1, n2, n4}
    },
    freqDomainPosition                      INTEGER (0..67),
    freqDomainShift                         INTEGER (0..268),
    freqHopping                              SEQUENCE {
        c-SRS                                    INTEGER (0..63),
        b-SRS                                    INTEGER (0..3),
        b-hop                                   INTEGER (0..3)
    },
    groupOrSequenceHopping                   ENUMERATED { neither,
groupHopping, sequenceHopping },
    resourceType                            CHOICE {
        aperiodic                                SEQUENCE {
            ...
        },
        semi-persistent                        SEQUENCE {
            periodicityAndOffset-sp                     SRS-
PeriodicityAndOffset,
            ...
        },
        periodic                                 SEQUENCE {
            periodicity AndOffset-p                     SRS-
PeriodicityAndOffset,
            ...
        }
    },
    sequenceId                               INTEGER (0..1023),
    spatialRelationInfo                     SRS-SpatialRelationInfo
OPTIONAL,    -- Need R
    ...
}
```

The spatialRelationInfo configuration information in Table 25 refers to one reference signal and applies beam information of the reference signal to a beam used for the corresponding SRS transmission. For example, the configuration of spatialRelationInfo may include information as shown in Table 26, below.

TABLE 26

```
SRS-SpatialRelationInfo ::=        SEQUENCE{
    servingCellId                              ServCellIndex
OPTIONAL,    -- Need S
    referencesignal                        CHOICE {
        ssb-Index                                SSB-Index,
        csi-RS-Index                             NZP-CSI-RS-ResourceId,
        srs                                       SEQUENCE {
            resourceId                                  SRS-ResourceId,
            uplinkBWP                                     BWP-Id
        }
    }
}
```

Referring to the spatialRelationInfo configuration, an SS/PBCH block index, a CSI-RS index, or an SRS index may be configured as an index of a reference signal to be referenced in order to use the beam information of a specific reference signal. The higher signaling referenceSignal is configuration information indicating which reference signal beam information is to be referred to for the corresponding SRS transmission, ssb-Index is the index of the SS/PBCH block, csi-RS-Index is the index of the CSI-RS, and srs is the index of the SRS. If the value of the higher signaling referenceSignal is configured to 'ssb-Index', the UE may apply the receive beam, having been used when receiving the SS/PBCH block corresponding to the ssb-Index, as the transmit beam of the corresponding SRS transmission. If the value of the higher signaling referenceSignal is configured to 'csi-RS-Index', the UE may apply the receive beam, having been used when receiving the CSI-RS corresponding to the csi-RS-Index, as the transmit beam of the corresponding SRS transmission. If the value of the higher signaling referenceSignal is configured to 'srs', the UE may apply the transmit beam, having been used when transmitting the SRS corresponding to srs, as the transmit beam of the corresponding SRS transmission.

PUSCH: Related to Transmission Scheme

Next, a scheduling scheme of PUSCH transmission will be described. The PUSCH transmission may be dynamically scheduled by a UL grant in the DCI or may be operated by configured grant Type 1 or Type 2. The dynamic scheduling indication for the PUSCH transmission is possible via DCI format 0_0 or 0_1.

The configured grant Type 1 PUSCH transmission may be semi-statically configured by receiving configuredGrant-Config including rrc-ConfiguredUplinkGrant of Table 27 through higher signaling without receiving the UL grant in the DCI. The configured grant Type 2 PUSCH transmission may be semi-continuously scheduled by the UL grant in the DCI after receiving configuredGrantConfig that does not include rrc-ConfiguredUplinkGrant of Table 27 through higher signaling. In case that the PUSCH transmission is operated by the configured grant, parameters applied to the PUSCH transmission are applied through the higher signaling configuredGrantConfig of Table 27 except for dataScramblingIdentityPUSCH, txConfig, codebookSubset, maxRank, and scaling of UCI-OnPUSCH provided as the higher signaling pusch-Config of Table 28. If the UE is provided with transformPrecoder in the higher signaling configuredGrantConfig of Table 27, the UE applies tp-pi2BPSK in pusch-Config of Table 28 for the PUSCH transmission operated by the configured grant.

TABLE 27

```
ConfiguredGrantConfig ::=                SEQUENCE {
      frequencyHopping                        ENUMERATED {intraSlot, interSlot}
OPTIONAL,    -- Need S,
      cg-DMRS-Configuration                   DMRS-UplinkConfig,
      mcs-Table                               ENUMERATED {qam256,
qam64LowSE}                                                       OPTIONAL,    --
Need S
      mcs-TableTransformPrecoder              ENUMERATED {qam256,
qam64LowSE}                                                       OPTIONAL,    --
Need S
      uci-OnPUSCH                             SetupRelease { CG-UCI-OnPUSCH }
OPTIONAL,    -- Need M
      resourceAllocation                      ENUMERATED
{ resourceAllocationType0, resourceAllocationType1, dynamicSwitch },
      rbg-Size                                ENUMERATED {config2}
OPTIONAL,    -- Need S
      powerControlLoopToUse                   ENUMERATED {n0, n1},
      p0-PUSCH-Alpha                          P0-PUSCH-AlphaSetId,
      transformPrecoder                       ENUMERATED {enabled, disabled}
OPTIONAL,    -- Need S
      nrofHARQ-Processes                      INTEGER(1..16),
      repK                                    ENUMERATED {n1, n2, n4, n8},
      repK-RV                                 ENUMERATED {s1-0231, s2-0303,
s3-0000}                                      OPTIONAL,    -- Need R
      periodicity                             ENUMERATED {
                                                  sym2, sym7, sym1x14,
sym2x14, sym4x14, sym5x14, sym8x14, sym10x14, sym16x14, sym20x14,
                                                  sym32x14, sym40x14,
sym64x14, sym80x14, sym128x14, sym160x14, sym256x14, sym320x14, sym512x14,
                                                  sym640x14, sym1024x14,
sym1280x14, sym2560x14, sym5120x14,
                                                  sym6, sym1x12, sym2x12,
sym4x12, sym5x12, sym8x12, sym10x12, sym16x12, sym20x12, sym32x12,
                                                  sym40x12, sym64x12,
sym80x12, sym128x12, sym160x12, sym256x12, sym320x12, sym512x12, sym640x12,
                                                  sym1280x12, sym2560x12
      },
      configuredGrantTimer                    INTEGER (1..64)
OPTIONAL,    -- Need R
      rrc-ConfiguredUplinkGrant               SEQUENCE {
            timeDomainOffset                      INTEGER (0..5119),
            timeDomainAllocation                  INTEGER (0..15),
            frequencyDomainAllocation             BIT STRING (SIZE(18)),
            antennaPort                           INTEGER (0..31),
            dmrs-SeqInitialization                INTEGER (0..1)
OPTIONAL,    -- Need R
            precodingAndNumberOfLayers            INTEGER (0..63),
            srs-ResourceIndicator                 INTEGER (0..15)
OPTIONAL,    -- Need R
            mcsAndTBS                             INTEGER (0..31),
            frequencyHoppingOffset                INTEGER (1..
maxNrofPhysicalResourceBlocks-1)                  OPTIONAL,    -- Need R
            pathlossReferenceIndex                INTEGER (0..maxNrofPUSCH-
PathlossReferenceRSs-1),
            ...
      }
OPTIONAL,    -- Need R
      ...
      }
```

Next, a PUSCH transmission method will be described. A DMRS antenna port for PUSCH transmission is the same as an antenna port for SRS transmission. The PUSCH transmission may follow a codebook-based transmission method and a non-codebook-based transmission method, respectively, depending on whether the value of txConfig in pusch-Config of Table 28, which is higher signaling, is 'codebook' or 'nonCodebook'.

As described above, the PUSCH transmission may be dynamically scheduled via DCI format 0_0 or 0_1 and may be semi-statically configured via a configured grant. If the UE receives scheduling for the PUSCH transmission via the DCI format 0_0, the UE performs beam configuration for the PDSCH transmission by using pucch-spatialRelationInfoID corresponding to the UE-specific PUCCH resource corresponding to the minimum ID in the UL BWP activated in the serving cell, and in this case, the PUSCH transmission is based on a single antenna port. The UE does not expect scheduling for the PUSCH transmission via the DCI format 0_0 within the BWP in which the PUCCH resource including pucch-spatialRelationInfo is not configured. If the UE is not configured with txConfig in pusch-Config of Table 28, the UE does not expect to be scheduled via the DCI format 0_1.

TABLE 28

```
PUSCH-Config :=                          SEQUENCE {
    dataScramblingIdentity                   PUSCH INTEGER (0..1023)
OPTIONAL,   -- Need S
    txConfig                                  ENUMERATED {codebook,
nonCodebook}                                      OPTIONAL,   -- Need S
    dmrs-UplinkForPUSCH-MappingTypeA          SetupRelease { DMRS-
UplinkConfig }                                    OPTIONAL,   -- Need M
    dmrs-UplinkForPUSCH-MappingTypeB          SetupRelease { DMRS-
UplinkConfig }                                    OPTIONAL,   -- Need M
    pusch-PowerControl                        PUSCH-PowerControl
OPTIONAL,   -- Need M
    frequencyHopping                          ENUMERATED {intraSlot,
interSlot}                                    OPTIONAL,   -- Need S
    frequencyHoppingOffsetLists               SEQUENCE (SIZE (1..4)) OF
INTEGER (1..maxNrofPhysicalResourceBlocks-1)
OPTIONAL,   -- Need M
    resourceAllocation                        ENUMERATED
{ resourceAllocationType0, resourceAllocationType1, dynamicSwitch},
    pusch-TimeDomainAllocationList            SetupRelease { PUSCH-
TimeDomainResourceAllocationList }                OPTIONAL,   -- Need M
    pusch-AggregationFactor                   ENUMERATED { n2, n4, n8 }
OPTIONAL,   -- Need S
    mcs-Table                                 ENUMERATED {qam256,
qam64LowSE}                                           OPTIONAL,   -- Need S
    mcs-TableTransformPrecoder                ENUMERATED {qam256,
qam64LowSE}                                           OPTIONAL,   -- Need S
    transformPrecoder                         ENUMERATED {enabled, disabled}
OPTIONAL,   -- Need S
    codebookSubset                            ENUMERATED
{fullyAndPartialAndNonCoherent, partialAndNonCoherent,nonCoherent}
OPTIONAL, -- Cond codebookBased
    maxRank                                   INTEGER (1..4)
OPTIONAL, -- Cond codebookBased
    rbg-Size                                  ENUMERATED { config2}
OPTIONAL, -- Need S
    uci-OnPUSCH                               SetupRelease { UCI-OnPUSCH}
OPTIONAL, -- Need M
    tp-pi2BPSK                                ENUMERATED {enabled}
OPTIONAL, -- Need S
    ...
}
```

the SRS resource indicated by the SRI refers to the SRS resource corresponding to the SRI from among SRS resources transmitted before the PDCCH including that SRI. In addition, the TPMI and the transmission rank may be given through the precoding information and number of layers field in the DCI or configured through higher signaling, precodingAndNumberOfLayers. The TPMI is used to indicate the precoder applied to the PUSCH transmission. If the UE is configured with one SRS resource, the TPMI is used to indicate the precoder to be applied in one configured SRS resource. If the UE is configured with a plurality of SRS resources, the TPMI is used to indicate the precoder to be applied in the SRS resource indicated through the SRI.

Next, codebook-based PUSCH transmission will be described. The codebook-based PUSCH transmission may be dynamically scheduled via DCI format 0_0 or 0_1 and may operate semi-statically via a configured grant. When the codebook-based PUSCH is dynamically scheduled via the DCI format 0_1 or semi-statically configured via the configured grant, the UE determines a precoder for the PUSCH transmission, based on an SRS resource indicator (SRI), a transmission precoding matrix indicator (TPMI), and a transmission rank (PUSCH transport layer number).

In this case, the SRI may be given through the SRS resource indicator field in the DCI or configured through higher signaling, srs-ResourceIndicator. Upon the codebook-based PUSCH transmission, the UE is configured with at least one SRS resource and may be configured with up to two. When the UE is provided with the SRI through the DCI, The precoder to be used for the PUSCH transmission is selected in an UL codebook having the same number of antenna ports as the value of nrofSRS-Ports in SRS-Config, which is higher signaling. In the codebook-based PUSCH transmission, the UE determines a codebook subset, based on the TPMI and codebookSubset in the higher signaling, pusch-Config. The CodebookSubset in the pusch-Config, which is higher signaling, may be configured as one of 'fullyAndPartialAndNonCoherent', 'partialAndNonCoherent', or 'nonCoherent', based on the UE capability reported by the UE to the base station. If the UE reports 'partialAndNonCoherent' as the UE capability, the UE does not expect that the value of higher signaling codebookSubset is configured to 'fullyAndPartialAndNonCoherent'. Also, if the UE reports 'nonCoherent' as the UE capability, the UE does not expect that the value of higher signaling codebookSubset is configured to 'fullyAndPartialAndNonCoherent' or 'partialAndNonCoherent'. In case that nrofSRS-Ports in the higher signaling SRS-ResourceSet indicates two SRS antenna ports, the UE does not expect that the value of higher signaling codebookSubset is configured to 'partialAndNonCoherent'.

The UE may be configured with one SRS resource set in which the value of usage in higher signaling SRS-ResourceSet is configured to 'codebook', and one SRS resource in the SRS resource set may be indicated through the SRI. If several SRS resources are configured in the SRS resource set in which the usage value in higher signaling SRS-ResourceSet is configured to 'codebook', the UE expects that the value of nrofSRS-Ports in higher signaling SRS-Resource is configured to the same value for all SRS resources.

The UE transmits, to the base station, one or a plurality of SRS resources contained in the SRS resource set in which the value of usage is configured to 'codebook' according to higher level signaling, and the base station selects one of the SRS resources transmitted by the UE and instructs the UE to perform PUSCH transmission by using the transmit beam information of the selected SRS resource. In this case, in the codebook-based PUSCH transmission, the SRI is used as information for selecting an index of one SRS resource and is contained in the DCI. Additionally, the base station includes, in the DCI, information indicating the TPMI and rank to be used by the UE for the PUSCH transmission. Using the SRS resource indicated by the SRI, the UE performs the PUSCH transmission by applying the precoder indicated by the rank and TPMI indicated based on the transmit beam of the SRS resource.

Next, non-codebook-based PUSCH transmission will be described. The non-codebook-based PUSCH transmission may be dynamically scheduled via DCI format 0_0 or 0_1 and may operate semi-statically via a configured grant. In case that at least one SRS resource is configured in the SRS resource set in which the value of usage in higher signaling SRS-ResourceSet is configured to 'nonCodebook', the UE may receive scheduling of the non-codebook-based PUSCH transmission via the DCI format 0_1.

For the SRS resource set in which the value of usage in higher signaling SRS-ResourceSet is configured to 'nonCodebook', the UE may be configured with one linked NZP CSI-RS resource. The UE may perform the calculation of the precoder for SRS transmission through measurement for the NZP CSI-RS resource linked to the SRS resource set. If a difference between the last received symbol of the aperiodic NZP CSI-RS resource linked to the SRS resource set and the first symbol of the aperiodic SRS transmission in the UE is less than 42 symbols, the UE does not expect that information on the precoder for the SRS transmission is updated.

When the value of resourceType in higher signaling SRS-ResourceSet is configured to 'aperiodic', the linked NZP CSI-RS is indicated by the SRS request, which is a field in DCI format 0_1 or 1_1. At this time, if the linked NZP CSI-RS resource is the aperiodic NZP CSI-RS resource, the existence of the linked NZP CSI-RS is indicated when the value of the SRS request field in the DCI format 0_1 or 1_1 is not '00'. In this case, the DCI should not indicate cross carrier or cross BWP scheduling. In addition, if the value of the SRS request indicates the existence of the NZP CSI-RS, this NZP CSI-RS is located in a slot in which the PDCCH including the SRS request field is transmitted. In this case, the TCI states configured in the scheduled subcarriers are not configured with QCL-TypeD.

If the periodic or semi-persistent SRS resource set is configured, the linked NZP CSI-RS may be indicated through the associated CSI-RS in the SRS-ResourceSet, which is higher signaling. For the non-codebook-based transmission, the UE does not expect that spatialRelationInfo, which is higher signaling for the SRS resource, and associated CSI-RS in SRS-ResourceSet, which is higher signaling, are configured together.

In case that a plurality of SRS resources are configured, the UE may determine the precoder and the transmission rank to be applied to the PUSCH transmission, based on the SRI indicated by the base station. In this case, the SRI may be indicated through the SRS resource indicator field in the DCI or configured through higher signaling, srs-ResourceIndicator. Like the above-described codebook-based PUSCH transmission, when the UE is provided with the SRI through the DCI, the SRS resource indicated by the SRI refers to the SRS resource corresponding to the SRI from among SRS resources transmitted before the PDCCH including the SRI. The UE may use one or a plurality of SRS resources for the SRS transmission, and the maximum number of SRS resources that can be simultaneously transmitted in the same symbol in one SRS resource set is determined by the UE capability reported by the UE to the base station. At this time, the SRS resources simultaneously transmitted by the UE occupy the same RB. The UE configures one SRS port for each SRS resource. The SRS resource set in which the value of usage in higher signaling SRS-ResourceSet is configured to 'nonCodebook' may be configured to only one, and the SRS resource for the non-codebook-based PUSCH transmission may be configured up to four.

The base station transmits one NZP-CSI-RS linked to the SRS resource set to the UE, and the UE calculates the precoder to be used when transmitting one or a plurality of SRS resources in the corresponding SRS resource set, based on the result measured upon receiving the corresponding NZP-CSI-RS. The UE applies the calculated precoder when transmitting one or a plurality of SRS resources in the SRS resource set in which usage is configured to 'nonCodebook' to the base station, and the base station selects one or more of the received one or plurality of SRS resources. In the non-codebook-based PUSCH transmission, the SRI indicates an index capable of expressing one of or a combination of a plurality of SRS resources, and the SRI is contained in the DCI. The number of SRS resources indicated by the SRI transmitted by the base station may be the number of PUSCH transmission layers, and the UE transmits the PUSCH by applying the precoder applied to the SRS resource transmission to each layer.

PUSCH: Preparation Procedure Time

Next, a PUSCH preparation procedure time will be described. In case that the base station schedules the UE to transmit the PUSCH by using DCI format 0_0, 0_1, or 0_2, the UE may need the PUSCH preparation procedure time for transmitting the PUSCH by applying a transmission method (transmission precoding method of SRS resource, number of transmission layers, spatial domain transmission filter) indicated via DCI. In the NR, the PUSCH preparation procedure time is defined in consideration of the above. The UE's PUSCH preparation procedure time may follow Equation (4), below.

$$T_{proc,2}=\max((N_2+d_{2,1}+d_2)(2048+144)\kappa 2^{-\mu}T_{ext}+T_{switch}, d_{2,2}) \tag{4}$$

Respective variables of $T_{proc,2}$ in Equation (4) may have the following meaning:

$N_2$: The number of symbols determined according to the UE processing capability 1 or 2 and the numerology μ depending on the capability of the UE. In case that UE processing capability 1 is reported according to the capability report of the UE, it has the value in Table 29, below. In case that UE processing capability 2 is reported and it is configured through higher layer signaling that UE processing capability 2 can be used, it may have the value in Table 30, below.

TABLE 29

| μ | PUSCH preparation time $N_2$ [symbols] |
|---|---|
| 0 | 10 |
| 1 | 12 |
| 2 | 23 |
| 3 | 36 |

TABLE 30

| μ | PUSCH preparation time $N_2$ [symbols] |
|---|---|
| 0 | 5 |
| 1 | 5.5 |
| 2 | 11 for frequency range 1 |

$d_{2,1}$: The number of symbols determined as 0 if all resource elements of the first OFDM symbol of PUSCH transmission are configured to consist only of DM-RS, otherwise determined as 1.

κ: 64

μ: From among $\mu_{DL}$ or $\mu_{UL}$, it follows the value that makes $T_{proc,2}$ larger. Here, $\mu_{DL}$ denotes the numerology of the DL in which the PDCCH including the DCI for scheduling the PUSCH is transmitted, and $\mu_{UL}$ denotes the numerology of the UL in which the PUSCH is transmitted.

$T_c$: It has $1/(\Delta f_{max} \cdot N_f)$, $\Delta f_{max}=480 \cdot 10^3$ Hz, $N_f=4096$.

$d_{2,2}$: It follows the BWP switching time if the DCI scheduling the PUSCH indicates BWP switching, otherwise, it has 0.

$d_2$: When OFDM symbols of the PUSCH having a high priority index and the PUCCH having a low priority index overlap in time, the $d_2$ value of the PUSCH having a high priority index is used. Otherwise, $d_2$ is 0.

$T_{ext}$: When the UE uses the shared spectrum channel access scheme, the UE may calculate $T_{ext}$ and apply it to the PUSCH preparation procedure time. Otherwise, $T_{ext}$ is assumed to be 0.

$T_{switch}$: When the UL switching interval is triggered, the $T_{switch}$ is assumed to be the switching interval time. Otherwise, it is assumed to be 0.

Considering the influence of the time domain resource mapping information of the PUSCH scheduled via the DCI and the UL-DL timing advance, if the first symbol of the PUSCH starts earlier than the first UL symbol where the CP starts after $T_{proc,2}$ from the last symbol of the PDCCH including the DCI scheduling the PUSCH, the base station and the UE determine that the PUSCH preparation procedure time is not sufficient. Otherwise, the base station and the UE determine that the PUSCH preparation procedure time is sufficient. The UE may transmit the PUSCH only when the PUSCH preparation procedure time is sufficient, and it may ignore the DCI scheduling the PUSCH when the PUSCH preparation procedure time is not enough.

PUSCH: Related to Repetition

Hereinafter, repeated transmission (repetition) of an UL data channel in a 5G system will be described in detail. The 5G system supports two types of repetition methods of the UL data channel: PUSCH repetition type A and PUSCH repetition type B. The UE may be configured with one of PUSCH repetition type A or B via higher layer signaling.

PUSCH Repetition Type A

As described above, the symbol length and the start symbol position of the UL data channel are determined by the TDRA method in one slot, and the base station may notify the number of repetitions to the UE through higher layer signaling (e.g., RRC signaling) or L1 signaling (e.g., DCI).

Based on the number of repetitions received from the base station, the UE may repeatedly transmit the UL data channel having the same length and start symbol as those of the configured UL data channel in consecutive slots. In this case, if at least one symbol in a slot configured as DL by the base station to the UE or among symbols of the UL data channel configured in the UE is configured as DL, the UE omits UL data channel transmission, but the number of repetitions of the UL data channel is counted.

PUSCH Repetition Type B

As described above, the start symbol and length of the UL data channel are determined by the TDRA method in one slot, and the base station may notify the number of repetitions (numberofrepetitions) to the UE through higher layer signaling (e.g., RRC signaling) or L1 signaling (e.g., DCI).

Based on the start symbol and length of the configured UL data channel, the nominal repetition of the UL data channel is determined as follows. A slot where the n-th nominal repetition begins is given by $$K_s + \left\lfloor \frac{S + n \cdot L}{N_{symb}^{slot}} \right\rfloor,$$

and a symbol starting in that slot is given by $$\mathrm{mod}\left(S + n \cdot L,\ N_{symb}^{slot}\right).$$

A slot where the n-th nominal repetition ends is given by $$K_s + \left\lfloor \frac{S + (n+1) \cdot L - 1}{N_{symb}^{slot}} \right\rfloor,$$

and a symbol ending in that slot is given by $$\mathrm{mod}\left(S + (n+1) \cdot L - 1,\ N_{symb}^{slot}\right).$$

Here, n is 0, . . . , numberofrepetitions-1, S denotes the start symbol of the configured UL data channel, and L denotes the symbol length of the configured UL data channel. Also, KS denotes a slot where PUSCH transmission starts, and $$N_{symb}^{slot}$$

denotes the number of symbols per slot.

The UE determines an invalid symbol for the PUSCH repetition type B. A symbol configured for DL by tdd-UL-DL-ConfigurationCommon or tdd-UL-DL-Configuration-Dedicated is determined as the invalid symbol for the PUSCH repetition type B. Additionally, the invalid symbol may be configured in a higher layer parameter (e.g., InvalidSymbolPattern). The higher layer parameter (e.g., InvalidSymbolPattern) provide a symbol-level bitmap spanning one or two slots so that the invalid symbol can be configured. In the bitmap, 1 represents the invalid symbol. Additionally, the period and pattern of the bitmap may be configured through a higher layer parameter (e.g., periodicityAndPattern). If the higher layer parameter (e.g., InvalidSymbolPattern) is configured and the InvalidSymbolPattemIndicator-ForDCIFormat0_1 or InvalidSymbolPatternIndicator-ForDCIFormat0_2 parameter indicates 1, the UE applies an invalid symbol pattern, and if the parameter indicates 0, the UE does not apply the invalid symbol pattern. If the higher layer parameter (e.g., InvalidSymbolPattern) is configured and the InvalidSymbolPatternIndicator-ForDCIFormat0_1 or InvalidSymbolPatternIndicator-ForDCIFormat0_2 parameter is not configured, the UE applies an invalid symbol pattern.

After the invalid symbol is determined, for each nominal repetition, the UE may consider symbols other than the invalid symbol as valid symbols. If one or more valid symbols are included in each nominal repetition, the nominal repetition may include one or more actual repetitions. Here, each actual repetition includes continuous sets of valid symbols that can be used for the PUSCH repetition type B in one slot.

Figure 17:
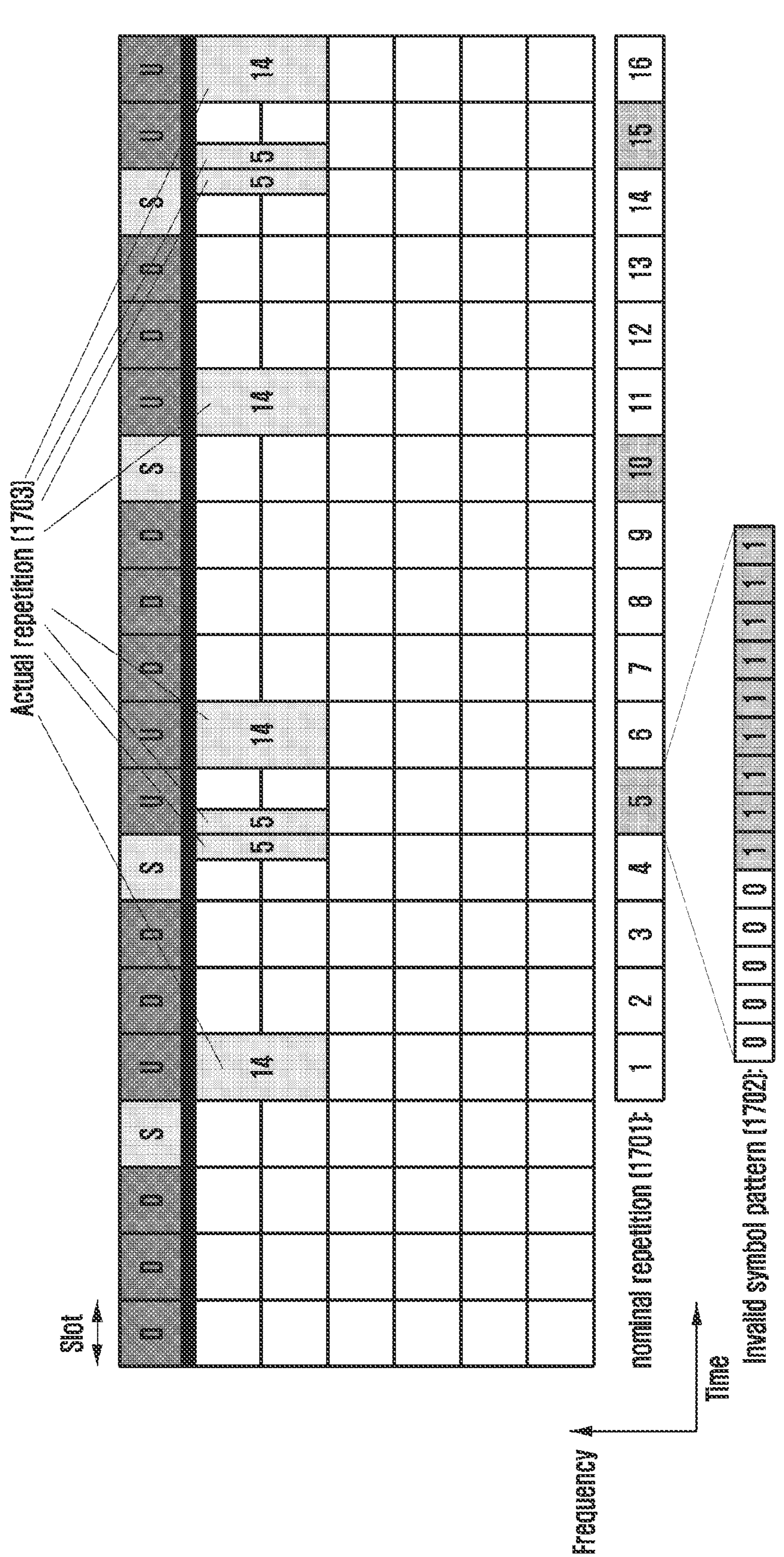
FIG. 17 illustrates physical uplink shared channel (PUSCH) repetition type B in a wireless communication system according to an embodiment.

FIG. 17 illustrates PUSCH repetition type B in a wireless communication system according to an embodiment. The UE may be configured with the start symbol S of the UL data channel as 0, the length L of the UL data channel as 14, and the number of repetitions as 16. In this case, the nominal repetition 1701 appears in 16 consecutive slots. Then, the UE may determine that a symbol configured as a DL symbol in each nominal repetition 1701 is an invalid symbol. Also, the UE determines symbols configured to 1 in an invalid symbol pattern 1702 as invalid symbols. In each nominal repetition, when valid symbols, not invalid symbols, are composed of one or more consecutive symbols in one slot, it may be configured as an actual repetition 1703 and transmitted.

In addition, for the PUSCH repetition, in NR Release 16, additional methods may be defined for UL grant-based PUSCH transmission and configured grant-based PUSCH transmission beyond the slot boundary, as follows:

- Method 1 (mini-slot level repetition): Through one UL grant, two or more PUSCH repetitions are scheduled within one slot or beyond the boundary of consecutive slots. Also, in Method 1, TDRA information in the DCI indicates a resource of the first repetition. In addition, time domain resource information of the first repetition and TDRA information of the remaining repetitions may be determined according to the UL or DL direction determined per symbol of each slot. Each repetition occupies consecutive symbols.
- Method 2 (multi-segment transmission): Through one UL grant, two or more PUSCH repetitions are scheduled in consecutive slots. In this case, one transmission is designated for each slot, and a starting point or repetition length may be different for each transmission. Also, in Method 2, TDRA information in the DCI indicates the start points and repetition lengths of all repetitions. In addition, in case of performing repetition in a single slot through Method 2, if there are multiple bundles of consecutive UL symbols in that slot, each repetition is performed for each bundle of UL symbols. If there is only one bundle of consecutive UL symbols in the slot, one PUSCH repetition is performed according to the method of NR Release 15.
- Method 3: Through two or more UL grants, two or more PUSCH repetitions are scheduled in consecutive slots. In this case, one transmission is designated for each slot, and the n-th UL grant may be received before PUSCH transmission scheduled with the (n−1)-th UL grant ends.
- Method 4: Through one UL grant or one configured grant, one or several PUSCH repetitions in a single slot, or two or more PUSCH repetitions across the boundary of consecutive slots may be supported. The number of repetitions indicated by the base station to the UE is only a nominal value, and the number of PUSCH repetitions actually performed by the UE may be greater than the nominal number of repetitions. The TDRA information in the DCI or in the configured grant refers to the resource of the first repetition indicated by the base station. The TDRA information of the remaining repetitions may be determined by referring to at least resource information of the first repetitions and the UL or DL direction of the symbols. If the TDRA information of the repetition indicated by the base station spans the slot boundary or includes a UL/DL switching point, the corresponding repetition may be divided into a plurality of repetitions. In this case, one repetition may be included for each UL period in one slot.

PUSCH: Frequency Hopping Process

Hereinafter, frequency hopping of an UL data channel (PUSCH) in the 5G system will be described in detail.

In the 5G system, as the frequency hopping method of the UL data channel, two methods are supported for each PUSCH repetition type. First, PUSCH repetition type A supports intra-slot frequency hopping and inter-slot frequency hopping, and PUSCH repetition type B supports inter-repetition frequency hopping and inter-slot frequency hopping.

The intra-slot frequency hopping method supported by the PUSCH repetition type A is a method in which the UE changes and transmits the allocated resources of the frequency domain by a configured frequency offset in two hops within one slot. In the intra-slot frequency hopping, the start RB of each hop can be expressed through Equation (5), below.

$$RB_{start} = \begin{cases} RB_{start} & i = 0 \\ (RB_{start} + RB_{offset}) \bmod N_{BWP}^{size} & i = 1 \end{cases} \quad (5)$$

In Equation (5), i=0 and i=1 indicate a first hop and a second hop, respectively, and $RB_{start}$ indicates a start RB in the UL BWP and is calculated from the FDRA method. $RB_{offset}$ indicates a frequency offset between two hops through a higher layer parameter. The number of symbols in the first hop may be represented by $$\lfloor N_{symb}^{PUSCH,s}/2 \rfloor,$$

and the number of symbols in the second hop may be represented by $$N_s^{PUSCH,s} - \lfloor N_{symb}^{PUSCH,s}/2 \rfloor \cdot N_{symb}^{PUSCH,s}$$

is the length of PUSCH transmission in one slot, and is represented by the number of OFDM symbols.

Next, the inter-slot frequency hopping method supported by the PUSCH repetition types A and B is a method in which the UE changes the allocated resource of the frequency domain for each slot by a configured frequency offset and transmits the same. In the inter-slot frequency hopping, a start RB during a slot may be expressed through Equation (6), below.

$$RB_{start}(n_s^{\mu}) = \begin{cases} RB_{start} & n_s^{\mu} \bmod 2 = 0 \\ (RB_{start} + RB_{offset}) \bmod N_{BWP}^{size} & n_s^{\mu} \bmod 2 = 1 \end{cases} \quad (6)$$

In Equation (6), $$n_s^{\mu}$$

denotes a current slot number in multi-slot PUSCH transmission, $RB_{start}$ denotes a start RB in the UL BWP, and is calculated from the FDRA method. $RB_{offset}$ indicates a frequency offset between two hops through a higher layer parameter.

Next, the inter-repetition frequency hopping method supported by the PUSCH repetition type B is to transmit a resource allocated in the frequency domain for one or a plurality of actual repetitions within each nominal repetition by moving it by a configured frequency offset. $RB_{start}(n)$, which is the index of the start RB on the frequency domain for one or a plurality of actual repetitions within the n-th nominal repetition, may follow Equation (7), below.

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad (7)$$

In Equation (7), n denotes an index of nominal repetition, and $RB_{offset}$ denotes an RB offset between two hops through a higher layer parameter.

Related to UE Capability Report

In LTE and NR systems, the UE may perform a procedure of reporting the capability supported by the UE to the corresponding base station while connected to the serving base station. In the description below, this is referred to as a UE capability report.

The base station may transmit a UE capability inquiry message for requesting a capability report to the UE in the connected state. This message may include a UE capability request for each RAT type of the base station. This request per RAT type may include supported frequency band combination information and the like. In addition, in case of the UE capability inquiry message, UE capability for a plurality of RAT types may be requested through one RRC message container transmitted by the base station, or the base station may send the UE capability inquiry message including the UE capability request per RAT type to the UE by including it multiple times. That is, the UE capability inquiry is repeated a plurality of times within one message, and the UE may create and report the UE capability information message a plurality of times. In the next-generation mobile communication system, the UE capability request for MR-DC (Multi-RAT dual connectivity) including NR, LTE, and EN-DC (E-UTRA-NR dual connectivity) is possible. In addition, the UE capability inquiry message is generally transmitted initially after the UE is connected to the base station, but it can be sent under any conditions when the base station is needed.

In the above step, the UE receiving the UE capability report request from the base station creates the UE capability according to the RAT type and band information requested from the base station. Below, a method for the UE to create the UE capability in the NR system is summarized.

1. If the UE receives a list of LTE and/or NR bands from the base station as the UE capability request, the UE creates a band combination (BC) for EN-DC and NR stand-alone (SA). That is, a candidate list of BC for EN-DC and NR SA is constructed based on the bands requested by the base station with FreqBandList. In addition, the priorities of the bands have priorities in the order described in the FreqBandList.

2. If the base station requests the UE capability report by setting the eutra-nr-only flag or eutra flag, the UE completely removes NR SA BCs from the created BC candidate list. This operation may occur only when an LTE base station (eNB) requests eutra capability.

3. Thereafter, the UE removes fallback BCs from the candidate list of BCs created in the above step. Here, fallback BC refers to BC obtained by removing the band corresponding to at least one SCell from any BC, and because BC before removing the band corresponding to at least one SCell can already cover the fallback BC, it can be omitted. This step also is applied to MR-DC, that is, LTE bands are also applied. The BCs remaining after this step are the final candidate BC list.

4. The UE selects BCs to be reported by selecting BCs suitable for the requested RAT type from the final candidate BC list. In this step, the UE creates the supportedBandCombinationList in a predetermined order. That is, the UE creates the BC and UE capability to be reported according to a preconfigured rat-Type order. (nr→eutra-nr→eutra). Also, the UE creates featureSetCombination for the created supportedBandCombinationList, and creates a list of candidate feature set combination from the candidate BC list from which the list for fallback BC (including the capability of the same or lower level) has been removed. The candidate feature set combination includes the feature set combination for both NR and EUTRA-NR BC, and may be obtained from the feature set combination of UE-NR-Capabilities and UE-MRDC-Capabilities containers.

5. Also, if the requested RAT Type is EUTRA-NR and affects, featureSetCombinations is included in both containers of UE-MRDC-Capabilities and UE-NR-Capabilities. However, the feature set of NR includes only UE-NR-Capabilities.

After the UE capability is created, the UE transmits the UE capability information message including the UE capability to the base station. The base station then performs scheduling and transmission/reception management appropriate for the UE, based on the UE capability received from the UE.

CA/DC Related

Figure 18:
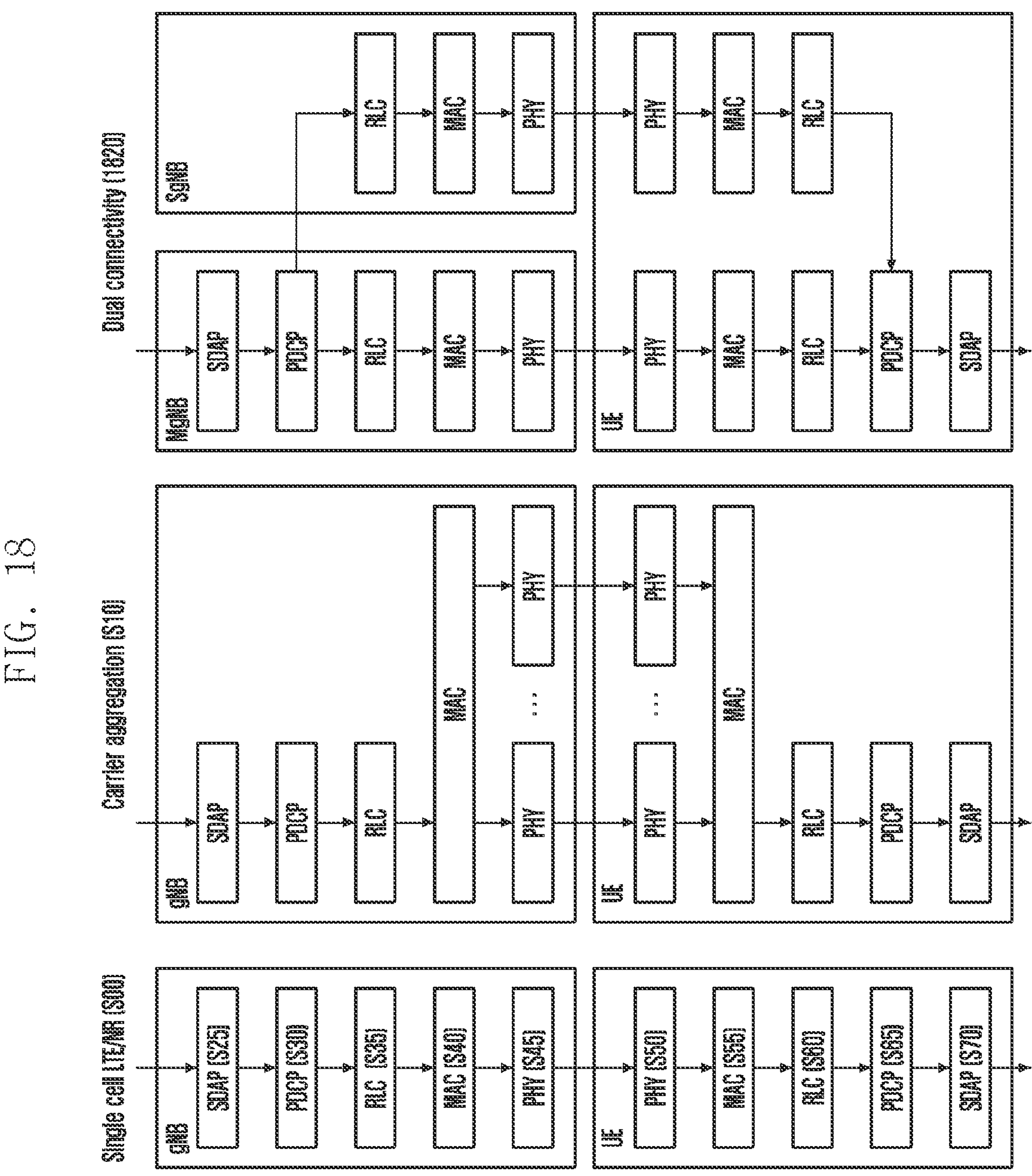
FIG. 18 illustrates radio protocol structures of a base station and a UE in single cell, carrier aggregation, and dual connectivity situations in a wireless communication system according to an embodiment.

FIG. 18 illustrates radio protocol structures of a base station and a UE in single cell, carrier aggregation, and dual connectivity situations according to an embodiment.

With reference to FIG. 18, in each of the NR base station and the UE, the radio protocol of the next-generation mobile communication system is composed of NR service data adaption protocol (SDAP) S25 or S70, NR PDCP S30 or S65, NR radio link control (RLC) S35 or S60, and NR medium access control (MAC) S40 or S55.

The main function of the NR SDAP S25 or S70 may include some of the following functions:

Transfer of user plane data

Mapping between a QoS flow and a data bearer (DRB) for both DL and UL

Marking QoS flow ID in both DL and UL packets

Reflective QoS flow to DRB mapping for the UL SDAP PDUs

For the SDAP layer device, the UE can receive an RRC message for configuring whether to use the header of the SDAP layer device or whether to use the function of the SDAP layer device for each PDCP layer device, for each bearer, or for each logical channel. In case that the SDAP header is configured, a 1-bit NAS reflective QoS indicator and a 1-bit AS reflective QoS indicator may be instructed to enable the UE to update or reconfigure mapping information for QoS flow and data bearer in UL and DL. The SDAP header may include QoS flow ID information indicating QoS. The QoS information may be used as data processing priority and scheduling information to support a smooth service.

The main function of the NR PDCP S30 or S65 may include some of the following functions:

Header compression and decompression (ROHC only)

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink

In the above, the reordering function of the NR PDCP device refers to a function of reordering PDCP PDUs received from a lower layer, based on a PDCP sequence number (SN), and may include a function of delivering data to an upper layer in the reordered order. Alternatively, the reordering function of the NR PDCP device may include a function of directly delivering without considering the order, and may include a function of recording PDCP PDUs lost by reordering. Also, the reordering function of the NR PDCP device may include a function of reporting the status of the lost PDCP PDUs to a transmitting side, and may include a function of requesting retransmission of the lost PDCP PDUs.

The main function of the NR RLC S35 or S60 may include some of the following functions:

Transfer of upper layer PDUs

In-sequence delivery of upper layer PDUs

Out-of-sequence delivery of upper layer PDUs

ARQ function (Error Correction through ARQ)

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

In the above, the in-sequence delivery function of the NR RLC device refers to a function of sequentially delivering RLC SDUs received from a lower layer to an upper layer. The in-sequence delivery of the NR RLC device may include a function of reassembling and delivering received several RLC SDUs divided from one RLC SDU, include a function of rearranging the received RLC PDUs, based on RLC sequence number (SN) or PDCP SN, include a function of recording RLC PDUs lost by reordering, include a function of reporting the status of the lost RLC PDUs to a transmitting side, and include a function of requesting retransmission of the lost RLC PDUs. The in-sequence delivery of the NR RLC device may include a function of, when there is a lost RLC SDU, sequentially delivering only RLC SDUs before the lost RLC SDU to a higher layer, or may include a function of, even if there is a lost RLC SDU but a certain timer has expired, sequentially transferring all RLC SDUs received before the timer starts to a higher layer. Alternatively, even if there is a lost RLC SDU but a certain timer has expired, the in-sequence delivery function of the NR RLC device may include a function of sequentially delivering all currently received RLC SDUs to a higher layer. In addition, the RLC PDUs may be processed in the order of reception (in the order of arrival, regardless of the sequence number) and delivered to the PDCP device regardless of order (i.e., out-of-sequence delivery). The segments stored in the buffer or to be received later are reconstructed into one complete RLC PDU, processed, and delivered to the PDCP device. The NR RLC layer may not include a concatenation function, and this function may be performed by the NR MAC layer or replaced with a multiplexing function of the NR MAC layer.

In the above, the out-of-sequence delivery function of the NR RLC device refers to a function of directly delivering RLC SDUs received from a lower layer to a higher layer regardless of order, and if one RLC SDU is divided into several RLC SDUs and then received, a function of reassembling and transmitting them may be included. Also, a function of storing the RLC SNs or PDCP SNs of the received RLC PDUs, arranging the order, and recording the lost RLC PDUs may be included.

The NR MAC S40 or S55 may be connected to several NR RLC layer devices configured in one UE, and the main function of the NR MAC may include some of the following functions:

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

MBMS service identification

Transport format selection

Padding function

The NR PHY layer S45 or S50 may perform an operation of channel-coding and modulating upper layer data, creating the data into an OFDM symbol and transmitting it to a radio channel, demodulating and channel-decoding the OFDM symbol received through the radio channel, and delivering it to the upper layer.

A detailed structure of the radio protocol structure may be variously changed according to a carrier (or cell) operating scheme. For example, in case S00 (FIG. 18) that the base station transmits data to the UE based on a single carrier (or cell), the base station and the UE use a protocol structure having a single structure for each layer. On the other hand, in case S10 (FIG. 18) that the base station transmits data to the UE based on carrier aggregation (CA) using multiple carriers in a single TRP, the base station and the UE have a single structure up to RLC, but they use a protocol structure of multiplexing the PHY layer through the MAC layer. In still another example, in case S20 that the base station transmits data to the UE based on dual connectivity (DC) 1820 using multiple carriers in multiple TRP, the base station and the UE have a single structure up to RLC, but they use a protocol structure for multiplexing the PHY layer through the MAC layer.

With reference to the above descriptions related to PDCCH and beam configuration, it is difficult to achieve the required reliability in scenarios requiring high reliability, such as URLLC, because PDCCH repetition is not currently supported in Rel-15 and Rel-16 NRs. The disclosure provides a PDCCH repetition method through multiple transmission points (TRP), thereby improving the PDCCH reception reliability of the UE. Specific methods will be described in detail in the following embodiments.

NC-JT Related

According to an embodiment, non-coherent joint transmission (NC-JT) may be used for the UE to receive the PDSCH from a plurality of TRPs.

Unlike the existing system, the 5G wireless communication system can support all of a service requiring a high transfer rate, a service having a low latency, and a service requiring a high connection density. In a wireless communication network including a plurality of cells, transmission and reception points (TRPs), or beams, coordinated transmission between cells, TRPs and/or beams may satisfy various service requirements by increasing the strength of a signal received by the UE or efficiently performing control of interference between cells, TRPs and/or beams.

The joint transmission (JT), which is a representative transmission technology for the above-mentioned cooperative communication (or coordinated transmission), is a technique to increase the UE's received signal strength or throughput by transmitting a signal to one UE through a plurality of different cells, TRPs or/and beams. In this case, a channel between the UE and the cell, TRP or/and beam may have significantly different characteristics. In particular, the NC-JT that supports non-coherent precoding between cells, TRPs and/or beams may require individual precoding, MCS, resource allocation, TCI indication, etc. according to the channel characteristics for each link between the UE and the cell, TRP or/and beam.

The above-described NC-JT transmission may be applied to at least one channel of a DL data channel (PDSCH), a DL control channel (PDCCH), a UL data channel (PUSCH), and a UL control channel (PUCCH). During PDSCH transmission, transmission information such as precoding, MCS, resource allocation, and TCI is indicated by DL DCI, and for the NC-JT transmission, the transmission information should be independently indicated for each cell, TRP, or/and beam. This becomes a major factor in increasing a payload required for DL DCI transmission, which may adversely affect reception performance of the PDCCH transmitting the DCI. Therefore, it is necessary to carefully design a tradeoff between the amount of DCI information and the control information reception performance so as to support the JT of the PDSCH.

FIG. 19 illustrates an antenna port configuration and resource allocation for cooperative communication in a wireless communication system according to an embodiment. With reference to FIG. 19, an example for PDSCH transmission is described for each technique of JT, and examples for allocating radio resources for each TRP are shown.

With reference to FIG. 19, an example N000 of coherent joint transmission (C-JT) supporting coherent precoding between cells, TRPs or/and beams is shown.

In case of C-JT, TRP A N005 and TRP B N010 transmit a single data (PDSCH) to the UE N015, and joint precoding may be performed in a plurality of TRPs. This may mean that DMRS is transmitted through the same DMRS ports so that TRP A N005 and TRP B N010 transmit the same PDSCH. For example, each of TRP A N005 and TRP B N010 may transmit the DRMS to the UE through DMRS port A and DMRS B. In this case, the UE may receive one piece of DCI information for receiving one PDSCH demodulated based on the DMRS transmitted through DMRS port A and DMRS B.

FIG. 19 illustrates an example N020 of NC-JT supporting non-coherent precoding between cells, TRPs or/and beams for PDSCH transmission, with TRP A N025 and TRP B N030 transmitting a single data (PDSCH) to UE N035.

In case of NC-JT, the PDSCH is transmitted to the UE N035 for each cell, TRP, and/or beam, and individual precoding may be applied to each PDSCH. Each cell, TRP and/or beam transmits a different PDSCH or a different PDSCH layer to the UE, thereby improving throughput compared to single cell, TRP, and/or beam transmission. In addition, each cell, TRP and/or beam repeatedly transmits the same PDSCH to the UE, thereby improving reliability compared to single cell, TRP, and/or beam transmission. For convenience of description, the cell, TRP, and/or beam is hereinafter collectively referred to as a TRP.

For PDSCH transmission, various radio resource allocation cases may be considered such as a case N040 in which the frequency and time resources used by a plurality of TRPs are all the same, a case N045 in which the frequency and time resources used by the plurality of TRPs do not overlap at all, and a case N050 in which the frequency and time resources used by the plurality of TRPs overlap in part.

In order to simultaneously allocate a plurality of PDSCHs to one UE for NC-JT support, DCIs of various types, structures, and relationships may be considered.

Figure 20:
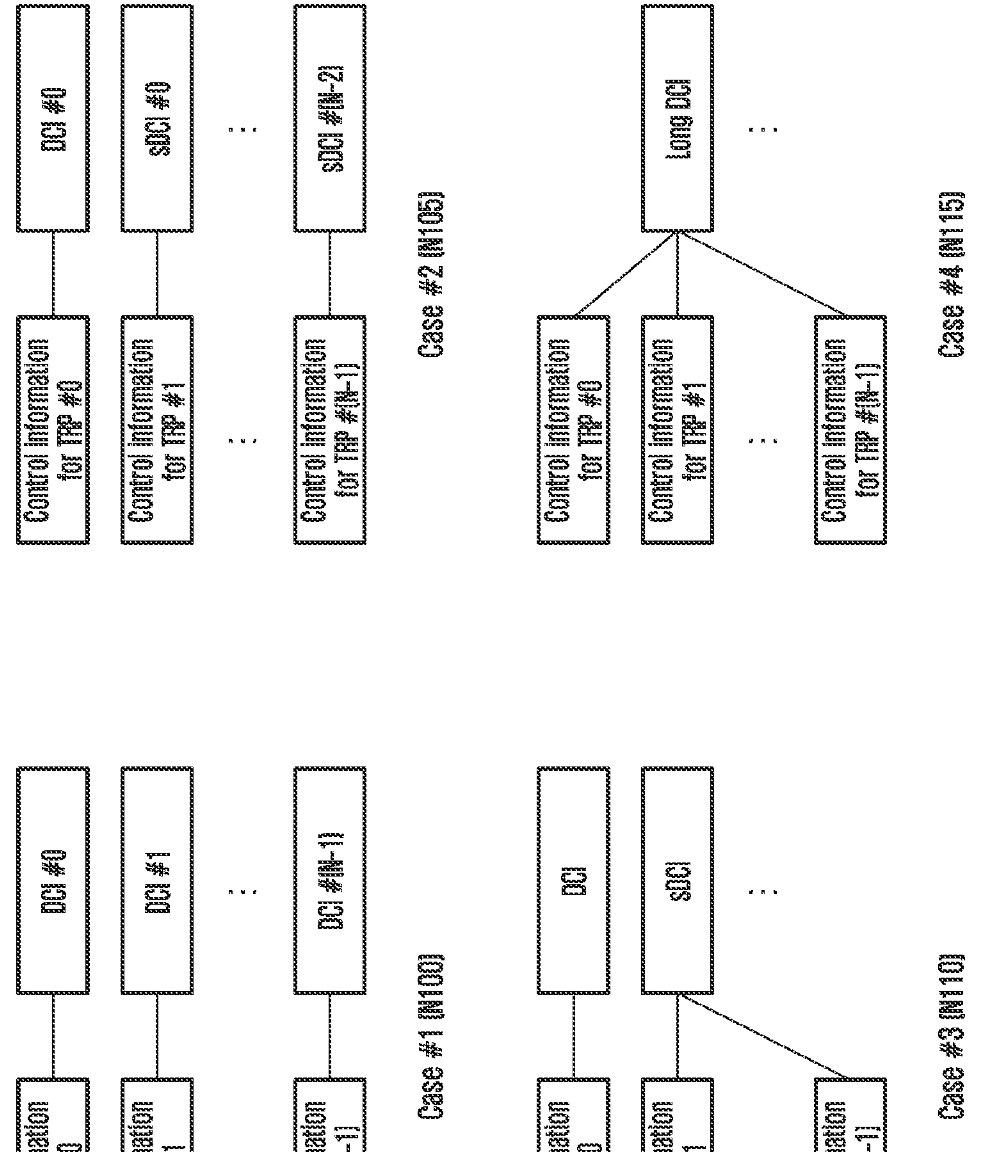
FIG. 20 illustrates DCI for cooperative communication in a wireless communication system according to an embodiment.

FIG. 20 illustrates DCI for NC-JT in which respective TRPs transmit different PDSCHs or different PDSCH layers to a UE in a wireless communication system according to an embodiment.

With reference to FIG. 20, case #1 N100 is an example that, in a situation where different (N−1) PDSCHs are transmitted from (N−1) additional TRPs (TRP #1 to TRP #(N−1)) in addition to a serving TRP (TRP #0) used for single PDSCH transmission, control information for the PDSCHs transmitted in the (N−1) additional TRPs is transmitted independently of control information for the PDSCHs transmitted in the serving TRP. That is, the UE may obtain control information for PDSCHs transmitted from different TRPs (TRP #0 to TRP #(N−1)) through independent DCIs (DCI #0 to DCI #(N−1)). The format between the independent DCIs may be identical with or different from each other, and the payload between the DCIs may also be identical with or different from each other. In the aforementioned case #1, each PDSCH control or allocation freedom can be completely guaranteed, but when each DCI is transmitted in different TRPs, a coverage difference for each DCI may occur and reception performance may deteriorate.

Case #2 N105 is an example that, in a situation where different (N−1) PDSCHs are transmitted from (N−1) additional TRPs (TRP #1 to TRP #(N−1)) in addition to a serving TRP (TRP #0) used for single PDSCH transmission, DCI for the PDSCH of (N−1) additional TRPs is transmitted, and each of these DCIs is dependent on the control information for the PDSCH transmitted from the serving TRP.

For example, in case of DCI #0, which is control information for PDSCH transmitted from the serving TRP (TRP #0), all information elements of DCI format 1_0, DCI format 1_1, and DCI format 1_2 are included, but in case of shortened DCI (hereinafter, sDCI) (sDCI #0 to sDCI #(N−2)), which is control information for PDSCHs transmitted from cooperative TRPs (TRP #1 to TRP #(N−1)), only some of the information elements of format 1_0, DCI format 1_1, and DCI format 1_2 may be included. Therefore, in case of sDCI transmitting control information for PDSCHs transmitted from cooperative TRPs, because the payload is small compared to normal DCI (nDCI) for transmitting PDSCH-related control information transmitted from the serving TRP, it is possible to include reserved bits compared to nDCI.

In case #2 described above, each PDSCH control or allocation freedom may be limited according to the content of the information element included in sDCI, but because the reception performance of sDCI is superior to that of nDCI, a probability of occurrence of a coverage difference for each DCI may be reduced.

Case #3 N110 is an example that, in a situation where different (N−1) PDSCHs are transmitted from (N−1) additional TRPs (TRP #1 to TRP #(N−1)) in addition to a serving TRP (TRP #0) used for single PDSCH transmission, one control information for the PDSCH of (N−1) additional TRPs is transmitted, and this DCI is dependent on the control information for the PDSCH transmitted from the serving TRP.

For example, in case of DCI #0, which is control information for PDSCH transmitted from the serving TRP (TRP #0), all information elements of DCI format 1_0, DCI format 1_1, and DCI format 1_2 are included, and in case of control information for PDSCHs transmitted from cooperative TRPs (TRP #1 to TRP #(N−1)), only some of the information elements of DCI format 1_0, DCI format 1_1, and DCI format 1_2 may be collected as one 'secondary' DCI (sDCI) and transmitted. For example, the sDCI may include at least one of HARQ-related information such as frequency domain resource assignment, time domain resource assignment, and MCS of cooperative TRPs. In addition, in case of information not included in the sDCI, such as a BWP indicator or carrier indicator, it may follow DCI (DCI #0, normal DCI, nDCI) of the serving TRP.

In case #3 N110, each PDSCH control or allocation freedom may be limited according to the content of the information element included in the sDCI, but the sDCI reception performance can be adjusted and, compared to case #1 N100 or case #2 N105, the complexity of DCI blind decoding of the UE may be reduced.

Case #4 N115 is an example that, in a situation where different (N−1) PDSCHs are transmitted from (N−1) additional TRPs (TRP #1 to TRP #(N−1)) in addition to a serving TRP (TRP #0) used for single PDSCH transmission, control information for PDSCH transmitted from (N−1) additional TRPs is transmitted in the same DCI (long DCI) as control information for PDSCH transmitted from the serving TRP. That is, the UE may obtain control information for PDSCHs transmitted from different TRPs (TRP #0 to TRP #(N−1)) through a single DCI. In case #4 N115, the complexity of DCI blind decoding of the UE may not increase, but the PDSCH control or freedom of allocation may be low, such as the number of cooperative TRPs is limited according to long DCI payload restrictions.

In the following description and embodiments, the sDCI may refer to various auxiliary DCIs, such as shortened DCI, secondary DCI, or normal DCI (the above-described DCI formats 1_0 to 1_1) including PDSCH control information transmitted in cooperative TRP. If no particular limitation is specified, the description is similarly applicable to the various auxiliary DCIs.

In the following description and embodiments, the above-described cases #1 N100, case #2 N105, and case #3 N110 in which one or more DCI (PDCCH) are used for NC-JT support may be referred to as multiple PDCCH-based NC-JT, and the above-described case #4 N115 in which a single DCI (PDCCH) is used for NC-JT support may be referred to as a single PDCCH-based NC-JT. In multiple PDCCH-based PDSCH transmission, the CORESET in which the DCI of the serving TRP (TRP #0) is scheduled and the CORESET in which the DCI of the cooperative TRPs (TRP #1 to TRP #(N−1)) are scheduled can be distinguished. As a method for distinguishing CORESETs, there may be a method for distinguishing through a higher layer indicator for each CORESET, a method for distinguishing through a beam configuration for each CORESET, and the like. In addition, in a single PDCCH-based NC-JT, instead of a single DCI scheduling a plurality of PDSCHs, a single PDSCH having a plurality of layers is scheduled, and the plurality of layers described above may be transmitted from a plurality of TRPs. At this time, a connection relationship between a layer and a TRP for transmitting the layer may be indicated through a TCI indication for the layer.

In certain embodiments, "cooperative TRP" may be replaced with various terms such as "cooperative panel" or "cooperative beam" when applied in practice.

In certain embodiments, "a case where NC-JT is applied" may be interpreted in various ways depending on situations, such as "a case where the UE receives one or more PDSCHs at the same time in one BWP", "a case where the UE receives the PDSCH based on indication of two or more TCIs simultaneously in one BWP", and "a case where the PDSCH received by the UE is associated with one or more DMRS port groups". However, for convenience, it is used as a single expression.

In the disclosure, the radio protocol structure for NC-JT can be used in various ways depending on TRP deployment scenarios. For example, when there is no or small backhaul delay between cooperative TRPs, a method (CA-like method) using a structure based on MAC layer multiplexing similar to S10 of FIG. x4 is possible. On the other hand, when the backhaul delay between cooperative TRPs is so large that it cannot be ignored (for example, when information exchange of CSI, scheduling, HARQ-ACK, etc. between cooperative TRPs requires 2 ms or more), a method (DC-like method) of securing a characteristic strong against delay is possible by using an independent structure for each TRP from the RLC layer similar to S20 of FIG. x4.

The UE supporting C-JT/NC-JT may receive a C-JT/NC-JT related parameter or setting value from higher layer configuration, and may set an RRC parameter of the UE based on this. For the higher layer configuration, the UE may use a UE capability parameter, for example, tci-StatePDSCH. Here, the UE capability parameter, for example, tci-StatePDSCH, may define TCI states for the purpose of PDSCH transmission, and the number of TCI states may be configured to 4, 8, 16, 32, 64, or 128 in FR1, and to 64 or 128 in FR2, and in the configured number, a maximum of 8 states that can be indicated by 3 bits of the TCI field of DCI through the MAC CE message may be configured. The maximum value of 128 refers to a value indicated by maxNumberConfiguredTCIstatesPerCC in the tci-StatePDSCH parameter included in capability signaling of the UE. As such, a series of configuration procedures from upper layer configuration to MAC CE configuration may be applied to a beamforming indication or a beamforming change command for at least one PDSCH in one TRP.

Multi-TRP Based on Multi-DCI

As an embodiment, a multi-TRP transmission method, which is based on multi-DCI, will be described. The multi-TRP transmission method may be configured through a DL control channel for NC-JT transmission based on multi-PDCCH.

In NC-JT based on multiple PDCCH, upon DCI transmission for PDSCH scheduling of each TRP, it may have a CORESET or search space distinguished for each TRP. The CORESET or search space for each TRP can be configured as at least one of the following cases:

- Higher layer index configuration for each CORESET: The CORESET configuration information configured as the higher layer may include an index value, and the TRP for transmitting the PDCCH in the corresponding CORESET may be distinguished by the configured index value for each CORESET. That is, in a set of CORESETs having the same higher layer index value, it may be considered that the same TRP transmits the PDCCH or that the PDCCH scheduling the PDSCH of the same TRP is transmitted. The above-described index for each CORESET may be named as CORESETPoolIndex, and for CORESETs to which the same CORESETPoolIndex value is configured, it may be considered that the PDCCH is transmitted from the same TRP. In case of CORESET in which the CORESETPoolIndex value is not configured, it may be considered that the default value of CORESETPoolIndex has been configured, and the above-described default value may be 0.
- In the disclosure, if the type of CORESETPoolIndex of each of a plurality of CORESETs included in the higher layer signaling PDCCH-Config exceeds one, that is, if each CORESET has a different CORESETPoolIndex, the UE may consider that the base station uses the multi-DCI based multi-TRP transmission method.
- Alternatively, if the type of CORESETPoolIndex of each of a plurality of CORESETs included in the higher layer signaling PDCCH-Config is one, that is, if all CORESETs have the same CORESETPoolIndex of 0 or 1, the UE may consider that the base station uses single-TRP instead of using the multi-DCI based multi-TRP transmission method.
- Multiple PDCCH-Config configurations: Multiple PDCCH-Configs are configured in one BWP, and each PDCCH-Config may include PDCCH configuration for each TRP. That is, a list of CORESETs per TRP and/or a list of search spaces per TRP may be composed in one PDCCH-Config, and one or more CORESETs and one or more search spaces contained in one PDCCH-Config may be considered to correspond to a specific TRP.
- CORESET beam/beam group configuration: Through a beam or beam group configured for each CORESET, the TRP corresponding to the CORESET can be distinguished. For example, when the same TCI state is configured in a plurality of CORESETs, it may be considered that the CORESETs are transmitted through the same TRP or that the PDCCH scheduling the PDSCH of the same TRP is transmitted in the CORESETs.
- Search space beam/beam group configuration: A beam or beam group is configured for each search space, and the TRP for each search space can be distinguished through this. For example, when the same beam/beam group or TCI state is configured in a plurality of search spaces, it may be considered that the same TRP transmits the PDCCH in the search spaces or that the PDCCH scheduling the PDSCH of the same TRP is transmitted in the search spaces.

By distinguishing the CORESET or search space by TRP, as described above, it is possible to classify PDSCH and HARQ-ACK information for each TRP, and through this, it is possible to generate an independent HARQ-ACK codebook for each TRP and use an independent PUCCH resource.

The above configuration may be independent for each cell or for each BWP. For example, while two different CORESETPoolIndex values are configured in the PCell, the CORESETPoolIndex value may not be configured in a specific SCell. In this case, it may be considered that the NC-JT transmission is configured in the PCell, whereas the NC-JT transmission is not configured in the SCell in which the CORESETPoolIndex value is not configured.

The PDSCH TCI state activation/deactivation MAC-CE applicable to the multi-DCI based multi-TRP transmission method may follow FIGS. 16A and 16B. If the UE is not configured with CORESETPoolIndex for each of all CORESETs in the higher layer signaling PDCCH-Config, the UE may ignore a CORESET Pool ID field 16-55 (FIG. 16B) in the corresponding MAC-CE 16-50. If the UE can support the multi-DCI based multi-TRP transmission method, that is, if the UE has a different CORESETPoolIndex for each CORESET in the higher layer signaling PDCCH-Config, the UE may activate the TCI state in the DCI contained in the PDCCH transmitted in CORESETs having the same CORESETPoolIndex value as the CORESET Pool ID field 16-55 value in the corresponding MAC-CE 16-50. For example, if the value of the CORESET Pool ID field 16-55 in the MAC-CE 16-50 is 0, the TCI state in the DCI contained in the PDCCH transmitted in CORESETs having the CORESETPoolIndex of 0 may follow the activation information of the corresponding MAC-CE.

When the UE is configured to use the multi-TRP transmission method based on the multi-DCI from the base station, that is, when the type of CORESETPoolIndex of each of a plurality of CORESETs included in the higher layer signaling PDCCH-Config exceeds one, or when each CORESET has different CORESETPoolIndexes, the UE may know that the following restrictions exist for PDSCHs scheduled from the PDCCH in each CORESET having two different CORESETPoolIndexes:

1) In case that PDSCHs indicated from the PDCCH in each CORESET having two different CORESETPoolIndexes completely or partially overlap, the UE may apply the TCI states indicated by each PDCCH to different CDM groups, respectively. That is, two or more TCI states may not be applied to one CDM group.

2) In case that PDSCHs indicated from the PDCCH in each CORESET having two different CORESETPoolIndexes completely or partially overlap, the UE may expect that the actual number of front loaded DMRS symbols, the number of additional DMRS symbols, the actual position of the DMRS symbols, and the DMRS type are not varied for each PDSCH.

3) The UE may expect the same bandwidth portion and the same subcarrier spacing are indicated from the PDCCH in each CORESET having two different CORESETPoolIndexes.

4) The UE may expect that each PDCCH completely includes information about the PDSCH scheduled from the PDCCH in each CORESET having two different CORESETPoolIndexes.

Multi-TRP Based on Single-DCI

An embodiment, based on Single-DCI, of a Multiple-TRP transmission method will be described. The multi-TRP transmission method based on single-DCI, may be configured through a DL control channel for the NC-JT transmission based on a single-PDCCH.

In the multi-TRP transmission method based on the single-DCI, the PDSCH transmitted by multiple TRPs may be scheduled with one DCI. In this case, the number of TCI states may be used as a method of indicating the number of TRPs transmitting the corresponding PDSCH. That is, if the number of TCI states indicated in the DCI for scheduling the PDSCH is two, it can be regarded as single PDCCH based NC-JT transmission, and if the number of TCI states is one, it can be regarded as single-TRP transmission. The TCI states indicated in the DCI may correspond to one or two TCI states among TCI states activated with MAC-CE. When the TCI states of the DCI correspond to two TCI states activated with MAC-CE, a correspondence relationship between the TCI codepoint indicated in the DCI and the TCI states activated with the MAC-CE is established, and this may be when the TCI states activated with the MAC-CE corresponding to the TCI codepoint are two.

In another example, if at least one codepoint among all codepoints of the TCI state field in the DCI indicates two TCI states, the UE may consider that the base station can perform transmission based on the single-DCI based multi-TRP method. In this case, at least one codepoint indicating two TCI states in the TCI state field may be activated through the enhanced PDSCH TCI state activation/deactivation MAC-CE.

Figure 21:
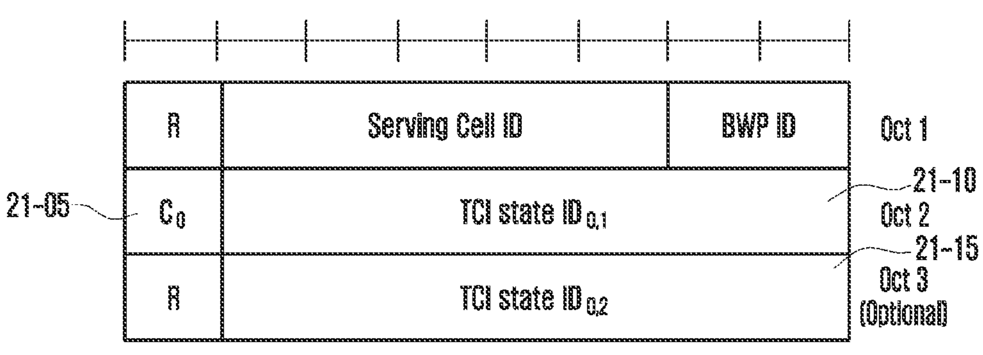
FIG. 21 illustrates an enhanced PDSCH TCI state activation/deactivation MAC-CE structure.

FIG. 21 illustrates an enhanced PDSCH TCI state activation/deactivation MAC-CE structure. The meaning of each field in the MAC CE and the values configurable for each field are as follows:

- Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;
- BWP ID: This field indicates a DL BWP for which the MAC CE applies as the codepoint of the DCI BWP indicator field as specified in TS 38.212 [9]. The length of the BWP ID field is 2 bits;
- $C_i$: This field indicates whether the octet containing TCI state $ID_{i,2}$ is present. If this field is configured to "1", the octet containing TCI state $ID_{i,2}$ is present. If this field is configured to "0", the octet containing TCI state $ID_{i,2}$ is not present;
- TCI state $ID_{i,j}$: This field indicates the TCI state identified by TCI-StateId as specified in TS 38.331 [5], where i is the index of the codepoint of the DCI Transmission configuration indication field as specified in TS 38.212 [9] and TCI state $ID_{i,j}$ denotes the j-th TCI state indicated for the i-th codepoint in the DCI Transmission Configuration Indication field. The TCI codepoint to which the TCI States are mapped is determined by its ordinal position among all the TCI codepoints with sets of TCI state $ID_{i,j}$ fields, i.e. the first TCI codepoint with TCI state $ID_{0,1}$ and TCI state $ID_{0,2}$ shall be mapped to the codepoint value 0, the second -continued TCI codepoint with TCI state $ID_{1,1}$ and TCI state $ID_{1,2}$ shall be mapped to the codepoint value 1 and so on. The TCI state $ID_{i,2}$ is optional based on the indication of the Ci field. The maximum number of activated TCI codepoint is 8 and the maximum number of TCI states mapped to a TCI codepoint is 2.
- R: Reserved bit, set to "0".

In FIG. 21, if the value of a $C_0$ field 21-05 is 1, the corresponding MAC-CE may include a TCI state $ID_{0,2}$ field 21-15 in addition to a TCI state $ID_{0,1}$ field 21-10. This means that TCI state $ID_{0,1}$ and TCI state $ID_{0,2}$ are activated for the 0th codepoint of the TCI state field included in the DCI, and if the base station indicates the corresponding codepoint to the UE, the UE may be indicated with two TCI states. If the value of the $C_0$ field 21-05 is 0, the corresponding MAC-CE cannot include the TCI state $ID_{0,2}$ field 21-15. This means that one TCI state corresponding to TCI state $ID_{0,1}$ is activated for the 0th codepoint of the TCI state field included in the DCI.

The above configuration may be independent for each cell or for each BWP. For example, the PCell may have a maximum of two activated TCI states corresponding to one TCI codepoint, whereas a specific SCell may have a maximum of one activated TCI states corresponding to one TCI codepoint. In this case, it may be considered that the NC-JT transmission is configured in the PCell, whereas the NC-JT transmission is not configured in the aforementioned SCell.

Method for distinguishing Multi-TRP PDSCH repetition schemes based on Single-DCI (TDM/FDM/SDM)

Next, a method for distinguishing multi-TRP PDSCH repetition schemes based on single-DCI will be described. The UE may be instructed with different multi-TRP PDSCH repetition schemes based on single-DCI (e.g., time division multiplexing (TDM), frequency division multiplexing (FDM), spatial division multiplexing (SDM) according to the value indicated via the DCI field from the base station and the higher layer signaling configuration. Table 31 below shows a method for distinguishing between single or multiple TRP-based schemes indicated to the UE according to the value of a specific DCI field and higher layer signaling configuration.

TABLE 31

| Combination | Number of TCI states | Number of CDM groups | repetition-Number configuration & indication conditions | repetition-Scheme configuration related | Transmission scheme indicated to UE |
|---|---|---|---|---|---|
| 1 | 1 | ≥1 | Condition 2 | Not configured | Single-TRP |
| 2 | 1 | ≥1 | Condition 2 | Configured | Single-TRP |
| 3 | 1 | ≥1 | Condition 3 | Configured | Single-TRP |
| 4 | 1 | 1 | Condition 1 | Configured or not configured | Single-TRP TDM scheme B |
| 5 | 2 | 2 | Condition 2 | Not configured | Multi-TRP SDM |
| 6 | 2 | 2 | Condition 3 | Not configured | Multi-TRP SDM |
| 7 | 2 | 2 | Condition 3 | Configured | Multi-TRP SDM |

TABLE 31-continued

| Combi-nation | Number of TCI states | Number of CDM groups | repetition-Number configuration & indication conditions | repetition-Scheme configuration related | Trans-mission scheme indicated to UE |
|---|---|---|---|---|---|
| 8 | 2 | 2 | Condition 3 | Configured | Multi-TRP FDM scheme A/FDM scheme B/TDM scheme A |
| 9 | 2 | 2 | Condition 1 | Not configured | Multi-TRP TDM scheme B |

In Table 31, each column can be described as follows:

Number of TCI states (column 2): It means the number of TCI states indicated by the TCI state field in the DCI, and may be one or two.

Number of CDM groups (column 3): It means the number of different CDM groups of DMRS ports indicated by the antenna port field in the DCI. It may be 1, 2 or 3.

repetitionNumber configuration and indication condition (column 4): There may be three conditions depending on whether repetitionNumber is configured for all TDRA entries that can be indicated by the TDRA field in the DCI and whether the actually indicated TDRA entry has repetitionNumber configuration.

Condition 1: In case that at least one of all TDRA entries that can be indicated by the TDRA field includes configuration for repetitionNumber, and the TDRA entry indicated by the TDRA field in the DCI includes configuration for repetitionNumber greater than 1

Condition 2: In case that at least one of all TDRA entries that can be indicated by the TDRA field includes configuration for repetitionNumber, and the TDRA entry indicated by the TDRA field in the DCI does not includes configuration for repetitionNumber Condition 3: In case that all TDRA entries that can be indicated by the TDRA field do not include configuration for repetitionNumber repetitionScheme configuration related (column 5): It indicates whether repetitionScheme, which is a higher layer signaling, is configured. One of 'tdmSchemeA', 'fdmSchemeA', and 'fdmSchemeB' may be configured for the higher layer signaling repetitionScheme.

Transmission scheme indicated to the UE (column 6): It refers to single or multiple TRP schemes indicated according to each combination (column 1) shown in Table 31, above.

Single-TRP: It means single-TRP based PDSCH transmission. If the UE is configured with pdsch-AggegationFactor in the higher layer signaling PDSCH-config, the UE may be scheduled with single-TRP based PDSCH repetition as many times as the configured number of times. Otherwise, the UE may be scheduled with a single-TRP based PDSCH single transmission.

Single-TRP TDM scheme B: It means PDSCH repetition based on time resource division between slots based on single TRP. According to the above-described repetitionNumber related Condition 1, the UE repeatedly transmits the PDSCH on time resources by the number of slots having the repetitionNumber greater than 1 configured in the TDRA entry indicated by the TDRA field. At this time, the same start symbol and symbol length of the PDSCH indicated by the TDRA entry are applied to each slot as many times as repetitionNumber, and the same TCI state is applied to each PDSCH repetition. This scheme is similar to the slot aggregation scheme in that it performs PDSCH scheme between slots on time resources, but is different from the slot aggregation in that it is possible to dynamically determine whether to indicate repetition based on the TDRA field in the DCI.

Multi-TRP SDM: It means a PDSCH transmission scheme based on multi-TRP based spatial resource division. This is a method of receiving each TRP by dividing layers. Although it is not a repetition method, it is possible to increase the reliability of PDSCH transmission in that transmission is possible at a lower coding rate by increasing the number of layers. The UE may receive the PDSCH by applying two TCI states indicated through the TCI state field in the DCI to two CDM groups indicated by the base station, respectively.

Multi-TRP FDM scheme A: It means a PDSCH transmission scheme based on multi-TRP based frequency resource division. Although it is not a repetition method like multi-TRP SDM because it has one PDSCH transmission occasion, it is a scheme capable of transmission with high reliability by increasing the frequency resource amount and lowering the coding rate. Multi-TRP FDM scheme A may apply two TCI states indicated through the TCI state field in the DCI to frequency resources that do not overlap each other, respectively. If the PRB bundling size is determined to be wideband, and if the number of RBs indicated by the FDRA field is N, the UE receives the first ceil(N/2) RBs by applying the first TCI state and the remaining floor(N/2) RBs by applying the second TCI state. Here, ceil(.) and floor(.) are operators for rounding up and rounding off the first decimal place. If the PRB bundling size is determined to be 2 or 4, even-numbered PRGs apply the first TCI state, and odd-numbered PRGs apply the second TCI state.

Multi-TRP FDM scheme B: It means a PDSCH repetition scheme based on multi-TRP based frequency resource division, and is capable of repeatedly transmitting the PDSCH at two PDSCH transmission occasions. Multi-TRP FDM scheme B, like A, may also apply two TCI states indicated through the TCI state field in the DCI to non-overlapping frequency resources, respectively. If the PRB bundling size is determined to be wideband, and if the number of RBs indicated by the FDRA field is N, the UE receives the first ceil(N/2) RBs by applying the first TCI state and the remaining floor(N/2) RBs by applying the second TCI state. Here, ceil(.) and floor(.) are operators for rounding up and rounding off the first decimal place. If the PRB bundling size is determined to be 2 or 4, even-numbered PRGs apply the first TCI state, and odd-numbered PRGs apply the second TCI state.

Multi-TRP TDM scheme A: It means a PDSCH repetition scheme in a multi-TRP based time resource division slot. The UE has two PDSCH transmission occasions in one slot, and the first reception occasion may be determined based on the start symbol and symbol length of the PDSCH indicated through the TDRA field in the DCI. The start symbol of the second reception occasion of the PDSCH may be a position to which a symbol offset is applied as much as StartingSymbolOffsetK, which is higher layer signaling, from the last symbol of the first transmission occasion, and the transmission occasion may be determined by the symbol length indicated therefrom. If the higher layer signaling, StartingSymbolOffsetK, is not configured, the symbol offset may be regarded as 0.

Multi-TRP TDM scheme B: It means a PDSCH repetition scheme between multi-TRP based time resource division slots. The UE has one PDSCH transmission occasion in one slot, and may receive repetition based on the start symbol and symbol length of the same PDSCH for the number of repetitionNumber times indicated through the TDRA field in the DCI. If repetitionNumber is 2, the UE may receive PDSCH repetitions in the first and second slots by applying the first and second TCI states, respectively. If repetitionNumber is greater than 2, the UE may use different TCI state applying schemes depending on which higher layer signaling tciMapping is configured. If tciMapping is configured to cyclicMapping, the first and second TCI states are applied to the first and second PDSCH transmission occasions, respectively, and this TCI state applying method is equally applied to the remaining PDSCH transmission occasions. If tciMapping is configured to sequentialMapping, the first TCI state is applied to the first and second PDSCH transmission occasions, and the second TCI state is applied to the third and fourth PDSCH transmission occasions. The same method is applied to the remaining PDSCH transmission occasions.

RLM RS Related

Next, a method for selecting or determining a radio link monitoring reference signal (RLM RS) when the RLM RS is configured or not configured is described. The UE may be configured with a set of RLM RSs from the base station through RadioLinkMonitoringRS in RadioLinkMonitoringConfig, which is higher layer signaling, for each DL BWP of SpCell, and a specific higher layer signaling structure may follow Table 32, below.

TABLE 32

```
RadioLinkMonitoringConfig := SEQUENCE {
    failureDetectionResourcesToAddModList    SEQUENCE
(SIZE(1..maxNrofFailureDetectionResources)) OF RadioLinkMonitoringRS        OPTIONAL, --
Need N
    failureDetectionResourcesToReleaseList SEQUENCE
(SIZE(1..maxNrofFailureDetectionResources)) OF RadioLinkMonitoringRS-Id OPTIONAL, --
Need N
    beamFailureInstanceMaxCount ENUMERATED {n1, n2, n3, n4, n5, n6, n8, n10}
                    OPTIONAL, -- Need R
    beamFailureDetectionTimer ENUMERATED {pbfd1, pbfd2, pbfd3, pbfd4, pbfd5, pbfd6,
pbfd8, pbfd10}                    OPTIONAL, -- Need R
...
}
RadioLinkMonitoringRS ::= SEQUENCE {
    radioLinkMonitoringRS-Id    RadioLinkMonitoringRS-Id,
    purpose            ENUMERATED {beamFailure, rlf, both},
    detectionResource        CHOICE {
        ssb-Index        SSB-Index,
        csi-RS-Index        NZP-CSI-RS-ResourceId
    },
...
}
```

Table 33 below may indicate the configurable or selectable number of RLM RSs for each specific use according to the maximum number of SSBs (Lmax) per half frame. As shown in Table 33 below, according to the Lmax value, $N_{LR-RLM}$ RSs may be used for link recovery or radio link monitoring, and $N_{RL}$M RSs among $N_{LR-RLM}$ RSs may be used for radio link monitoring.

TABLE 33

$N_{LR-RLM}$ and $N_{RLM}$ as a function of maximum number $L_{max}$ of SS/PBCH blocks per half frame

| $L_{max}$ | $N_{LR-RLM}$ | $N_{RLM}$ |
|---|---|---|
| 4 | 2 | 2 |
| 8 | 6 | 4 |
| 64 | 8 | 8 |

If the UE is not configured with RadioLinkMonitoringRS, which is higher layer signaling, if the UE is configured with a TCI state for receiving the PDCCH in the control resource set, and if at least one CSI-RS is included in the TCI state, the RLM RS may be selected according to the following RLM RS selection methods:

RLM RS selection Method 1) If the activated TCI state to be used for PDCCH reception has one reference RS (i.e., one activated TCI state has only one of QCL-TypeA, B, or C), the UE may select the reference RS of the activated TCI state to be used for PDCCH reception as the RLM RS.

RLM RS selection Method 2) If the activated TCI state to be used for PDCCH reception has two reference RSs (i.e., one activated TCI state has one of QCL-TypeA, B, or C, and further has QCL-TypeD), the UE may select the reference RS of QCL-TypeD as the RLM-RS. The UE does not expect that two QCL-TypeDs are configured in one activated TCI state.

RLM RS selection Method 3) The UE does not expect that an aperiodic or semi-persistent RS is selected as the RLM RS.

RLM RS selection Method 4) When $L_{max}$ is 4, the UE may select $N_{RLM}$ RSs (because $L_{max}$ is 4, two can be selected). The selection of the RLM RS is performed from among the reference RSs of the TCI state configured in the control resource set for PDCCH reception, based on the RLM RS selection Methods 1 to 3. The short period of the search space to which the control resource set is linked is determined as high priority, and the RLM RS is selected from the reference RS of the TCI state configured in the control resource set linked to the search space of the shortest period. If there are a plurality of control resource sets linked to a plurality of search spaces having the same period, the RLM RS selection is performed from the reference RS of the TCI state configured in the high control resource set index.

Figure 22:
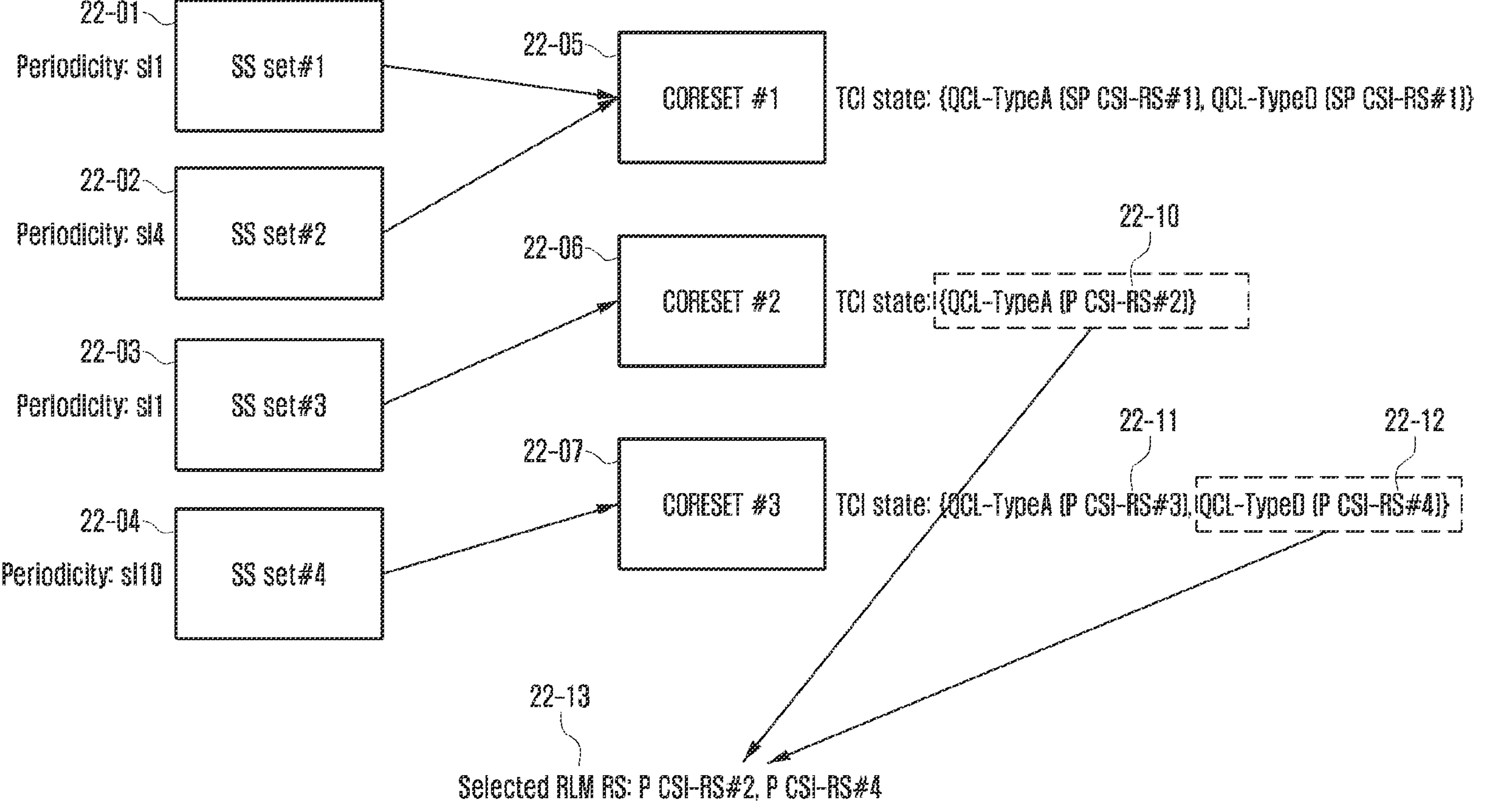
FIG. 22 illustrates an RLM RS selection process according to an embodiment.

FIG. 22 illustrates an RLM RS selection process according to an embodiment. FIG. 22 illustrates a CORESET #1 22-05 to a CORESET #3 22-07 linked to search spaces #1 to #4 22-01, 22-02, 22-03 and 22-04 having different periods within the activated DL BWP, and the reference RS of the TCI state configured in each CORESET. Based on the RLM RS selection Method 4, the RLM RS selection uses the TCI state configured in the CORESET linked to the search space of the shortest period, but because the search space #1 22-01 and the search space #3 22-03 have the same period, the reference RS of the TCI state configured in the CORESET #2 having a higher index between the CORESET #1 22-05 and the CORESET #2 22-06 linked to respective search spaces may be used as the highest priority in the RLM RS selection. In addition, because the TCI state configured in the CORESET #2 has only QCL-TypeA, and the reference RS thereof is a periodic RS, the P CSI-RS #2 22-10 may be first selected as the RLM RS by the RLM RS selection Methods 1 and 3. The reference RS of QCL-TypeD may be a selection candidate by the RLM RS selection Method 2 among the reference RSs of the TCI state configured in the CORESET #1 having the next priority, but this RS is a semi-persistent RS 22-09, and thus is not selected as the RLM RS by the RLM RS selection Method 3. Therefore, the reference RSs of the TCI state configured in the CORESET #3 may be considered as the next priority, the reference RS of QCL-TypeD may be a selection candidate by the RLM RS selection Method 2, and because this reference RS is a periodic RS, the P CSI-RS #4 22-12 may be selected as the second RLM RS by the RLM RS selection Method 3. Therefore, the finally selected RLM RS 22-13 may be the P CSI-RS #2 and the P CSI-RS #4.

With reference to the above descriptions related to PDCCH transmission/reception configuration and transmit beam configuration, because PDCCH repetition is not currently supported in Rel-15/16 NR, it may be difficult to achieve the required reliability in a scenario requiring high reliability such as URLLC. Meanwhile, in Rel-17 FeMIMO, standardization on a method for improving PDCCH reception reliability through PDCCH repetition is in progress. As representative methods of the PDCCH repetition, there may be a non-SFN method for performing repetition by separating time or frequency resources through different TRPs for control resource sets linked to each of a plurality of search spaces explicitly connected by higher layer signaling, and an SFN method for performing repetition by configuring a plurality of TCI states in one control resource set. For the non-SFN method, different control resource sets may be linked to a plurality of search spaces explicitly connected by higher layer signaling, and the same control resource set may be linked to all search spaces. In this case, the method of linking different control resource sets may consider the multi-TRP based PDCCH repetition method, assuming that each control resource set is transmitted in different TRPs. In addition, the method of linking the same control resource set to all search spaces may consider the single-TRP based PDCCH repetition method, assuming that all are transmitted in the same TRP.

Meanwhile, in the current Rel-15/16 NR, because when the scheduling offset between the PDCCH containing the scheduling information transmitted by the base station and the PDSCH scheduled by the corresponding PDCCH is shorter than the reference value reported by the UE, the UE has no information on the PDSCH transmit beam transmitted from the base station, the operation of which default beam is used for receiving the corresponding PDSCH is defined. In addition, an operation when the corresponding PDSCH overlaps in time with a control resource set transmitted on the same carrier or another carrier within the band is also defined. However, the above-described default beam operations of the PDSCH are defined only when the number of TCIs configured or activated in the control resource set through which the PDCCH is transmitted is one. In the disclosure, the default beam operation of the PDSCH in case that there are control resource sets in which a plurality of TCI states are configured/activated will be described in detail.

For convenience in the following description of the disclosure, a cell, a transmission point, a panel, a beam or/and a transmission direction that can be distinguished through a higher layer/L1 parameter such as a TCI state or spatial relation information, or an indicator such as a cell ID, a TRP ID, or a panel ID will be unified and described as a transmission reception point (TRP). Therefore, in actual application, it is possible to appropriately replace the TRP with one of the above terms.

Hereinafter, when the UE determines whether cooperative communication is applied, the PDCCH(s) for allocating the PDSCH to which the cooperative communication is applied may have a specific format, or the PDCCH(s) for allocating the PDSCH to which the cooperative communication is applied may have a specific indicator indicating whether the cooperative communication is applied, or the PDCCH(s) for allocating the PDSCH to which the cooperative communication is applied may be scrambled with a specific RNTI, or it may assume that the cooperative communication is applied in a specific interval indicated by a higher layer. Hereinafter, for convenience of description, a case in which the UE receives the PDSCH to which cooperative communication is applied, based on conditions similar to the above, will be referred to as an NC-JT case.

Hereinafter, the base station, as a subject performing resource allocation of the UE, may be at least one of gNode B, gNB, eNode B, Node B, BS, radio access unit, base station controller, or a node on a network. The terminal may include a UE, an MS, a cellular phone, a smart phone, a computer, or a multimedia system capable of performing a communication function. Hereinafter, an embodiment will be described using a 5G system as an example, but the embodiment may be applied to other communication systems having a similar technical background or channel type. For example, LTE or LTE-A mobile communication systems and mobile communication technology developed after 5G may be included therein. Accordingly, the embodiments may be applied to other communication systems through some modifications within a range that does not significantly depart from the scope of the disclosure as judged by those of ordinary skill in the art. The contents of the disclosure are applicable to FDD and TDD systems.

Hereinafter, higher layer signaling may be signaling corresponding to at least one or a combination of the following signaling:

MIB

SIB or SIB X (X=1, 2, . . . )

RRC

MAC CE

In addition, L1 signaling may be signaling corresponding to at least one or combination of the following physical layer channels or signaling methods using signaling:

PDCCH

DCI

UE-specific DCI
Group common DCI
Common DCI
Scheduling DCI (e.g., DCI used for the purpose of scheduling DL or UL data)
Non-scheduling DCI (e.g., DCI not for the purpose of scheduling DL or UL data)
PUCCH
UL control information (UCI)

Hereinafter, determining the priority between A and B refers to selecting one having a higher priority according to a predetermined priority rule and then performing an operation corresponding thereto, or omitting or dropping an operation for one having a lower priority.

First Embodiment: PDCCH Repetition Transmission Method Based on Multi-TRP

As an embodiment, a PDCCH repetition transmission method in consideration of multiple TRPs will be described. For the PDCCH repetition in consideration of multiple TRPs, there may be various methods depending on how each TCI state to be applied when transmitting the PDCCH in each TRP is applied to the aforementioned various parameters used for PDCCH transmission. For example, various parameters used for PDCCH transmission to which different TCI states are applied may include a CCE, a PDCCH candidate group, a control resource set, a search space, and the like. In case of the PDCCH repetition transmission in consideration of multiple TRPs, a soft combining scheme, a selection scheme, and the like may be considered as a reception scheme of the UE.

The following five methods may exist for the PDCCH repetition transmission through multiple TRPs, and for at least one of the five methods, the base station may configure through higher layer signaling, indicate through L1 signaling, or configure and indicate by a combination of higher layer signaling and L1 signaling to the UE.

Method 1-1 Repetition Transmission Method of a Plurality of PDCCHs Having the Same Payload Method 1-1 is a method of repeatedly transmitting a plurality of pieces of control information having the same DCI format and payload. In each of the above-described control information, information for scheduling a repeatedly transmitted PDSCH, for example, {PDSCH #1, PDSCH #2, . . . , PDSCH #Y}, repeatedly transmitted over a plurality of slots may be indicated. The fact that the payload of each repeatedly transmitted control information is the same may be expressed that PDSCH scheduling information of each control information, for example, the number of repeated PDSCH transmissions, time domain PDSCH resource allocation information, that is, the slot offset (K_0) between the control information and the PDSCH #1 and the number of PDSCH symbols, frequency domain PDSCH resource allocation information, DMRS port allocation information, PDSCH-to-HARQ-ACK timing, PUCCH resource indicator, etc. are all the same. The UE can improve the reception reliability of control information by soft combining repetition control information having the same payload.

For soft combining, the UE needs to know in advance the resource location of control information to be repeatedly transmitted, the number of repetitions, and the like. To this end, the base station may instruct in advance the configuration of time domain, frequency domain, and spatial domain resources of the above-described repetition control information. When control information is repeatedly transmitted in the time domain, the control information may be repeatedly transmitted across different CORESETs, across different search space sets within one CORESET, or across different PDCCH monitoring occasions within one CORESET and one search space set. In the time domain, the unit of a repetition resource (CORESET unit, search space set unit, PDCCH monitoring occasion unit) and the location of a repetition resource (PDCCH candidate index, etc.) may be indicated through higher layer configuration of the base station, etc. At this time, the number of PDCCH repetitions and/or the list and transmission pattern of TRPs participating in the repetitions may be explicitly indicated, and a higher layer indication or MAC-CE/L1 signaling may be used as an explicit indication method. The list of TRPs may be indicated in the form of TCI state or the aforementioned QCL assumption.

When control information is repeatedly transmitted in the frequency domain, the control information may be repeatedly transmitted over different CORESETs, repeatedly transmitted over different PDCCH candidates within one CORESET, or repeatedly transmitted for each CCE. In the frequency domain, the unit of the repetition resource and the location of the repetition resource may be indicated through higher layer configuration of the base station, etc. In addition, the number of repetitions and/or the list and transmission pattern of TRPs participating in repetitions may be explicitly indicated, and a higher layer indication or MAC-CE/L1 signaling may be used as an explicit indication method. The list of TRPs may be indicated in the form of TCI state or the aforementioned QCL assumption.

When control information is repeatedly transmitted in the spatial domain, the control information may be repeatedly transmitted across different CORESETs, or in one CORESET in which two or more TCI states are configured.

In an embodiment, a method for a base station to repeatedly transmit a PDCCH will be described. In a wireless communication system, DCI including scheduling information for a PUSCH or a PDSCH may be transmitted from the base station to the UE through the PDCCH.

Figure 23:
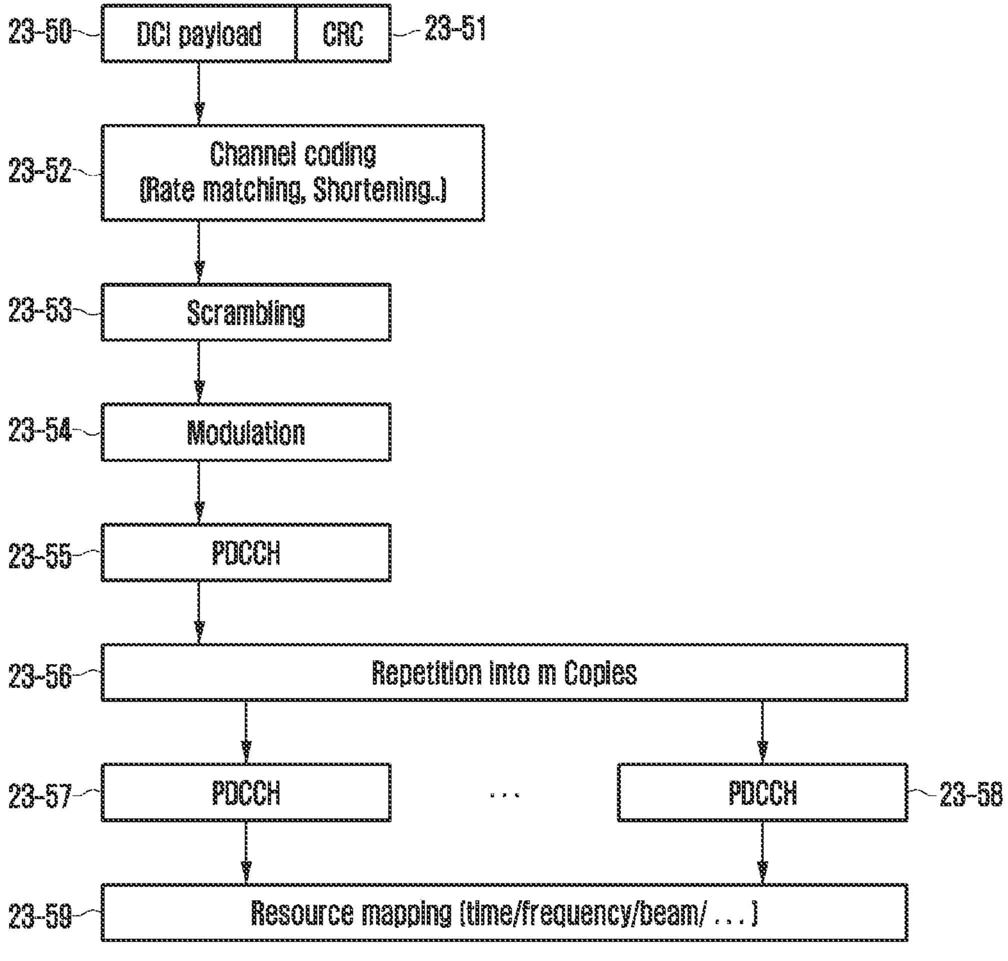
FIG. 23 illustrates a process of generating a PDCCH repeatedly transmitted through two TRPs according to an embodiment.

FIG. 23 illustrates a process of creating a PDCCH repeatedly transmitted through two TRPs according to an embodiment. The base station creates DCI 23-50, attaches a CRC 23-51 to a DCI payload, performs channel coding 23-52, performs scrambling 23-53, and performs modulation 23-54, thereby creates the PDCCH 23-55. Thereafter, the base station may copy the created PDCCH a plurality of times (23-56, 23-57, 23-58) and transmit them using a specific resource 23-59 (e.g., time, frequency, transmit beam, etc.) That is, the coded bits for the PDCCH repeatedly transmitted in each TRP may be the same. In this way, in order for the coded bits to be the same, the information value for each DCI field in the PDCCH may also be configured to be the same. For example, all fields (TDRA, FDRA, TCI, Antenna ports, etc.) included in the DCI may be configured to have the same value. Here, the same value may be generally interpreted as one meaning, but may be interpreted as a plurality of meanings when a plurality of (e.g., two) values are included or corresponded to the above by a special configuration. A detailed description related thereto will be described below.

For example, as shown in FIG. 23, in case of repeatedly transmitting the PDCCH twice (e.g., m=2), the base station may map the PDCCHs to TRP A and TRP B one by one and repeatedly transmit the PDCCH based on the same or different beams in the aspect of the spatial domain. In this case, the PDCCH repetition may be performed based on CORESETs respectively linked to two search spaces explicitly connected to each other through higher layer signaling.

If the IDs of CORESETs linked to the search spaces are the same or the TCI state of the CORESETs is the same, the PDCCH repetition may be performed based on a single TRP, and if all the IDs of CORESETs linked to the search spaces are different or the TCI states of CORESETs are different, the PDCCH repetition may be performed based on multiple TRPs. If the base station repeatedly transmits the PDCCH four times, the base station may map two PDCCHs to TRP A and TRP B, respectively, and in this case, two PDCCHs of each TRP may be transmitted separately in the time domain. The PDCCH repetition divided in the time domain may be repeated in time units of slot based, subslot based, or mini-slot based.

The above-described method is provided as an example and is not considered as a limitation. For example, the UE and the base station may consider the following methods for the above-described PDCCH repetition operation:

- PDCCH repetition in terms of time/frequency/spatial domain in the same slot within the same CORESET.
- PDCCH repetition in terms of time/frequency/spatial domain between different slots within the same CORESET.
- PDCCH repetition in terms of time/frequency/spatial domain in the same slot between different CORESETs.
- PDCCH repetition in terms of time/frequency/spatial domain between different slots between different CORESETs.

In addition, if CORESETPoolindex is configured, each CORESETPoolindex can be considered in addition to CORESET described above. In addition, the number of PDCCH repetitions may increase independently, and accordingly, the above-described methods may be considered in combination at the same time.

The base station may preconfigure, to the UE via an RRC message, information on which domain the PDCCH is repeatedly transmitted through. For example, in case of PDCCH repetition in terms of the time domain, the base station may preconfigure, to the UE, information on whether any of the above-described slot-based, sub-slot-based, or mini-slot-based time units used for repetition. In case of PDCCH repetition in terms of the frequency domain, the base station may preconfigure, to the UE, information on whether repetition is based on any one of CORESET, BWP, or component carrier (CC). In case of PDCCH repetition in terms of the spatial domain, the base station may preconfigure, to the UE, information related to a beam for PDCCH repetition through configuration for each QCL type. Alternatively, the information listed above may be combined and transmitted to the UE through an RRC message. Therefore, the base station may repeatedly transmit the PDCCH according to the preconfigured information through the RRC message, and the UE may repeatedly receive the PDCCH according to the preconfigured information through the RRC message.

Method 1-2 Method for Repeatedly Transmitting a Plurality of Control Information that May have Different DCI Formats and/or Payloads Method 1-2 is a method for repeatedly transmitting a plurality of pieces of control information that may have different DCI formats and/or payloads. The control information schedules the PDSCH repetition, and the number of PDSCH repetitions indicated by each control information may be different from each other. For example, PDCCH #1 may indicate scheduling information for {PDSCH #1, PDSCH #2, PDSCH #Y}, PDCCH #2 may indicate {PDSCH #2, PDSCH #Y}, and PDCCH #X may indicate scheduling information for {PDSCH Y}. Compared to Method 1-1, this method of repeatedly transmitting control information has an advantage in that it is possible to reduce the total delay time required for repetitive transmission of control information and PDSCH. On the other hand, in this method, because the payload of each repeatedly transmitted control information may be different from each other, soft combining of the repeatedly transmitted control information is impossible, and thus reliability may be lower than that of Method 1-1.

In Method 1-2, the UE may not need to know in advance the resource location of the control information to be repeatedly transmitted and the number of repetitions, and the UE may independently decode and process each of the repeatedly transmitted control information. In case of decoding a plurality of repetition control information for scheduling the same PDSCH, the UE may process only the first repetition control information scheduling the same PDSCH among the plurality of repetitive transmission control information, and ignore the second and subsequent repetition control information. Alternatively, the base station may indicate to the UE in advance the resource location of control information to be repeatedly transmitted and the number of repetitions, and this indication method may be the same as Method 1-1, above.

Method 1-3 Method for Repeatedly Transmitting Each of a Plurality of Control Information that May have Different DCI Formats and/or Payloads Method 1-3 is a method for repeatedly transmitting each of a plurality of pieces of control information that may have different DCI formats and/or payloads. In this case, each control information repeatedly transmitted has the same DCI format and payload. Since it is impossible to soft combine a plurality of control information in Method 1-2, reliability may be lower than in Method 1-1. In Method 1-1, a total delay time required for repetitive transmission of control information and PDSCH may be lengthy. Method 1-3, which is a method using the advantages of Method 1-1 and Method 1-2, can transmit control information by reducing the total delay time required for repetitive transmission of control information and PDSCH compared to Method 1-1 with higher reliability compared to Method 1-2.

In Method 1-3, the soft combining of Method 1-1 and the individual decoding of Method 1-2 may be used to decode and soft combine the repeatedly transmitted control information. For example, the first transmitted control information among repeated transmissions for a plurality of control information in which DCI formats and/or payloads may be different can be decoded as in Method 1-2, and repeated transmission of the decoded control information can be soft-combined as in Method 1-1.

Meanwhile, the base station may select and configure one of Method 1-1, Method 1-2, and Method 1-3 for control information repetition. The control information repetition method may be explicitly indicated by the base station to the UE through higher layer signaling. Alternatively, the control information repetition method may be indicated in combination with other configuration information. For example, a higher layer configuration indicating a PDSCH repetition scheme may be combined with information indicating a control information repetition scheme. When the PDSCH is indicated to be repeatedly transmitted in the FDM method, it can be interpreted that the control information is repeatedly transmitted by Method 1-1. The reason is that there is no effect of reducing the delay time by Method 1-2 in the PDSCH repetition of the FDM method. For a similar reason, when the PDSCH is repeatedly transmitted in an intra-slot TDM scheme, it may be interpreted that the control information is repeatedly transmitted in Method 1-1. On the other hand, when the PDSCH is indicated to be repeatedly transmitted in an inter-slot TDM scheme, the above-described Method 1-1, Method 1-2, or Method 1-3 for control information repetition may be selected through higher layer signaling or L1 signaling.

Meanwhile, the base station may explicitly indicate a unit of the control information repetition to the UE through configuration of higher layer or the like. Alternatively, the control information repetition unit may be indicated in combination with other configuration information. For example, the higher layer configuration indicating the PDSCH repetition scheme may be combined with the information indicating the control information repetition unit. If the PDSCH is indicated to be repeatedly transmitted in the FDM method, it can be interpreted that the control information is repeatedly transmitted in FDM or SDM, because if control information is repeatedly transmitted, such as in an inter-slot TDM method, the FDM method is used. This is because there is no effect of reducing the delay time due to PDSCH repetition. For a similar reason, when the PDSCH is indicated to be repeatedly transmitted in an intra-slot TDM scheme, it may be interpreted that the control information is repeatedly transmitted in TDM, FDM or SDM in the slot. On the other hand, when the PDSCH is indicated to be repeatedly transmitted in the multi-slot TDM scheme, it may be selected by higher layer signaling, etc., so that control information can be repeatedly transmitted in the multi-slot TDM, intra-slot TDM, FDM or SDM.

Method 1-4 PDCCH Transmission Scheme in which Each TCI State is Applied to Different CCEs in the Same PDCCH Candidate Group Method 1-4 may apply different TCI states, which means transmission from multiple TRPs, to different CCEs in the PDCCH candidate group in order to improve PDCCH reception performance without PDCCH repetition. Method 1-4 is not the PDCCH repetition, but since different CCEs in the PDCCH candidate group are transmitted by applying different TCI states in each TRP, it can be a method of acquiring spatial diversity in the PDCCH candidate group. Different CCEs to which different TCI states are applied may be separated in time or frequency dimension, and the UE needs to know in advance the location of resources to which different TCI states are applied. The UE may receive different CCEs to which different TCI states are applied within the same PDCCH candidate group and decode it independently or decode it at once.

Method 1-5 PDCCH Transmission Scheme Applying a Plurality of TCI States to all CCEs in the Same PDCCH Candidate Group (SFN Scheme)

Method 1-5 is transmission of the SFN scheme for applying a plurality of TCI states to all CCEs in the PDCCH candidate group in order to improve PDCCH reception performance without PDCCH repetition. Although Method 1-5 is not PDCCH repetition, it may be a method of acquiring spatial diversity through SFN transmission at the same CCE position in the PDCCH candidate group. The UE may receive CCEs of the same position to which different TCI states are applied within the same PDCCH candidate group and independently decode or decode them at once using some or all of the plurality of TCI states.

Second Embodiment: Soft Combining-Related UE Capability Report During PDCCH Repetition The UE may report soft combining-related UE capability upon PDCCH repetition to the base station, and there may be several methods for this. Specific methods may be as follows:

UE Capability Reporting Method 1

The UE may report to the base station in the form of possible or impossible only on whether soft combining is possible during PDCCH repetition to the base station.

As an example, if the UE reports information that soft combining is possible during PDCCH repetition to the base station as the UE capability, the base station may determine whether soft combining of the UE is possible, to the most flexible degree (e.g., at the LLR level), and notify the PDCCH repetition related configuration to the UE as flexibly as possible. In this case, as an example related to PDCCH repetition configuration, the base station may assume that soft combining between control resource sets or search spaces having different configurations of the UE, soft combining between PDCCH candidates within the same aggregation level, or soft combining between PDCCH candidates between different aggregation levels is possible, and notify the corresponding configuration to the UE.

As another example, if the UE reports information that soft combining is possible during PDCCH repetition to the base station as the UE capability, the base station may determine the level of soft combining possible for the UE most conservatively (e.g., at the OFDM symbol level), and notify the PDCCH repetition related configuration most limitedly. In this case, as an example related to PDCCH repetition configuration, the base station may assume that soft combining between a plurality of control resource sets having the same configuration or soft combining between PDCCH candidates between the same aggregation levels is possible, and notify the corresponding configuration to the UE.

UE Capability Reporting Method 2

In order to express in more detail the operation of soft combining possible in the UE as the UE capability compared to the above-described UE capability reporting Method 1, the UE may report to the UE capability by dividing the level for the possible degree of soft combining during PDCCH repetition to the base station. That is, among signal levels generated from the reception operation processes of the UE, the UE may check a signal level to which soft combining can be applied for PDCCH repetition, and report such information to the base station as the UE capability. For example, the UE may inform that soft combining is possible at the OFDM symbol level as a signal level to which soft combining can be applied, may inform that soft combining is possible at the modulation symbol level, and may inform that soft combining is possible at the LLR level. According to each signal level reported by the UE, the base station may notify an appropriate configuration so that the UE can perform soft combining according to the reported UE capability.

UE Capability Reporting Method 3

The UE may transmit to the base station the restrictions necessary to enable soft combining on the UE side in case of PDCCH repetition as the UE capability. As an example, the terminal may report to the base station that the configuration of each control resource set including two repeatedly transmitted PDCCHs should be the same. As another example, the terminal may report to the base station that at least the aggregation level of the PDCCH candidates related to the two repeatedly transmitted PDCCHs should be the same.

UE Capability Reporting Method 4

When receiving PDCCH repetition from the base station, the UE may report which PDCCH repetition scheme is supported through the UE capability. As an example, the UE may report to the base station about supporting Method 1-5 (SFN transmission method). As another example, the UE may report to the base station about supporting the intra-slot TDM, inter-slot TDM, or FDM method among Method 1-1 (a method of repeatedly transmitting a plurality of PDCCHs having the same payload). In particular, in case of TDM, the UE may report the maximum value of the time interval between two repeated PDCCHs to the base station. For example, if the UE reports the maximum value of the time interval between two repeated PDCCHs as four OFDM symbols, the base station may need to adjust the time interval between two repeated PDCCHs to four OFDM symbols or less in case of performing TDM-based PDCCH repetition to the UE based on this information.

UE Capability Reporting Method 5

The UE may report the number of blind decodings consumed when receiving PDCCH repetition from the base station to the base station as the UE capability. In one example, the UE may report the number of blind decodings consumed when receiving PDCCH repetition as 1, 2, or 3 to the base station regardless of the reception method (e.g., individual decoding, soft combining, other reception schemes, or combinations thereof) of the UE. The base station may assume that the UE consumes as much as the reported number of blind decodings when receiving PDCCH repetition, and deliver configuration about the search space and control resource set to the UE so as not to exceed the maximum number of blind decodings that the UE can use within a slot or span.

The above-described UE capability reporting methods may be composed in a combination of two or more in actual application. As an example, the UE may report that soft combining is possible at the LLR level by UE capability reporting Method 2, report that two repeated PDCCH candidates must have the same aggregation level by UE capability reporting Method 3, support PDCCH repetition TDMed by UE capability reporting Method 4, and report the maximum value of the time interval between two repeated PDCCHs as four OFDM symbols. In addition, applications based on a combination of various UE capability reporting methods are possible, but a detailed description thereof will be omitted.

Third Embodiment: PDCCH Repetition and Explicit Connectivity Related Configuration Method As an embodiment, a method for configuring PDCCH repetition for enabling soft combining during PDCCH repetition will be described. In case of performing PDCCH repetition to the UE based on the Method 1-1 (a plurality of PDCCH repetition methods having the same payload) among various PDCCH repetition methods, the base station may configure information indicating that there is an explicit connectivity (or linkage or association) between repeated PDCCH candidates through higher layer signaling, indicate through L1 signaling, or configure and indicate through a combination of higher layer signaling and L1 signaling in order to reduce the number of blind decodings in consideration of whether the UE can perform soft combining. In more detail, there may be various connectivity methods as described below.

A PDCCH repetition and explicit connectivity related configuration method through higher layer signaling may include various methods as follows:

PDCCH Repetition Configuration Method 1

PDCCH repetition configuration Method 1 is provided for when configuration information exists in higher layer signaling PDCCH-config.

The base station may configure PDCCH-repetition-config in PDCCH-config, which is higher layer signaling, for PDCCH repetition and explicit connectivity related configuration to the UE, and the PDCCH-repetition-config may include at least one of the following information:

- PDCCH repetition method—one of TDM, FDM, and SFN
- Control resource set-search space combination(s) to be used during PDCCH repetition
- Control resource set index(es)—OPTIONAL
- Search space index(es)—OPTIONAL
- Aggregation level(s) for explicit connectivity—OPTIONAL
- PDCCH candidate index(s) for explicit connectivity—OPTIONAL
- Frequency resources for explicit connectivity—OPTIONAL Based on the above information, the base station may configure the PDCCH repetition by higher layer signaling to the UE. For example, if the PDCCH repetition scheme is configured to SFN, if the control resource set index is configured to 1 as the control resource set-search space combination to be used in the PDCCH repetition, and if the search space index is not configured, the UE may expect that the PDCCH is repeatedly transmitted through the Method 1-5 (SFN transmission method) in the control resource set having index 1. At this time, the configured control resource set may be configured with one or a plurality of different TCI states via upper layer signaling, indicated via L1 signaling or MAC-CE signaling, or configured and indicated via a combination of higher layer signaling and L1 signaling or MAC-CE signaling. In addition, if the PDCCH repetition scheme is configured to SFN, the UE may not expect that a search space index is configured in the control resource set-search space combination to be used for PDCCH repetition. As another example, if the PDCCH repetition scheme is configured to TDM or FDM, if a total of two control resource set-search space combinations to be used in PDCCH repetition are configured, and if a control resource set index 1 and a search space index 1 are configured for the first combination and a control resource set index 2 and a search space index 2 are configured for the second combination, the UE may expect that the PDCCH is repeatedly transmitted in the TDM or FDM manner through the Method 1-1 using the two control resource set-search space combinations. At this time, for each configured control resource set, a plurality of same or different TCI states may be configured via higher layer signaling, indicated via L1 signaling or MAC-CE signaling, or configured and indicated via a combination of higher layer signaling and L1 signaling or MAC-CE signaling. In addition, if the PDCCH repetition scheme is configured to TDM or FDM, the UE can expect that up to two control resource set-search space combinations to be used for PDCCH repetition are configured, and that all indexes of the control resource set and search space are configured in each combination.

In addition, five pieces of information that may be included in the PDCCH-repetition-config may be updated based on MAC-CE without RRC reconfiguration. If the base station does not configure the PDCCH-repetition-config for the UE, the UE does not expect the PDCCH to be repeatedly transmitted and expects only a single PDCCH transmission. All of the above-described aggregation level, PDCCH candidate index, and frequency resources for explicit connectivity may not be configured, or at least one may be configured according to an explicit connectivity method to be described later.

PDCCH Repetition Configuration Method 2

PDCCH repetition configuration Method 2 is provided in case that configuration information exists in higher layer signaling for the search space.

The base station may add a parameter for configuring the repetition configuration in the searchSpace, which is higher layer signaling for the search space, for PDCCH repetition, and notify it the UE. For example, a parameter called repetition, which is an additional higher layer signaling, is configured to on or off in searchSpace, which is a higher layer signaling, so that it can be configured that the corresponding search space is used for repetition. The search space in which repetition is configured to on may be one or two per BWP. For example, when searchSpaceId is configured to 1, controlResourceSetId is configured to 1, and repetition is configured to on in searchSpace, which is a higher layer signaling for search space index 1, the UE can expect that PDCCH repetition is performed according to the Method 1-5 (SFN transmission method) in the control resource set 1 linked to the search space 1. As another example, when searchSpaceId is configured to 1, controlResourceSetId is configured to 1, and repetition is configured to on in searchSpace, which is a higher layer signaling for search space index 1, and when searchSpaceId is configured to 2, controlResourceSetId is configured to 2, and repetition is configured to on in searchSpace, which is a higher layer signaling for search space index 2, the UE can know that PDCCH repetition is performed in TDM or FDM using Method 1-1 between the combination of control resource set 1 and search space 1 and the combination of control resource set 2 and search space 2. TDM and FDM can be divided according to time and frequency configuration of control resource sets 1 and 2 and search spaces 1 and 2 through higher layer signaling. In addition, in higher layer signaling for the search space in which repetition is configured to on, an aggregation level or PDCCH candidate indexes for explicit connectivity specified in PDCCH repetition configuration Method 1, 2 may be configured, and depending on an explicit connection method to be described later, both may not be configured, only one of both may be configured, or both may be configured.

Fourth Embodiment: PDSCH SFN Transmission Method Based on Multi-TRP

In an embodiment, an indication and configuration method through a combination of L1 signaling and higher layer signaling for PDSCH SFN transmission based on multi-TRP in the base station, and a reception method in the UE will be described. In case that the base station schedules PDSCH SFN transmission method based on the multi-TRP to the UE through DCI, the condition of the DCI field and the condition of higher layer signaling may be as follows:

- TCI state field in DCI: It may indicate the codepoint of the TCI state field including two TCI states.
- Antenna port field in DCI: The number of CDM groups may be fixed to one, or may be one or more.
- TDRA field in DCI: There may be no restrictions on the corresponding field (e.g., one of Condition 1, 2, or 3 for the TDRA field described in Table 31, above may be possible). Only the above-described Condition 3 may be possible (e.g., when all TDRA entries do not configure repetitionNumber, which is higher layer signaling).
- Higher layer signaling repetitionScheme: It may or may not be configured.
- New higher layer signaling for the multi-TRP based PDSCH SFN scheme may be additionally configured. On the other hand, in order to support the above-described multi-TRP based PDSCH schemes (e.g., multi-TRP SDM, FDM scheme A, FDM scheme B, TDM scheme A, TDM scheme B), the UE can expect that new higher layer signaling for the multi-TRP based PDSCH SFN scheme is not configured.

Figure 24:
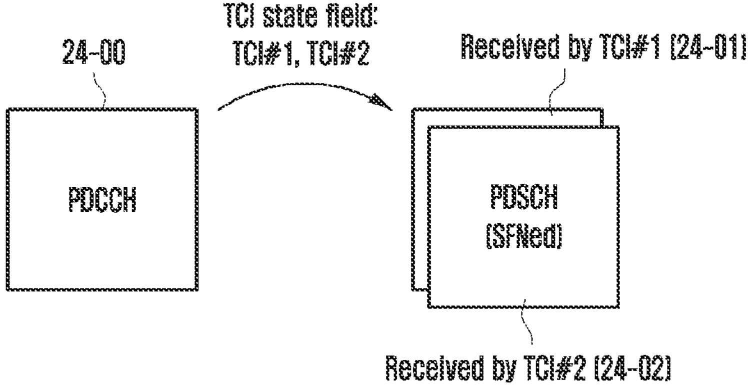
FIG. 24 illustrates a PDSCH SFN transmission method based on multiple TRPs according to an embodiment.
Figure 24:
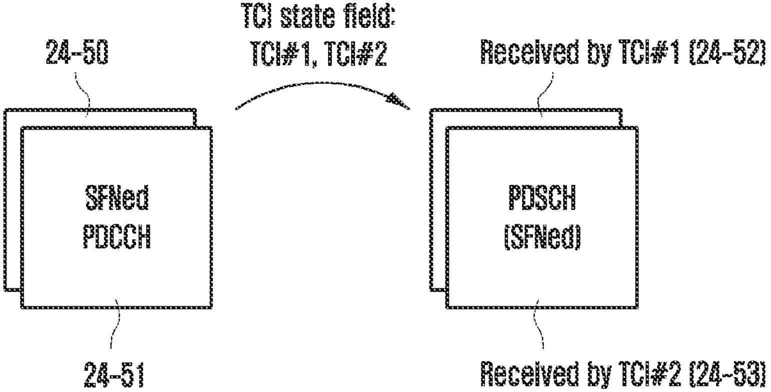

FIG. 24 illustrates a PDSCH SFN transmission method based on multiple TRPs according to an embodiment. In FIG. 24, the base station indicates and configures the above-described DCI field value and higher layer signaling to the UE, and then transmits the PDCCH 24-00 to the UE. TCI states #1 and #2 may be indicated through the TCI state field in the corresponding PDCCH, and time and frequency resource allocation information may be indicated through one TDRA field and a FDRA field, respectively. The UE may receive the SFN-transmitted PDSCHs 24-01 and 24-02 using two different TCI states (TCI states #1 and #2) at the resource location based on the corresponding time and frequency resource allocation information. This is equally applicable to the repetition of the SFN-based PDCCH. The UE may receive the SFN-transmitted PDCCHs 24-50 and 24-51 by applying two different TCI states within one control resource set. Based on information of the DCI field included in the corresponding SFN-transmitted PDCCHs, the UE may receive the SFN-transmitted PDSCHs 24-52 and 24-53 using two different TCI states (TCI states #1 and #2) at the resource location based on the corresponding time and frequency resource allocation information.

Fourth-First Embodiment: Signaling or Restrictions on SFN PDCCH and SFN PDSCH Transmission Method Based on Multi-TRP In an embodiment, an indication and configuration method through a combination of L1 signaling and higher layer signaling for SFN PDCCH and SFN PDSCH transmission method based on a multi-TRP or restrictions thereon in a base station will be described.

Through higher layer signaling from the base station, the UE may be configured with one of an SFN transmission scheme of the base station through Doppler correction based on a base station (hereinafter, referred to as SFN scheme based on the base station) or an SFN transmission scheme of the base station through Doppler correction based on a UE (hereinafter, SFN scheme based on the UE). The corresponding configuration may be configured for each BWP or for each carrier. Also, the corresponding configuration may use respective configuration information for the PDCCH and the PDSCH, or may use one piece of configuration information common to the PDCCH and the PDSCH. The UE may not expect that the types of SFN transmission schemes of the base station are different from each other for the PDCCH and the PDSCH. That is, when a specific SFN transmission scheme is applied to the transmission of the PDCCH and the PDSCH from the base station, the UE can expect that the same SFN transmission scheme is applied to the PDCCH and the PDSCH. In addition, when a specific SFN transmission scheme is applied to the PDCCH transmission from the base station, the UE can expect that the same SFN transmission scheme is configured and applied to all control resource sets. That is, it may not be expected that the SFN scheme based on base station is configured for some control resource sets and the SFN scheme based on UE is configured and applied to some remaining control resource sets.

The UE may transmit whether the reception operation for PDSCH transmission or SFN PDSCH transmission based on single-TRP of the base station can be dynamically transferred to the base station through the UE capability report. The corresponding UE capability report may be performed for each carrier or for each UE. For a UE that does not report the corresponding UE capability, the base station may transmit the enhanced PDSCH TCI state activation/deactivation MAC-CE to the UE so that all codepoints of the TCI field in the DCI indicate two TCI states. If the UE does not report the corresponding UE capability, it may not expect that at least one codepoint of the TCI field in DCI indicates one TCI state. For a UE that reports the corresponding UE capability, the base station can configure whether the reception operation for PDSCH single transmission based on single-TRP or PDSCH SFN transmission based on multi-TRP can be dynamically changed by higher layer signaling, and the UE may be indicated with one or two TCI states through the TCI field in DCI according to whether the corresponding higher layer signaling is configured. In addition, for a UE that reports or does not report the corresponding UE capability, higher layer signaling regarding whether the reception operation for PDSCH single transmission based on single-TRP or PDSCH SFN transmission based on multi-TRP can be dynamically changed may not exist. In this case, for the UE that reports the corresponding UE capability, the base station may indicate one or two TCI states through the TCI field in DCI by using the TCI state activation MAC-CE for the PDSCH, and for the UE that does not report the corresponding UE capability, the base station may indicate that all TCI codepoints have one TCI state or that all TCI codepoints have two TCI states through the TCI field in DCI using the TCI state activation MAC-CE for the PDSCH.

The UE may transmit whether the reception operation for PDSCH transmission or SFN PDSCH transmission based on single-TRP of the base station can be dynamically changed to the base station through the UE capability report. The corresponding UE capability report may be performed for each carrier or for each UE. For a UE that does not report the corresponding UE capability, the base station may configure higher layer signaling for the UE whether a control resource set in which one TCI state is activated and a control resource set in which two TCI states are activated coexist. The corresponding higher layer signaling may be configured for each BWP or for each carrier. If the UE does not report the UE capability, the corresponding configuration information is not configured from the base station, or the coexistence of control resource sets in which different numbers of TCI states are activated may be configured as impossible. The corresponding configuration information may be configured to enable coexistence of control resource sets in which different numbers of TCI states are activated. In addition, for a UE that reports the corresponding UE capability, higher layer signaling regarding whether control resource sets in which different numbers of TCI states are activated coexist may not exist. In this case, the base station may activate some control resource sets to have one TCI and some other control resource sets to have two TCI states through TCI state activation MAC-CE for PDCCH so that control resource sets in which different numbers of TCI states are activated can coexist for the UE that reports the UE capability, and the base station may activate all control resource sets to have one TCI or have two TCI states through TCI state activation MAC-CE for PDCCH so that control resource sets in which different numbers of TCI states are activated do not coexist for the UE that does not report the UE capability. In this case, all control resource sets may be all control resource sets in a carrier or all control resource sets of all carriers configured in the UE according to the UE capability reporting unit (per carrier or per UE).

For the above two UE capabilities (UE capability regarding whether the reception operation for PDSCH single transmission or SFN PDSCH transmission based on single-TRP can be dynamically changed, and UE capability regarding whether the reception operation for PDCCH single transmission or SFN PDCCH transmission based on single-TRP can be dynamically changed), the UE may transmit two pieces of information in one single UE capability report. In addition, through the report of the UE capability for the PDSCH (UE capability regarding whether the reception operation for PDSCH single transmission or SFN PDSCH transmission based on single-TRP can be dynamically changed), the UE capability for the PDCCH (UE capability regarding whether the reception operation for single-TRP based PDCCH single transmission or SFN PDCCH transmission can be dynamically changed) may be reported together.

Figure 25:
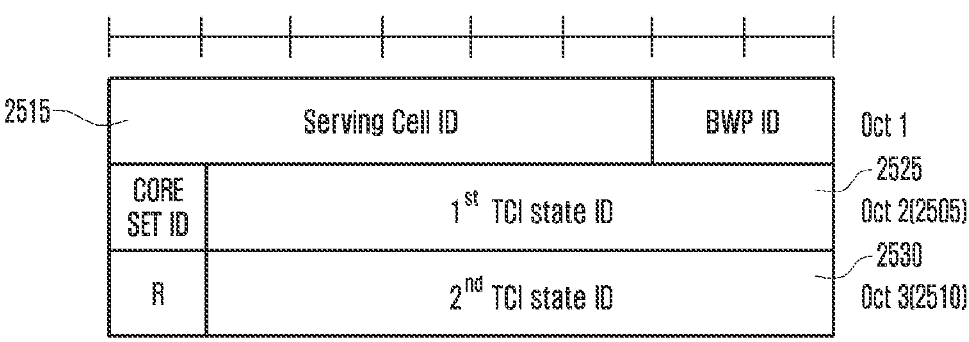
FIG. 25 illustrates an enhanced PDCCH TCI state activation/deactivation MAC CE structure according to an embodiment.

FIG. 25 illustrates an enhanced PDCCH TCI state activation/deactivation MAC-CE structure according to an embodiment. FIG. 25 is a form in which a third octet 2510 is added to the structure of FIG. 9. With reference to FIG. 25, for the indicated serving cell ID 2515 and control resource set index, the second TCI state ID may be additionally indicated to activate the first TCI state ID 2525 (with second octet 2505), and the second TCI state ID 2530 indicated by the corresponding MAC-CE. If the serving cell ID indicated by the corresponding enhanced PDCCH TCI state activation/deactivation MAC-CE is included in simultaneousTCI-UpdateList1-r16 or simultaneousTCI-UpdateList2-r16, which is higher layer signaling, the first TCI state ID and the second TCI state ID indicated by the MAC-CE can be simultaneously applied to the control resource set index indicated by the MAC-CE even for other serving cell IDs included in simultaneousTCI-UpdateList1-r16 or simultaneousTCI-UpdateList2-r16. For example, if the serving cell IDs included in simultaneousTCI-UpdateList1-r16 are 1 to 4, and if the serving cell ID, the control resource set index, the first TCI state ID, and the second TCI state ID indicated through the MAC-CE are 2, 1, 0, and 1, respectively, TCI state IDs 0 and 1 can be simultaneously activated even for the first control resource set existing in serving cells 1, 3, and 4 through the corresponding MAC-CE.

Fifth Embodiment: Operation of a Default Beam Upon PDSCH Transmission Based on Single-TRP In an embodiment, a default beam operation during PDSCH transmission based on single-TRP will be described. Factors determining the default beam operation include tci-PresentInDCI, which is higher layer signaling for each control resource set that notifies the existence of a TCI field in DCI, a scheduling offset that is an interval between a PDCCH containing scheduling information and a PDSCH scheduled by the corresponding PDCCH, TimeDurationForQCL, which is a UE capability indicating the time consumed for beam change in order for the UE to receive the PDSCH, may be considered. For detailed description and information of timeDurationForQCL, see Tables 34 and 35, below.

TABLE 34

| Feature group | Components | Prerequisite feature groups | Field name in TS 38.331 [2] | Parent IE in TS 38.331 [2] | Need of FDD/TDD differentiation | Need of FR1/FR2 differentiation | Mandatory/ Optional |
|---|---|---|---|---|---|---|---|
| PDSCH beam switching | 1) Time duration (definition follows section 5.1.5 in TS 38.214), Xi, to determine and apply spatial QCL information for corresponding PDSCH reception. Time duration is defined counting from end of last symbol of PDCCH to beginning of the first symbol of PDSCH. Xi is the number of OFDM symbols, i is the index of SCS, 1 = 1, 2, corresponding to 60,120 kHz SCS. | 2-1 | timeDurationForQCL | FeatureSet Downlink | No | Applicable only to FR2 | Mandatory with capability signaling for FR2 Candidate value set for X1 is {7, 14, 28}, Candidate value set for X2, {14, 28} |

TABLE 35

| Definitions for parameters | Per | M | FDD-TDD DIFF | FR1-FR2 DIFF |
|---|---|---|---|---|
| timeDurationForQCL<br>Defines minimum number of OFDM symbols required by the UE to perform PDCCH reception and applying spatial QCL information received in DCI for PDSCH processing as described in TS 38.214 [12] clause 5.1.5. UE shall indicate one value of the minimum number of OFDM symbols per each subcarrier spacing of 60 kHz and 120 kHz. | FS | Yes | N/A | FR2 only |

In each of the following embodiments, the default beam operation will be described in detail in case that tci-PresentInDCI is not configured and the scheduling offset is longer than the reference time, in case that the scheduling offset is shorter than the reference time regardless of whether tci-PresentInDCI is configured, and in case that the scheduling offset is shorter than the reference time regardless of whether tci-PresentInDCI is configured, and the PDSCH and another control resource set overlap.

Fifth-First Embodiment: Default Beam Operation in Case that Tci-PresentInDCI is not Configured and the Scheduling Offset is Longer than the Reference Time In an embodiment, when tci-PresentInDCI, which is higher layer signaling, is not configured in the control resource set, and the scheduling offset between the PDCCH and the PDSCH is longer than the aforementioned reference time, timeDurationForQCL, a default beam operation will be described.

If the higher layer signaling tci-PresentInDCI is not configured in the control resource set in which the PDCCH scheduling the PDSCH is transmitted, if the TCI state is configured or activated in the corresponding control resource set, and if the scheduling offset between the PDCCH and the PDSCH is longer than the above-described reference time timeDurationForQCL, the UE cannot obtain the TCI state as scheduling information for the corresponding PDSCH, and thus, when receiving the PDSCH, cannot use the TCI state configured or activated in the control resource set including the PDCCH scheduling the PDSCH, or the QCL assumption of the corresponding control resource set.

Fifth-Second Embodiment: Default Beam Operation in Case that the Scheduling Offset is Shorter than the Reference Time Regardless of Whether Tci-PresentInDCI is Configured In an embodiment, in case that the scheduling offset between the PDCCH and the PDSCH is shorter than the aforementioned reference time timeDurationForQCL, regardless of whether the higher layer signaling tci-PresentInDCI is configured, a default beam operation will be described.

If tci-PresentInDCI, which is higher layer signaling, is configured or not configured in the control resource set in which the PDCCH scheduling the PDSCH is transmitted (that is, regardless of whether tci-PresentInDCI is configured), and if the scheduling offset between the PDCCH and the PDSCH is shorter than the above-described reference time timeDurationForQCL, the UE can use, when receiving the PDSCH, the TCI state configured or activated in the control resource set having the lowest control resource set index among at least one control resource set that can be monitored in the slot closest to the PDSCH, or the QCL assumption of the corresponding control resource set.

Fifth-Third Embodiment: Default Beam Operation in Case that the Scheduling Offset is Shorter than the Reference Time Regardless of Whether Tci-PresentInDCI is Configured, and the PDSCH and Another Control Resource Set Overlap In an embodiment, in case that the scheduling offset between the PDCCH and the PDSCH is shorter than the above-described reference time timeDurationForQCL regardless of whether the higher layer signaling tci-PresentInDCI is configured, and when the PDSCH and another control resource set overlap, a default beam operation will be described.

If tci-PresentInDCI, which is higher layer signaling, is configured or not configured in the control resource set in which the PDCCH scheduling the PDSCH is transmitted (that is, regardless of whether tci-PresentInDCI is configured), and if the scheduling offset between the PDCCH and the PDSCH is short then the above-described reference time timeDurationForQCL, the UE can use, when receiving the PDSCH, the TCI state configured or activated in the control resource set having the lowest control resource set index among at least one control resource set that can be monitored in the slot closest to the PDSCH, or the QCL assumption of the corresponding control resource set. In this case, if there is a control resource set overlapping the PDSCH in time and if the default beam of the PDSCH and the transmit beam of the overlapping control resource set are different from each other, the UE can use the transmit beam of the overlapping control resource set in receiving the PDSCH and the control resource set. This operation may be applicable within the same carrier or within different carriers within a band (intra-band CA).

Sixth Embodiment: Default Beam Operation in SFN PDCCH and PDSCH Transmission Based on Multi-TRP In an embodiment, a default beam operation during SFN PDCCH and PDSCH transmission based on multi-TRP will be described. In addition to the factors determining the default beam operation described in the fifth embodiment, a plurality of TCI states or QCL assumptions used for the SFN PDCCH or PDSCH may be considered.

In each of the following embodiments, the default beam operation will be described in detail in case that tci-PresentInDCI is not configured and the scheduling offset is longer than the reference time, in case that the scheduling offset is shorter than the reference time regardless of whether tci-PresentInDCI is configured, and in case that the scheduling offset is shorter than the reference time regardless of whether tci-PresentInDCI is configured, and the PDSCH and another control resource set overlap. In this case, up to two TCI states or QCL assumptions configured or activated in the overlapping control resource set may be considered.

Sixth-First Embodiment: Default Beam Operation in Case that Tci-PresentInDCI is not Configured and the Scheduling Offset is Longer than the Reference Time In an embodiment, in case that for multi-TRP based SFN PDCCH and PDSCH transmission as described above in the fourth-first embodiment, notification is performed by higher layer signaling-based configuration, L1 signaling-based indication, or a combination of higher layer signaling configuration and L1 signaling indication, if the higher layer signaling tci-PresentInDCI is not configured in the control resource set, and if the scheduling offset between the PDCCH and the PDSCH is longer than the above-described reference time timeDurationForQCL, a default beam operation is described.

If the higher layer signaling tci-PresentInDCI is not configured in the control resource set in which the PDCCH scheduling the PDSCH is transmitted, if the TCI state is configured or activated in the corresponding control resource set, if the scheduling offset between the PDCCH and the PDSCH is longer than the above-described reference time, timeDurationForQCL, and if the number of TCI states or QCL assumptions configured or activated in the corresponding control resource set is two, the following various methods can be used for determining the default beam of the PDSCH:

Prerequisites for Methods 6-1-1 to 6-1-3, as described below, are summarized as follows:

- In case of being notified by higher layer signaling-based configuration, L1 signaling-based indication, or a combination of higher layer signaling configuration and L1 signaling indication for the multi-TRP based SFN PDCCH transmission described above in the fourth-first embodiment
- (Applied only to Method 6-1-1) In case that the notification of the base station for the multi-TRP based SFN PDSCH transmission described above in the fourth-first embodiment is delivered to the UE
- (Except for Method 6-1-1) The notification of the base station for the multi-TRP based SFN PDSCH transmission described above in the fourth-first embodiment is irrelevant (including both notified and non-notified cases)

In case that the number of TCI states or QCL assumptions configured or activated in the control resource set through which the PDCCH is transmitted is two (Except Method 6-1-3) In case that tci-PresentInDCI, which is higher layer signaling, is not configured in the control resource set in which the PDCCH scheduling PDSCH is transmitted In case that the scheduling offset between the PDCCH and the PDSCH is longer than the above-described reference time, timeDurationForQCL In case that enableTwoDefaultTCI-States, which is upper layer signaling, is not configured Method 6-1-1

When receiving the PDSCH, the UE may use the TCI state configured or activated in the control resource set including the PDCCH scheduling the corresponding PDSCH, or the QCL assumption of the corresponding control resource set.

In this case, the number of default beams of the PDSCH may be two.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-1-1 of the PDSCH under the corresponding configuration.

Method 6-1-2

When receiving the PDSCH, the UE may use the first TCI state or the first QCL assumption among the TCI states configured or activated in the control resource set including the PDCCH scheduling the corresponding PDSCH or among the QCL assumptions of the corresponding control resource set.

In this case, the number of default beams of the PDSCH may be one.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-1-2 of the PDSCH under the corresponding configuration.

Method 6-1-3

The UE can expect that tci-PresentInDCI is always configured in the control resource set including the PDCCH in which the PDSCH is scheduled. That is, it may be assumed that the TCI field is always present in the DCI for the TCI state indication for the PDSCH.

The UE may perform an additional UE capability report to perform Method 6-1-3, or may use Method 6-1-3 in case where additional UE capabilities of Method 6-1-1 and Method 6-1-2 are not reported. If additional corresponding UE capability report is required and the UE reports the corresponding UE capability to the base station, the base station may configure higher layer signaling corresponding to the UE capability to the UE. In this case, the UE may use the default beam operation of Method 6-1-3 of the PDSCH under the corresponding configuration.

The prerequisites for Methods 6-1-4 and 6-1-5, as described below, are summarized as follows:

In case of being notified by higher layer signaling-based configuration, L1 signaling-based indication, or a combination of higher layer signaling configuration and L1 signaling indication for the multi-TRP based SFN PDCCH and PDSCH transmission described above in the fourth-first embodiment In case that the number of TCI states or QCL assumptions configured or activated in the control resource set through which the PDCCH is transmitted is two In case that the higher layer signaling tci-PresentInDCI is not configured in the control resource set in which the PDCCH scheduling the PDSCH is transmitted In case that the scheduling offset between the PDCCH and the PDSCH is longer than the above-described reference time, timeDurationForQCL In case that enableTwoDefaultTCI-States, which is higher layer signaling, is configured At this time, each method may be defined as follows:

Method 6-1-4

When receiving the PDSCH, the UE may use the codepoint of the lowest index capable of indicating two TCI states among TCI state codepoints activated in the TCI field in DCI.

In this case, the number of default beams of the PDSCH may be two.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-1-4 of the PDSCH under the corresponding configuration.

Method 6-1-5

When receiving the PDSCH, the UE may use the TCI state configured or activated in the control resource set including the PDCCH scheduling the corresponding PDSCH, or the QCL assumption of the corresponding control resource set.

In this case, the number of default beams of the PDSCH may be two.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-1-5 of the PDSCH under the corresponding configuration.

Sixth-Second Embodiment: Default Beam Operation in Case that the Scheduling Offset is Shorter than the Reference Time Regardless of Whether Tci-PresentInDCI is Configured In an embodiment, in case that for SFN PDCCH and PDSCH transmission based on multi-TRP as described above in the fourth-first embodiment, notification is performed by the configuration based on higher layer signaling, the indication based on L1 signaling, or a combination of higher layer signaling configuration and L1 signaling indication, if the scheduling offset between the PDCCH and the PDSCH is shorter than the above-described reference time timeDurationForQCL regardless of whether the higher layer signaling tci-PresentInDCI is configured, a default beam operation is described.

Regardless of whether the higher layer signaling tci-PresentInDCI is configured in the control resource set in which the PDCCH scheduling PDSCH is transmitted, if the TCI state is configured or activated in the corresponding control resource set, if the scheduling offset between the PDCCH and the PDSCH is shorter than the above-described reference time timeDurationForQCL, and if the number of TCI states or QCL assumptions configured or activated in the corresponding control resource set is two, the following various methods can be used for determining the default beam of the PDSCH:

Prerequisites for explaining Methods 6-2-1 to 6-2-4, as described below, are summarized as follows:

- In case of being notified by higher layer signaling-based configuration, L1 signaling-based indication, or a combination of higher layer signaling configuration and L1 signaling indication for the SFN PDCCH transmission based on multi-TRP described above in the fourth-first embodiment
- The notification of the base station for the SFN PDSCH transmission based on multi-TRP described above in the fourth-first embodiment is irrelevant (including both notified and not notified cases)
- In case that the number of TCI states or QCL assumptions configured or activated in the control resource set through which the PDCCH is transmitted is two
- It is irrelevant whether tci-PresentInDCI, which is higher layer signaling, is configured in the control resource set in which the PDCCH scheduling PDSCH is transmitted (including both configured and not configured cases)
- In case that the scheduling offset between the PDCCH and the PDSCH is shorter than the above-described reference time, timeDurationForQCL
- In case that enableTwoDefaultTCI-States, which is higher layer signaling, is configured At this time, each method may be defined as follows:

Method 6-2-1

When receiving the PDSCH, the UE may use the TCI state configured or activated in the control resource set having the lowest control resource set index among at least one control resource set that can be monitored in the slot closest to the PDSCH, or use the QCL assumption of the corresponding control resource set. In this case, the TCI state configured or activated in the control resource set of the lowest index or the QCL assumption of the corresponding control resource set may always be assumed to be one by the implementation of the base station.

There may be one default beam of the PDSCH determined through the corresponding method.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-2-1 of the PDSCH under the corresponding configuration.

Method 6-2-2

When receiving the PDSCH, the UE may use the TCI state configured or activated in the control resource set having the lowest control resource set index among at least one control resource set that can be monitored in the slot closest to the PDSCH, or use the QCL assumption of the corresponding control resource set. At this time, the definition of the lowest index among at least one control resource set that can be monitored in the nearest slot may mean the lowest index among the control resource sets having one TCI state or QCL assumption (that is, control resource sets having two TCI states or QCL assumptions may be excluded).

There may be one default beam of the PDSCH determined through the corresponding method.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-2-2 of the PDSCH under the corresponding configuration.

Method 6-2-3

When receiving the PDSCH, the UE may use the TCI state configured or activated in the control resource set having the lowest control resource set index among at least one control resource set that can be monitored in the slot closest to the PDSCH, or use the QCL assumption of the corresponding control resource set. In this case, if the control resource set of the lowest index has two TCI state or QCL assumptions, the UE may follow the first TCI state or QCL assumption among them, follow the second TCI state or QCL assumption, or follow the TCI state of the low index.

There may be one default beam of the PDSCH determined through the corresponding method.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-2-3 of the PDSCH under the corresponding configuration.

Method 6-2-4

When receiving the PDSCH, the UE may use the TCI state configured or activated in the control resource set having the lowest control resource set index among at least one control resource set that can be monitored in the slot closest to the PDSCH, or use the QCL assumption of the corresponding control resource set. At this time, the definition of the lowest index among at least one control resource set that can be monitored in the nearest slot may mean the lowest index among control resource sets having two TCI states or QCL assumptions (that is, control resource sets having one TCI state or QCL assumption may be excluded). In this case, the UE may follow the first TCI state or QCL assumption among the two TCI states or QCL assumptions, follow the second TCI state or QCL assumption, or follow the TCI state of a low index.

There may be one default beam of the PDSCH determined through the corresponding method.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation Method 6-2-4 of the PDSCH under the corresponding configuration.

The prerequisites for Methods 6-2-5 and 6-2-6, as described below, are summarized as follows:

- In case of being notified by higher layer signaling-based configuration, L1 signaling-based indication, or a combination of higher layer signaling configuration and L1 signaling indication for the SFN PDCCH and PDSCH transmission based on multi-TRP described above in the fourth-first embodiment In case that the number of TCI states or QCL assumptions configured or activated in the control resource set through which the PDCCH is transmitted is two It is irrelevant whether tci-PresentInDCI, which is higher layer signaling, is configured in the control resource set in which the PDCCH scheduling PDSCH is transmitted (including both configured and not configured cases)

In case that the scheduling offset between the PDCCH and the PDSCH is shorter than the above-described reference time, timeDurationForQCL In case that enableTwoDefaultTCI-States, which is higher layer signaling, is configured At this time, each method may be defined as follows:

Method 6-2-5

When receiving the PDSCH, the UE may use the codepoint of the lowest index capable of indicating two TCI states among TCI state codepoints activated in the TCI field in DCI. In this case, the number of default beams of the PDSCH may be two. Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-2-5 of the PDSCH under the corresponding configuration.

Method 6-2-6

When receiving the PDSCH, the UE may use the TCI state configured or activated in the control resource set including the PDCCH scheduling the corresponding PDSCH, or use the QCL assumption of the corresponding control resource set.

In this case, the number of default beams of the PDSCH may be two.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-2-6 of the PDSCH under the corresponding configuration.

Sixth-Third Embodiment: Default Beam Operation in Case that the Scheduling Offset is Shorter than the Reference Time Regardless of Whether Tci-PresentInDCI is Configured, and the PDSCH and Another Control Resource Set Overlap In case that for SFN PDCCH and PDSCH transmission based on multi-TRP as described above in the fourth-first embodiment, notification is performed by higher layer signaling-based configuration, L1 signaling-based indication, or a combination of higher layer signaling configuration and L1 signaling indication, if the scheduling offset between the PDCCH and the PDSCH is shorter than the above-described reference time timeDurationForQCL regardless of whether the higher layer signaling tci-PresentInDCI is configured, and if the PDSCH and another control resource set overlap, a default beam operation is described.

Depending on the number (one or two) of the default beams of the PDSCH determined through Methods 6-2-1 to 6-2-6, as described above, and the number of TCI states configured or activated in the control resource set overlapping in time with the corresponding PDSCH or the number of QCL assumptions, the following cases may be considered:

Case 6-3-1 the Number of Default Beams of PDSCH: 1, the Number of Default Beams of the Control Resource Set: 1

Method 6-3-1

When the number of default beams of the PDSCH determined through the above-described Methods 6-2-1 to 6-2-6 is one, and when the number of TCI states, or QCL assumptions, configured or activated in the control resource set overlapping the corresponding PDSCH in time is one, the UE may use the transmit beam of the control resource set overlapping the PDSCH in time in receiving the PDSCH and the control resource set.

This operation may be applicable within the same carrier or between different carriers within a band (intra-band CA).

Case 6-3-2 the Number of Default Beams of PDSCH: 1, the Number of TCI States or QCL Assumptions of the Control Resource Set: 2

When the number of default beams of the PDSCH determined through the above-described in Methods 6-2-1 to 6-2-6 is one, and when the number of TCI states, or QCL assumptions, configured or activated in the control resource set overlapping the corresponding PDSCH in time is two, the UE may finally determine a beam to be used for PDSCH reception by using methods to be described later.

Method 6-3-2-1

The UE may determine the PDSCH receive beam by selecting one of the TCI states or QCL assumptions configured or activated in the control resource set overlapping with the PDSCH in time. In this case, the UE may follow the first TCI state or QCL assumption among the two TCI states or QCL assumptions, follow the second TCI state or QCL assumption, or follow the TCI state of a low index.

This method can be applied to a case where the default beam of the PDSCH determined through the above-described Methods 6-2-1 to 6-2-6 does not overlap with two TCI states or two QCL assumptions configured or activated in the control resource set overlapping with the corresponding PDSCH in time.

There may be one default beam of the PDSCH determined through this method.

This method may be applicable even between different carriers (intra-band CA) within the same carrier or within a band.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-3-2-1 of the PDSCH under the corresponding configuration.

Method 6-3-2-2

The UE may maintain the default beam of the PDSCH and use it as a reception beam without selecting from among the TCI states or QCL assumptions configured or activated in the control resource set overlapping in time with the PDSCH.

This method can be applied to a case where the default beam of the PDSCH determined through the above-described Methods 6-2-1 to 6-2-6 does not overlap with two TCI states or two QCL assumptions configured or activated in the control resource set overlapping with the corresponding PDSCH in time.

There may be one default beam of the PDSCH determined through this method.

This method may be applicable even between different carriers (intra-band CA) within the same carrier or within a band.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-3-2-2 of the PDSCH under the corresponding configuration.

Method 6-3-2-3

In case where the default beam of the PDSCH determined through the above-described Methods 6-2-1 to 6-2-6 overlaps in part with two TCI states or two QCL assumptions configured or activated in the control resource set overlapping with the corresponding PDSCH in time, the UE may perform PDSCH reception in a beam direction according to the overlapping TCI state or QCL assumption.

There may be one default beam of the PDSCH determined through this method.

This method may be applicable even between different carriers (intra-band CA) within the same carrier or within a band.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-3-2-3 of the PDSCH under the corresponding configuration.

Method 6-3-2-4

In case where the default beam of the PDSCH determined through the above-described Methods 6-2-1 to 6-2-6 does not overlap with two TCI states or two QCL assumptions configured or activated in the control resource set overlapping with the corresponding PDSCH in time, the UE may use Method 6-3-2-1 within the same carrier and use Method 6-3-2-2 between different carriers (intra-band CA) within the band. Alternatively, the UE may use Method 6-3-2-2 within the same carrier and use Method 6-3-2-1 between different carriers (intra-band CA) within the band.

There may be one default beam of the PDSCH determined through this method.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-3-2-4 of the PDSCH under the corresponding configuration.

Method 6-3-2-5

The UE may determine the use of a specific method through higher layer signaling among Methods 6-3-2-1 to 6-3-2-4.

In this method, higher layer signaling may be determined so that the same method may be used within the same carrier or between different carriers within a band (intra-band CA), or the same or different methods may be used independently of each other.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-3-2-5 of the PDSCH under the corresponding configuration.

Case 6-3-3 the Number of PDSCH Default Beams: 2, the Number of TCI States or QCL assumptions of the control resource set: 1

When the number of default beams of the PDSCH determined through the above-described Methods 6-2-1 to 6-2-6 is two, and when the number of TCI states, or QCL assumptions, configured or activated in the control resource set overlapping the corresponding PDSCH in time is one, the UE may finally determine a beam to be used for PDSCH reception by using methods to be described later.

Method 6-3-3-1

The UE may determine the PDSCH reception beam by using the TCI state or QCL assumption configured or activated in the control resource set overlapping with the PDSCH in time.

This method can be applied to a case where the default beams of two PDSCHs determined through the above-described Methods 6-2-1 to 6-2-6 do not overlap with one TCI state or one QCL assumption configured or activated in the control resource set overlapping with the corresponding PDSCH in time.

There may be one default beam of the PDSCH determined through this method.

This method may be applicable even between different carriers (intra-band CA) within the same carrier or within a band.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-3-3-1 of the PDSCH under the corresponding configuration.

Method 6-3-3-2

The UE may determine the reception beams of the PDSCH by maintaining the two default beams of the PDSCH determined through the above-described Methods 6-2-1 to 6-2-6.

This method can be applied to a case where the default beams of two PDSCHs determined through the above-described Methods 6-2-1 to 6-2-6 do not overlap with one TCI state or one QCL assumption configured or activated in the control resource set overlapping with the corresponding PDSCH in time.

There may be two default beams of the PDSCH determined through this method.

This method may be applicable even between different carriers (intra-band CA) within the same carrier or within a band.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-3-3-2 of the PDSCH under the corresponding configuration.

Method 6-3-3-3

In case where the default beams of two PDSCHs determined through the above-described Methods 6-2-1 to 6-2-6 overlap at least in part with one TCI state or one QCL assumption configured or activated in the control resource set overlapping with the corresponding PDSCH in time, the UE may determine two reception beams by using overlapped and non-overlapped ones.

There may be two default beams of the PDSCH determined through this method.

This method may be applicable even between different carriers (intra-band CA) within the same carrier or within a band.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-3-3-3 of the PDSCH under the corresponding configuration.

Method 6-3-3-4

In case where the default beams of two PDSCHs determined through the above-described Methods 6-2-1 to 6-2-6 do not overlap with one TCI state or one QCL assumption configured or activated in the control resource set overlapping with the corresponding PDSCH in time, the UE may determine the reception beam of the PDSCH by using one of the default beams of two PDSCHs determined through the above-described Methods 6-2-1 to 6-2-6 and one TCI state or one QCL assumption configured or activated in the control resource set overlapping in time.

This method can be applied to a case where the default beams of two PDSCHs determined through the above-described Methods 6-2-1 to 6-2-6 do not overlap with one TCI state or one QCL assumption configured or activated in the control resource set overlapping with the corresponding PDSCH in time.

There may be two default beams of the PDSCH determined through this method.

This method may be applicable even between different carriers (intra-band CA) within the same carrier or within a band.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-3-3-4 of the PDSCH under the corresponding configuration.

Method 6-3-3-5

In case where the default beams of two PDSCHs determined through the above-described Methods 6-2-1 to 6-2-6 do not overlap with one TCI state or one QCL assumption configured or activated in the control resource set overlapping with the corresponding PDSCH in time, the UE may use one of Method 6-3-3-1, Method 6-3-3-2, and Method 6-3-3-4 within the same carrier, and use one of Method 6-3-3-1, Method 6-3-3-2, and Method 6-3-3-4 between different carriers within the band (intra-band CA). The UE can expect that different methods are used or the same method is used within the same carrier or between different carriers within a band (intra-band CA).

There may be one or two default beams of the PDSCH determined through this method.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-3-3-5 of the PDSCH under the corresponding configuration.

Method 6-3-3-6

The UE may determine the use of a specific method through higher layer signaling among Methods 6-3-3-1 to 6-3-3-5.

In this method, higher layer signaling may be determined so that the same method may be used within the same carrier or between different carriers within a band (intra-band CA), or the same or different methods may be used independently of each other.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-3-3-6 of the PDSCH under the corresponding configuration.

Case 6-3-4 the Number of PDSCH Default Beams: 2, the Number of TCI States or QCL Assumptions of the Control Resource Set: 2

When the number of default beams of the PDSCH determined through the above-described Methods 6-2-1 to 6-2-6 is two, and when the number of TCI states, or QCL assumptions, configured or activated in the control resource set overlapping the corresponding PDSCH in time is two, the UE may finally determine a beam to be used for PDSCH reception by using methods to be described later.

Method 6-3-4-1

The UE may determine the PDSCH reception beam by using the TCI state or QCL assumption configured or activated in the control resource set overlapping with the PDSCH in time.

This method can be applied to a case where the default beams of two PDSCHs determined through the above-described Methods 6-2-1 to 6-2-6 overlap with at least one of two TCI states or two QCL assumptions configured or activated in the control resource set overlapping with the corresponding PDSCH in time.

There may be two default beams of the PDSCH determined through this method.

This method may be applicable even between different carriers (intra-band CA) within the same carrier or within a band.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-3-4-1 of the PDSCH under the corresponding configuration.

Method 6-3-4-2

The UE may determine the reception beams of the PDSCH by maintaining the two default beams of the PDSCH determined through the above-described Methods 6-2-1 to 6-2-6.

This method can be applied to a case where the default beams of two PDSCHs determined through the above-described Methods 6-2-1 to 6-2-6 overlap with at least one of two TCI states or two QCL assumptions configured or activated in the control resource set overlapping with the corresponding PDSCH in time.

There may be two default beams of the PDSCH determined through this method.

The method may be applicable even between different carriers (intra-band CA) within the same carrier or within a band.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-3-4-2 of the PDSCH under the corresponding configuration.

Method 6-3-4-3

The UE may determine the PDSCH reception beam by using the TCI state or QCL assumption configured or activated in the control resource set overlapping with the PDSCH in time.

This method can be applied to a case where the default beams of two PDSCHs determined through the above-described of Methods 6-2-1 to 6-2-6 do not overlap with two TCI states or two QCL assumptions configured or activated in the control resource set overlapping with the corresponding PDSCH in time.

There may be two default beams of the PDSCH determined through this method.

This method may be applicable even between different carriers (intra-band CA) within the same carrier or within a band.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-3-4-3 of the PDSCH under the corresponding configuration.

Method 6-3-4-4

The UE may determine the reception beams of the PDSCH by maintaining the two default beams of the PDSCH determined through the above-described Methods 6-2-1 to 6-2-6.

This method can be applied to a case where the default beams of two PDSCHs determined through the above-described Methods 6-2-1 to 6-2-6 do not overlap with two TCI states or two QCL assumptions configured or activated in the control resource set overlapping with the corresponding PDSCH in time.

There may be two default beams of the PDSCH determined through this method.

The method may be applicable even between different carriers (intra-band CA) within the same carrier or within a band.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-3-4-4 of the PDSCH under the corresponding configuration.

Method 6-3-4-5

The UE may determine the reception beam of the PDSCH by using one of the TCI states or QCL assumptions configured or activated in the control resource set overlapping with the PDSCH in time, and one of the two PDSCH default beams determined through the above-described Methods 6-2-1 to 6-2-6.

This method can be applied to a case where the default beams of two PDSCHs determined through the above-described Methods 6-2-1 to 6-2-6 do not overlap with two TCI states or two QCL assumptions configured or activated in the control resource set overlapping with the corresponding PDSCH in time.

There may be two default beams of the PDSCH determined through this method.

This method may be applicable even between different carriers (intra-band CA) within the same carrier or within a band.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-3-4-5 of the PDSCH under the corresponding configuration.

Method 6-3-4-6

In case where the default beams of two PDSCHs determined through the above-described Methods 6-2-1 to 6-2-6 do not overlap with two TCI states or two QCL assumptions configured or activated in the control resource set overlapping with the corresponding PDSCH in time, the UE may use one of Method 6-3-4-3, Method 6-3-4-4, and Method 6-3-4-5 within the same carrier, and use one of Method 6-3-4-3, Method 6-3-4-4, and Method 6-3-4-5 between different carriers within the band (intra-band CA). The UE can expect that different methods are used or the same method is used within the same carrier or between different carriers within a band (intra-band CA).

There may be two default beams of the PDSCH determined through this method.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-3-4-6 of the PDSCH under the corresponding configuration.

Method 6-3-4-7

In case where the default beams of two PDSCHs determined through the above-described Methods 6-2-1 to 6-2-6 overlap with at least one of two TCI states or two QCL assumptions configured or activated in the control resource set overlapping with the corresponding PDSCH in time, the UE may use one of Method 6-3-4-1 and Method 6-3-4-2 within the same carrier, and use one of Method 6-3-4-1 and Method 6-3-4-2 between different carriers within the band (intra-band CA). The UE can expect that different methods are used or the same method is used within the same carrier or between different carriers within a band (intra-band CA).

There may be two default beams of the PDSCH determined through this method.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-3-4-7 of the PDSCH under the corresponding configuration.

Method 6-3-4-8

The UE may determine the use of a specific method through higher layer signaling among Methods 6-3-4-1 to 6-3-4-7.

In this method, higher layer signaling may be determined so that the same method may be used within the same carrier or between different carriers within a band (intra-band CA), or the same or different methods may be used independently of each other.

Additional UE capability reporting may be required to perform the method. When a corresponding UE capability report is required, and when the UE reports the corresponding UE capability to the base station, the base station may configure higher layer signaling corresponding to the UE capability to the UE. In this case, the UE may use the default beam operation of Method 6-3-4-8 of the PDSCH under the corresponding configuration.

Figure 26A:
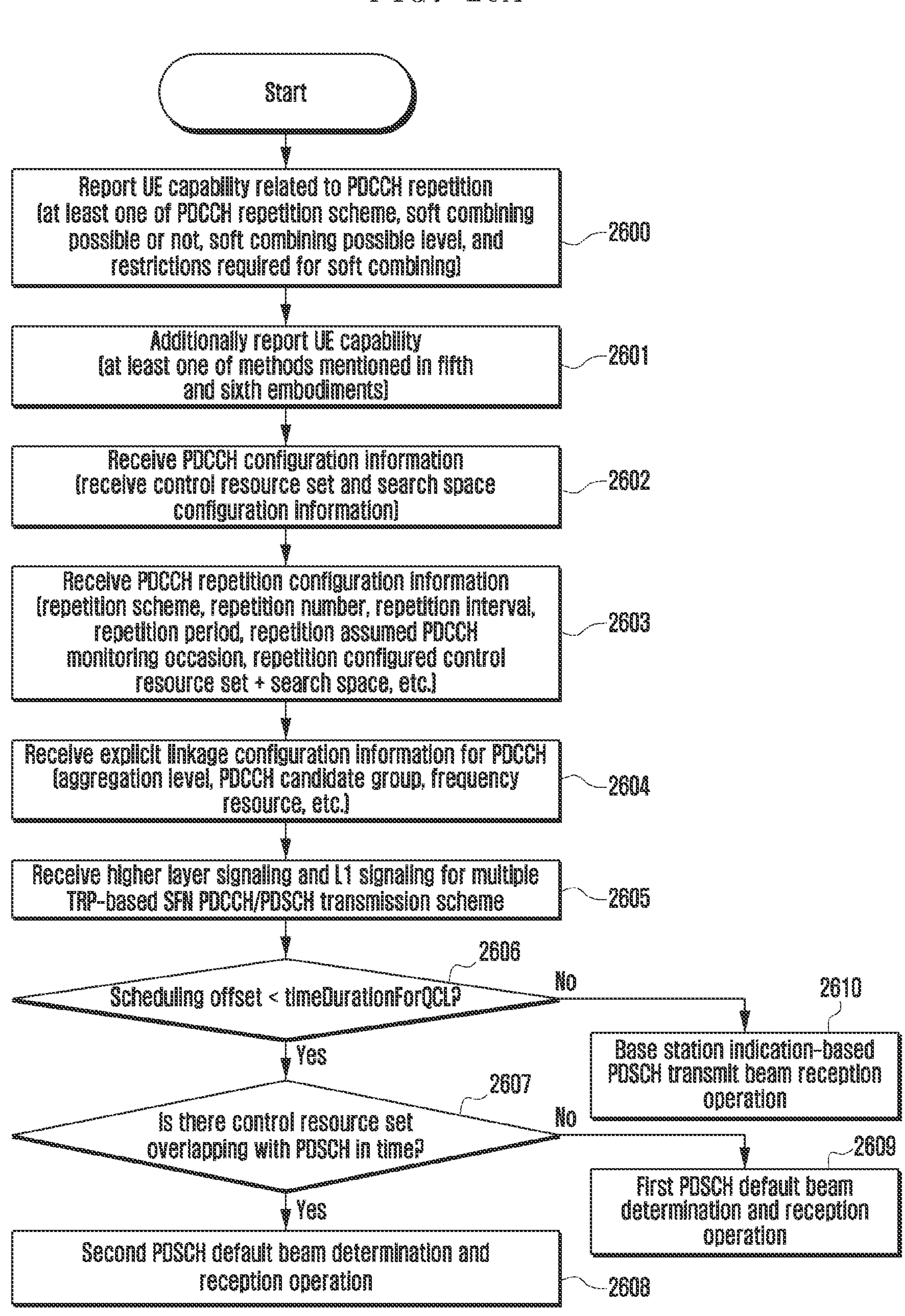
FIGS. 26A and 26B illustrate operations of a base station and a UE in determining a default beam of a PDSCH according to an embodiment.
Figure 26B:
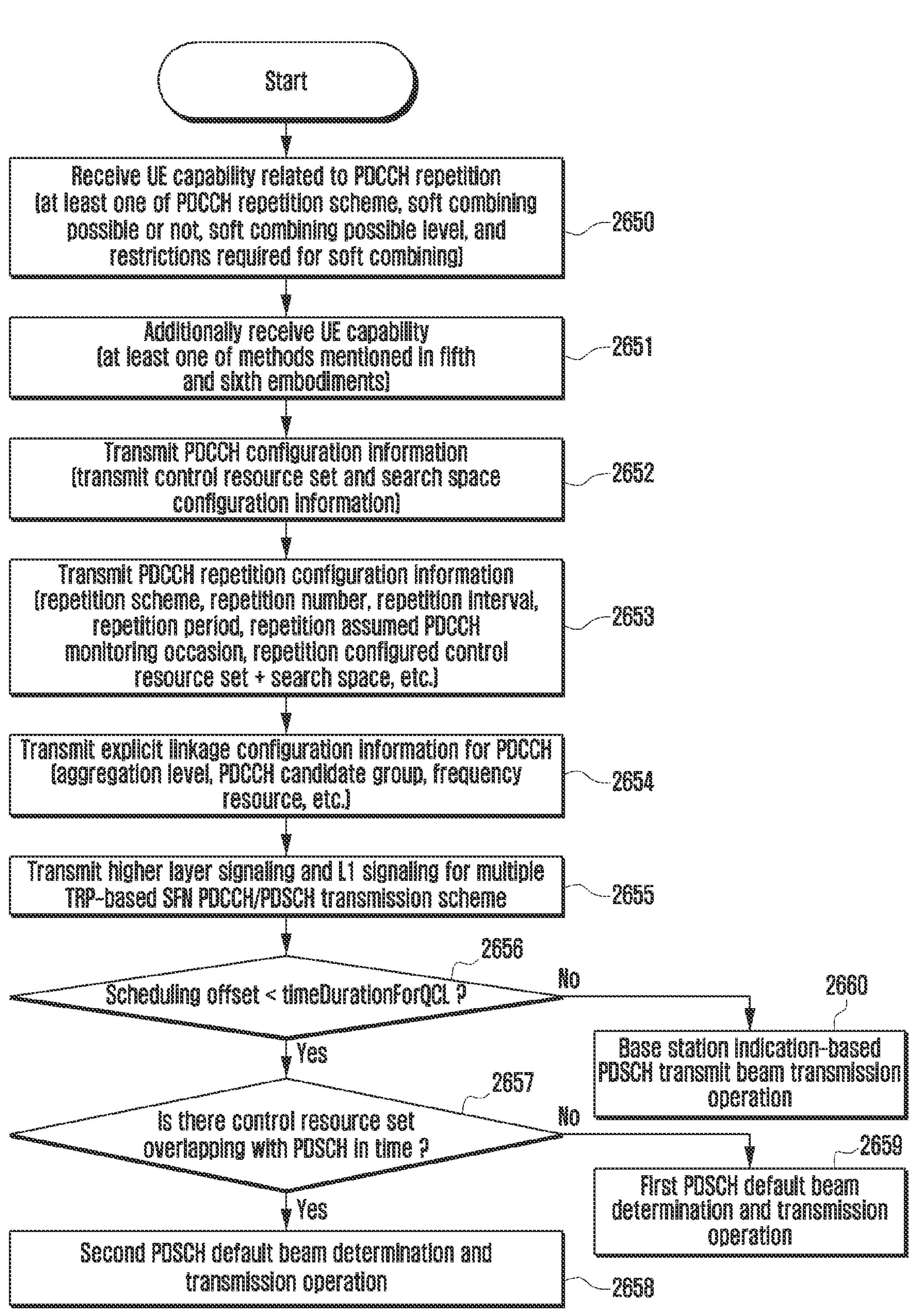

FIGS. 26A and 26B illustrate operations of a base station and a UE in determining a default beam of a PDSCH according to an embodiment. The UE may report information related to PDCCH repetition (e.g., at least one of a PDCCH repetition scheme, soft combining possible or not, a soft combining possible level, and restrictions required for soft combining) to the base station as the UE capability (2600, 2650). In addition, the UE may additionally report to the base station the UE capability (e.g., at least one of the UE capabilities mentioned in the fifth and sixth embodiments) for SFN PDCCH and PDSCH transmission based on multi-TRP (2601, 2651). The base station may receive it and transmit configuration information about the PDCCH (e.g., configuration information on a control resource set and a search space) to the UE (2602, 2652), and the base station may additionally transmit configuration information about PDCCH repetition (e.g., a repetition scheme, the number of repetitions, a repetition interval, a repetition period, a PDCCH monitoring occasion in which the repetition is assumed, a control resource set and search space in which the repetition is configured, etc.) to the UE (2603, 2653). In addition, the base station may additionally transmit explicit linkage configuration related information (e.g., an aggregation level, a PDCCH candidate group, a frequency resource, etc.) to the UE in the PDCCH repetition (2604, 2654). In addition, the base station may indicate and configure the SFN PDCCH/PDSCH transmission scheme based on multi-TRP by L1 signaling, higher layer signaling, or a combination of L1 signaling and higher layer signaling (2605, 2655). This may be based on at least one of the various schemes described in the above-described fourth embodiment. If the scheduling offset from the last symbol of the PDCCH received by the UE to the PDSCH scheduled by the PDCCH is shorter than the timeDurationForQCL reported by the UE as the UE capability (2606, 2656), and if a control resource set overlapping with the scheduled PDSCH in time is not present (2607, 2657), the UE may perform the first PDSCH default beam determination operation, and the base station may transmit the PDSCH using the PDSCH transmit beam to match the UE's first PDSCH default beam determination operation (2609, 2659). The first PDSCH default beam determination operation may be one of Method 6-2-1 to Method 6-2-6, as described above. If the scheduling offset from the last symbol of the PDCCH received by the UE to the PDSCH scheduled by the PDCCH is shorter than the timeDurationForQCL reported by the UE as the UE capability (2606, 2656), and if the control resource set overlapping with the scheduled PDSCH in time is present (2607, 2657), the UE may perform the second PDSCH default beam determination operation, and the base station may transmit the PDSCH using the PDSCH transmit beam to match the UE's second PDSCH default beam determination operation (2608, 2658). The second PDSCH default beam determination operation may be one of Method 6-3-1 to 6-3-2-5, Method 6-3-3-1 to 6-3-3-6, and Method 6-3-4-1 to 6-3-4-8. If the scheduling offset from the last symbol of the PDCCH received by the UE to the PDSCH scheduled by the PDCCH is longer than the timeDurationForQCL reported by the UE as the UE capability (2606, 2656), the UE may perform a PDSCH transmit beam reception operation based on the indication of the base station (indication of the PDCCH transmit beam through TCI field), and the base station may perform a PDSCH transmission operation based on the transmit beam indicated to the UE (2610, 2660).

Figure 27:
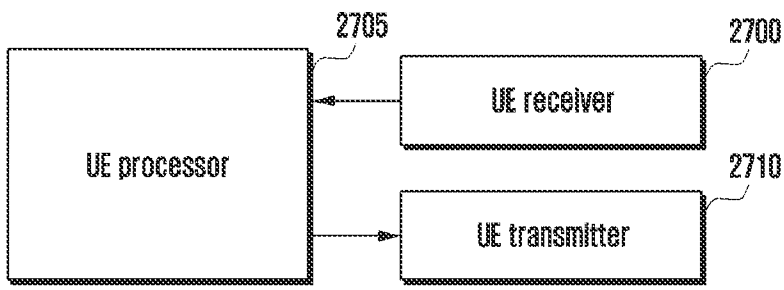
FIG. 27 illustrates a structure of a UE according to an embodiment.

FIG. 27 illustrates a structure of a UE according to an embodiment.

With reference to FIG. 27, the UE may include a transceiver that refers to a UE receiver 2700 and a UE transmitter 2710, a memory, and a UE processor 2705 (or a UE controller or a processor). According to the communication method of the UE described above, the transceiver 2700 and 2710, the memory, and the UE processor 2705 of the UE may operate. However, the components of the UE are not limited to the above-described example. For example, the UE may include more or fewer components than the aforementioned components. In addition, the transceiver, the memory, and the processor may be implemented in the form of one chip.

The transceiver may transmit/receive a signal to/from the base station. Here, the signal may include control information and data. To this end, the transceiver may include an RF transmitter for up-converting and amplifying a frequency of a transmitted signal, and an RF receiver for low-noise amplifying and down-converting a received signal. However, this is only an embodiment of the transceiver, and components of the transceiver are not limited to the RF transmitter and the RF receiver.

In addition, the transceiver may receive a signal through a wireless channel, output it to the processor, and transmit a signal outputted from the processor through the wireless channel.

The memory may store programs and data necessary for the operation of the UE. In addition, the memory may store control information or data included in a signal transmitted and received by the UE. The memory may be configured as a storage medium or a combination of storage media, such as ROM, RAM, hard disk, CD-ROM, and DVD. Also, there may be a plurality of memories.

In addition, the processor may control a series of processes so that the UE can operate according to the above-described embodiments. For example, the processor may receive DCI composed of two layers and control the components of the UE to receive a plurality of PDSCHs at the same time. The number of processors may be plural, and the processor may perform a component control operation of the UE by executing a program stored in the memory.

Figure 28:
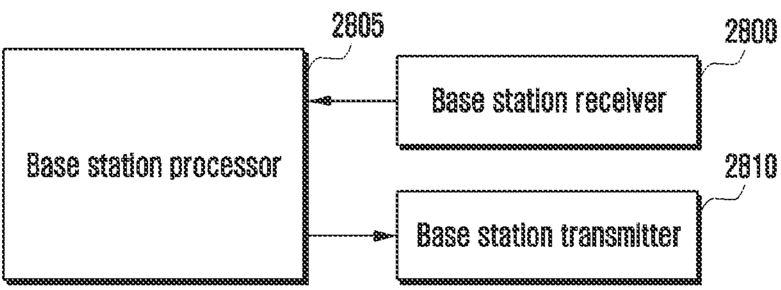
FIG. 28 illustrates a structure of a base station according to an embodiment.

FIG. 28 illustrates a structure of a base station according to an embodiment.

With reference to FIG. 28, the base station may include a transceiver that refers to a base station receiver 2800 and a base station transmitter 2810, a memory, and a base station processor 2805 (or a base station-controller or a processor). According to the communication method of the base station described above, the transceiver 2800 and 2810, the memory, and the base station processor 2805 of the base station may operate. However, the components of the base station are not limited to the above-described example. For example, the base station may include more or fewer components than the aforementioned components. In addition, the transceiver, the memory, and the processor may be implemented in the form of one chip.

The transceiver may transmit/receive a signal to/from the UE. Here, the signal may include control information and data. To this end, the transceiver may include an RF transmitter for up-converting and amplifying a frequency of a transmitted signal, and an RF receiver for low-noise amplifying and down-converting a received signal. However, this is only an embodiment of the transceiver, and components of the transceiver are not limited to the RF transmitter and the RF receiver.

In addition, the transceiver may receive a signal through a wireless channel, output it to the processor, and transmit a signal outputted from the processor through the wireless channel.

The memory may store programs and data necessary for the operation of the base station. In addition, the memory may store control information or data included in a signal transmitted and received by the base station. The memory may be configured as a storage medium or a combination of storage media, such as ROM, RAM, hard disk, CD-ROM, and DVD. Also, there may be a plurality of memories.

In addition, the processor may control a series of processes so that the base station can operate according to the above-described embodiments. For example, the processor may control each component of the base station to compose two-layer DCIs including allocation information for a plurality of PDSCHs and transmit them. The number of processors may be plural, and the processor may execute a program stored in the memory to perform a component control operation of the base station.

The methods according to claims or embodiments described in the disclosure may be implemented in hardware, software, or a combination of hardware and software.

In case of implementation in software, a computer-readable storage medium that stores one or more programs (or software modules) may be provided. Such one or more programs stored in the computer-readable storage medium are configured for execution by one or more processors equipped in an electronic device. The one or more programs include instructions that cause the electronic device to perform the methods according to claims or embodiments described herein.

Such programs (software module, software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), other type optical storage devices, a magnetic cassette, or any combination thereof. In addition, each of such memories may be included as plural components.

In addition, the program may be stored in an attachable storage device that is accessible through a communication network such as the Internet, an Intranet, a local area network (LAN), a wide LAN (WLAN), a storage area network (SAN), or any combination thereof. Such a storage device may access an apparatus that performs embodiments of the disclosure via an external port. Further, a separate storage device on the communication network may access an apparatus that performs embodiments of the disclosure.

In the above-discussed embodiments, elements included in the disclosure are expressed as a singular or plural form depending on the discussed specific embodiments. However, it is to be understood that such singular or plural representations are selected appropriately according to situations presented for the convenience of description, and the disclosure is not limited to the singular or plural form. Even expressed in a singular form, an element may be construed as a plurality of elements, and vice versa.

Meanwhile, embodiments of the disclosure and the accompanying drawings are only examples presented in order to easily describe the disclosure and facilitate comprehension of the disclosure, but are not intended to limit the scope of the disclosure. That is, it is apparent to a person skilled in the art that other modifications based on technical ideas of the disclosure can be implemented. In addition, the above-described embodiments may be used in combination with each other as needed. For example, it may be possible to apply the first embodiment and the second embodiment in combination, or to apply a part of the first embodiment and a part of the second embodiment in combination. In addition, although the above embodiments have been presented based on the FDD LTE system, other modifications based on the technical idea of the embodiment may be implemented in other systems such as TDD LTE system, 5G or NR system.

Meanwhile, in the drawings for explaining the method of the disclosure, the order of description does not necessarily correspond to the order of execution, and the precedence relationship may be changed or may be executed in parallel.

Alternatively, some components may be omitted and only some components may be included in the drawings for explaining the method of the disclosure without impairing the essence of the disclosure.

In addition, the method of the disclosure may be implemented in a combination of some or all of the contents contained in each embodiment within a range that does not impair the essence of the disclosure.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method performed by a terminal in a communication system, the method comprising:

receiving, from a base station, downlink control information (DCI) for scheduling a physical downlink shared channel (PDSCH);

identifying that a scheduling offset for the PDSCH is smaller than a time duration for applying quasi co-location (QCL) information;

identifying a first control resource set (CORESET) with a lowest identity (ID) monitored in a slot closest to a slot for PDSCH reception;

identifying one or more default beams for the PDSCH based on the first CORESET;

identifying a second CORESET overlapping in time with the PDSCH, wherein the second CORESET corresponds to two transmission configuration indicator (TCI) states;

identifying a beam for the PDSCH; and receiving, from the base station, the PDSCH based on the beam, wherein, in case that a number of default beams for the PDSCH is one and the one default beam for the PDSCH overlaps with a TCI state among the two TCI states corresponding to the second CORESET, the beam for the PDSCH is identified based on the TCI state overlapping with the one default beam for the PDSCH, wherein, in case that a number of default beams for the PDSCH is one and the one default beam for the PDSCH does not overlap with the two TCI states corresponding to the second CORESET, the beam for the PDSCH is identified based on one TCI state among the two TCI states corresponding to the second CORESET, wherein, in case that a number of default beams for the PDSCH is two and at least one of the two TCI states corresponding to the second CORESET overlaps with the two default beams for the PDSCH, the beam for the PDSCH is identified based on the two TCI states corresponding to the second CORESET, wherein, in case that the number of default beams for the PDSCH is two and the two TCI states corresponding to the second CORESET do not overlap with the two default beams for the PDSCH, the beam for the PDSCH is identified based on one of the two default beams for the PDSCH and one of the two TCI states corresponding to the second CORESET, and wherein the PDSCH and the second CORESET are received based on an intra-band carrier aggregation (CA).

2. A method performed by a base station in a communication system, the method comprising:

transmitting, to a terminal, downlink control information (DCI) for scheduling a physical downlink shared channel (PDSCH);

identifying that a scheduling offset for the PDSCH is smaller than a time duration for applying quasi co-location (QCL) information;

identifying a first control resource set (CORESET) with a lowest identity (ID) monitored in a slot closest to a slot for PDSCH transmission;

identifying one or more default beams for the PDSCH based on the first CORESET;

identifying a second CORESET overlapping in time with the PDSCH, wherein the second CORESET corresponds to two transmission configuration indicator (TCI) states;

identifying a beam for the PDSCH; and transmitting, to the terminal, the PDSCH based on the beam, wherein, in case that a number of default beams for the PDSCH is one and the one default beam for the PDSCH overlaps with a TCI state among the two TCI states corresponding to the second CORESET, the beam for the PDSCH is identified based on the TCI state overlapping with the one default beam for the PDSCH, wherein, in case that a number of default beams for the PDSCH is one and the one default beam for the PDSCH does not overlap with the two TCI states corresponding to the second CORESET, the beam for the PDSCH is identified based on one TCI state among the two TCI states corresponding to the second CORESET, wherein, in case that a number of default beams for the PDSCH is two and at least one of the two TCI states corresponding to the second CORESET overlaps with the two default beams for the PDSCH, the beam for the PDSCH is identified based on the two TCI states corresponding to the second CORESET, wherein, in case that the number of default beams for the PDSCH is two and the two TCI states corresponding to the second CORESET do not overlap with the two default beams for the PDSCH, the beam for the PDSCH is identified based on one of the two default beams for the PDSCH and one of the two TCI states corresponding to the second CORESET, and wherein the PDSCH and the second CORESET are transmitted based on an intra-band carrier aggregation (CA).

3. A terminal in a communication system, the terminal comprising:

a transceiver; and a controller configured to:

receive, from a base station, downlink control information (DCI) for scheduling a physical downlink shared channel (PDSCH), identify that a scheduling offset for the PDSCH is smaller than a time duration for applying quasi co-location (QCL) information, identify a first control resource set (CORESET) with a lowest identity (ID) monitored in a slot closest to a slot for PDSCH reception, identify one or more default beams for the PDSCH based on the first CORESET, identify a second CORESET overlapping in time with the PDSCH, wherein the second CORESET corresponds to two transmission configuration indicator (TCI) states, identify a beam for the PDSCH, and receive, from the base station, the PDSCH based on the beam, wherein, in case that a number of default beams for the PDSCH is one and the one default beam for the PDSCH overlaps with a TCI state among the two TCI states corresponding to the second CORESET, the beam for the PDSCH is identified based on the TCI state overlapping with the one default beam for the PDSCH, wherein, in case that a number of default beams for the PDSCH is one and the one default beam for the PDSCH does not overlap with the two TCI states corresponding to the second CORESET, the beam for the PDSCH is identified based on one TCI state among the two TCI states corresponding to the second CORESET, wherein, in case that a number of default beams for the PDSCH is two and at least one of the two TCI states corresponding to the second CORESET overlaps with the two default beams for the PDSCH, the beam for the PDSCH is identified based on the two TCI states corresponding to the second CORESET, wherein, in case that the number of default beams for the PDSCH is two and the two TCI states corresponding to the second CORESET do not overlap with the two default beams for the PDSCH, the beam for the PDSCH is identified based on one of the two default beams for the PDSCH and one of the two TCI states corresponding to the second CORESET, and wherein the PDSCH and the second CORESET are received based on an intra-band carrier aggregation (CA).

4. A base station in a communication system, the base station comprising:

a transceiver; and a controller configured to:

transmit, to a terminal, downlink control information (DCI) for scheduling a physical downlink shared channel (PDSCH), identify that a scheduling offset for the PDSCH is smaller than a time duration for applying quasi co-location (QCL) information, identify a first control resource set (CORESET) with a lowest identity (ID) monitored in a slot closest to a slot for PDSCH transmission, identify one or more default beams for the PDSCH based on the first CORESET, identify a second CORESET overlapping in time with the PDSCH, wherein the second CORESET corresponds to two transmission configuration indicator (TCI) states, identify a beam for the PDSCH, and transmit, to the terminal, the PDSCH based on the beam, wherein, in case that a number of default beams for the PDSCH is one and the one default beam for the PDSCH overlaps with a TCI state among the two TCI states corresponding to the second CORESET, the beam for the PDSCH is identified based on the TCI state overlapping with the one default beam for the PDSCH, wherein, in case that a number of default beams for the PDSCH is one and the one default beam for the PDSCH does not overlap with the two TCI states corresponding to the second CORESET, the beam for the PDSCH is identified based on one TCI state among the two TCI states corresponding to the second CORESET, wherein, in case that a number of default beams for the PDSCH is two and at least one of the two TCI states corresponding to the second CORESET overlaps with the two default beams for the PDSCH, the beam for the PDSCH is identified based on the two TCI states corresponding to the second CORESET, wherein, in case that the number of default beams for the PDSCH is two and the two TCI states corresponding to the second CORESET do not overlap with the two default beams for the PDSCH, the beam for the PDSCH is identified based on one of the two default beams for the PDSCH and one of the two TCI states corresponding to the second CORESET, and wherein the PDSCH and the second CORESET are transmitted based on an intra-band carrier aggregation (CA).

* * * * *